(12) United States Patent
Zhu

(10) Patent No.: US 12,283,909 B2
(45) Date of Patent: Apr. 22, 2025

(54) METHOD AND APPARATUS FOR CONTROLLING LINEAR MOTOR, DEVICE, AND READABLE STORAGE MEDIUM

(71) Applicant: HONOR DEVICE CO., LTD., Shenzhen (CN)

(72) Inventor: Jianwei Zhu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/796,623

(22) PCT Filed: Jan. 21, 2022

(86) PCT No.: PCT/CN2022/073173
§ 371 (c)(1),
(2) Date: Jul. 29, 2022

(87) PCT Pub. No.: WO2022/242217
PCT Pub. Date: Nov. 24, 2022

(65) Prior Publication Data
US 2024/0186920 A1 Jun. 6, 2024

(30) Foreign Application Priority Data

May 20, 2021 (CN) .......................... 202110552989.7
May 20, 2021 (CN) .......................... 202110552996.7
(Continued)

(51) Int. Cl.
H02P 6/00 (2016.01)
G06F 3/04847 (2022.01)
(Continued)

(52) U.S. Cl.
CPC .......... *H02P 6/006* (2013.01); *G06F 3/04847* (2013.01); *G06F 3/0488* (2013.01); *H02P 25/06* (2013.01)

(58) Field of Classification Search
CPC ...... H02P 6/006; H02P 25/06; G06F 3/04847; G06F 3/0488; G06F 3/016; H04M 19/047
See application file for complete search history.

(56) References Cited

U.S. PATENT DOCUMENTS 9,245,429 B2    1/2016  Jamal et al.
10,026,276 B2   7/2018  Rank et al.
(Continued)

FOREIGN PATENT DOCUMENTS

CN    105322842 A    2/2016
CN    106059440 A    10/2016
(Continued)

OTHER PUBLICATIONS

Jonghyun Ryu+posVibEditor;"Graphical authoring tool of vibrotactile patterns";2008 IEEE International Workshop on Haptic Audio visual Environments and Games;Oct. 18, 2008;6 pages.

*Primary Examiner* — Mohamad A Musleh
(74) *Attorney, Agent, or Firm* — WOMBLE BOND DICKINSON (US) LLP

(57) ABSTRACT

Embodiments of this application provide a method and apparatus for controlling a linear motor, a device, and a readable storage medium. The method for controlling a linear motor includes: determining, in response to an operation instruction, a vibration description file of an operation object of the operation instruction; and outputting a vibration sense that meets a waveform requirement of the vibration description file, where the vibration sense is provided by a linear motor in a first vibration state, and the first vibration state matches an attribute of the linear motor.

19 Claims, 24 Drawing Sheets

S501

Determine, in response to an operation instruction, a vibration description file of an operation object of the operation instruction

S502

Output a vibration sense that meets a waveform requirement of the vibration description file, where the vibration sense is provided by a linear motor in a first vibration state, and the first vibration state matches an attribute of the linear motor

(30) Foreign Application Priority Data

| May 20, 2021 | (CN) | ......................... 202110553942.2 |
| May 20, 2021 | (CN) | ......................... 202110553954.5 |
| May 20, 2021 | (CN) | ......................... 202110553961.5 |
| May 20, 2021 | (CN) | ......................... 202110553963.4 |
| Jun. 16, 2021 | (CN) | ......................... 202110668263.X |

(51) Int. Cl.
    *G06F 3/0488*    (2022.01)
    *H02P 25/06*    (2016.01)

(56) References Cited

U.S. PATENT DOCUMENTS

| 10,394,326 B2 | 8/2019 | Ono et al. |
| 10,965,803 B2 | 3/2021 | Li et al. |

| 2005/0237011 A1 | 10/2005 | Woods et al. |
| 2019/0391653 A1 | 12/2019 | Ono et al. |
| 2021/0110841 A1 | 4/2021 | Maximilian et al. |

FOREIGN PATENT DOCUMENTS

| CN | 106133650 A | | 11/2016 |
| CN | 108881615 A | * | 11/2018 |
| CN | 109887528 A | | 6/2019 |
| CN | 111030412 A | | 4/2020 |
| CN | 111552377 A | | 8/2020 |
| CN | 111966211 A | | 11/2020 |
| CN | 112269895 A | * | 1/2021 |
| CN | 112506341 A | | 3/2021 |
| EP | 2743800 A2 | | 6/2014 |
| EP | 2846221 A1 | | 3/2015 |
| WO | 2018223535 A1 | | 12/2018 |

\* cited by examiner

METHOD AND APPARATUS FOR CONTROLLING LINEAR MOTOR, DEVICE, AND READABLE STORAGE MEDIUM

CROSS-REFERENCE TO RELATED APPLICATIONS

This application is a national stage of International Application No. PCT/CN2022/073173, filed on Jan. 21, 2022, which claims priority to Chinese Patent Application No. 202110553963.4 filed on May 20, 2021, and Chinese Patent Application No. 202110552989.7 filed on May 20, 2021, and Chinese Patent Application No. 202110553942.2 filed on May 20, 2021, and Chinese Patent Application No. 202110553954.5 filed on May 20, 2021, and Chinese Patent Application No. 202110552996.7 filed on May 20, 2021, and Chinese Patent Application No. 202110553961.5 filed on May 20, 2021, and Chinese Patent Application No. 202110668263.X filed on Jun. 16, 2021. All of the aforementioned applications are hereby incorporated by reference in their entireties.

TECHNICAL FIELD

This application relates to the field of data processing technologies, and in particular, to a method and apparatus for controlling a linear motor, a device, and a readable storage medium.

BACKGROUND

Linear motors may be basically divided into X-axis linear motors and Z-axis linear motors according to different travel directions. Different types of linear motors require different control methods. Moreover, even for the same type of linear motors, due to different operating parameters thereof, different control methods are required. In this way, there is a problem of poor universality in the existing solution for controlling linear motors.

SUMMARY

In view of this, the embodiments of this application provide a method and apparatus for controlling a linear motor, a device, and a storage medium, to implement universal control of linear motors.

To achieve the foregoing objective, the embodiments of this application provide the following technical solutions:

According to a first aspect, this application provides a method for controlling a linear motor, applicable to an electronic device. The electronic device includes a linear motor. The method includes: determining, in response to an operation instruction, a vibration description file of an operation object of the operation instruction; and outputting a vibration sense that meets a waveform requirement of the vibration description file, where the vibration sense is provided by a linear motor in a first vibration state, and the first vibration state matches an attribute of the linear motor.

As can be learned from the content of the first aspect, the first vibration state matches the attribute of the linear motor, thereby achieve the universal control of the linear motor.

In a possible implementation, the outputting a vibration sense that meets a waveform requirement of the vibration description file includes: outputting a vibration sense corresponding to a waveform that has a first change trend within a startup time and has a second change trend within a stop time, where the first change trend is that an amplitude of a steady-state waveform changes smoothly from zero to an amplitude of a linear motor stable vibration state, and the second change trend is that the amplitude of the steady-state waveform changes smoothly from the amplitude of the linear motor stable vibration state to zero.

As can be learned from the content above, within the startup time, the amplitude of the linear motor changes smoothly from zero to the amplitude of the linear motor stable vibration state; and within the stop time, the amplitude of the linear motor changes smoothly from the amplitude of the linear motor stable vibration state to zero, so that the linear motor can be controlled to run smoothly within the startup time and the stop time to overcome the overdrive problem.

In a possible implementation, the outputting a vibration sense that meets a waveform requirement of the vibration description file, where the vibration sense is provided by a linear motor in a first vibration state, and the first vibration state matches an attribute of the linear motor includes: outputting a vibration sense corresponding to a steady-state waveform whose frequency is a target frequency, where the target frequency is mapped from a frequency of a steady-state waveform of the vibration description file according to a preset first mapping rule and a frequency of the linear motor; and/or outputting a vibration sense corresponding to a waveform sequence, where a frequency of the waveform sequence is the same as a frequency of a transient waveform of the vibration description file, and a frequency of a target transient waveform is adapted to the linear motor.

In a possible implementation, the process of outputting a vibration sense that meets a waveform requirement of the vibration description file further includes: obtaining, in response to an interruption event, the vibration description file corresponding to the interruption event, where the vibration description file is used for describing a vibration parameter; and adjusting the vibration sense to a vibration sense corresponding to the interruption event, where the vibration sense corresponding to the interruption event meets the waveform requirement of the vibration description file corresponding to the interruption event.

In a possible implementation, a process of generating the vibration description file of the operation object includes: displaying, in response to an operation instruction on an import control in an interaction interface, a basic waveform of the operation object in the interaction interface, where the operation object includes at least one of a multimedia file or a scene vibration sense waveform; displaying an adjusted waveform in response to an adjustment instruction on the basic waveform in the interaction interface; and generating the vibration description file of the operation object in response to an operation instruction on a generation control in the interaction interface.

In a possible implementation, the displaying an adjusted waveform in response to an adjustment instruction on the basic waveform in the interaction interface includes: displaying, in response to an operation instruction on a preset adjustment point on the basic waveform displayed in the interaction interface, an adjustment point on the basic waveform; and displaying, in response to a drag instruction on the adjustment point in a first vibration parameter adjustment mode, a waveform after a first vibration parameter is adjusted, where the first vibration parameter includes an amplitude and/or a frequency.

In a possible implementation, the basic waveform includes a steady-state waveform, and the first vibration parameter further includes a time parameter; and the displaying, in response to a drag instruction on the adjustment point in a first vibration parameter adjustment mode, a waveform after a first vibration parameter is adjusted includes: displaying, in response to the drag instruction on the adjustment point on a time axis in a time adjustment mode, the waveform after the time parameter is adjusted.

In a possible implementation, the displaying an adjusted waveform in response to an adjustment instruction on the basic waveform in the interaction interface includes: displaying, in response to a drag instruction on the waveform displayed in the interaction interface, the waveform after a time parameter is adjusted.

In a possible implementation, the displaying an adjusted waveform in response to an adjustment instruction on the basic waveform in the interaction interface includes: displaying, in response to an instruction of dragging a plurality of waveforms to a state in which time ranges overlap in the interaction interface, the waveform after the plurality of waveforms are superimposed.

According to a second aspect, this application provides an apparatus for controlling a linear motor, applicable to an electronic device. The electronic device includes a linear motor. The apparatus includes: a determining unit, configured to determine, in response to an operation instruction, a vibration description file of an operation object of the operation instruction; and an output unit, configured to output a vibration sense that meets a waveform requirement of the vibration description file, where the vibration sense is provided by a linear motor in a first vibration state, and the first vibration state matches an attribute of the linear motor.

According to a third aspect, this application provides an electronic device, including:
one or more processors; and
a memory, storing a program, where
the program, when executed by the one or more processors, causes the one or more processors to implement the method for controlling a linear motor according to the first aspect or any of the possible implementations thereof, to drive the linear motor to run.

According to a fourth aspect, this application provides a readable storage medium, storing a computer program, where the computer program, when executed by a processor, implements the method for controlling a linear motor according to the first aspect or any of the possible implementations thereof, to drive the linear motor to run.

BRIEF DESCRIPTION OF DRAWINGS

FIG. 3b is an exemplary flowchart of implementing a function by the software architecture shown in FIG. 3a;

DESCRIPTION OF EMBODIMENTS

The technical solutions of the embodiments of the present invention are clearly and completely described below with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In this application, the term "include", "comprise", or any other variant is intended to cover non-exclusive include, so that a process, a method, an article, or a device that includes a series of elements and that not only includes such elements, but also includes other elements not explicitly listed, or may further include elements inherent in the process, the method, the article, or the device. Unless otherwise specified, an element limited by "include a/an . . . " does not exclude other same elements existing in the process, the method, the article, or the device that includes the element.

A linear motor is disposed in an electronic device, and is configured to vibrate to enable the electronic device to output a vibration sense. In different scenarios of the electronic device, the linear motor is controlled to vibrate to produce different vibration effects, so that the user senses the vibration sense, to prompt the user or provide feedback on a user operation, which is specifically as follows:
1. Different service scenarios (for example, a time prompt, information receiving, a call, an alarm clock, and a game) may correspond to different vibration effects.
2. A vibration effect is feedback to a touch operation. For example, touch operations performed on different applications (for example, photo taking and audio playing) may correspond to different vibration effects. Touch operations performed on different regions of a display screen may also correspond to different vibration effects.

Figure 1A:
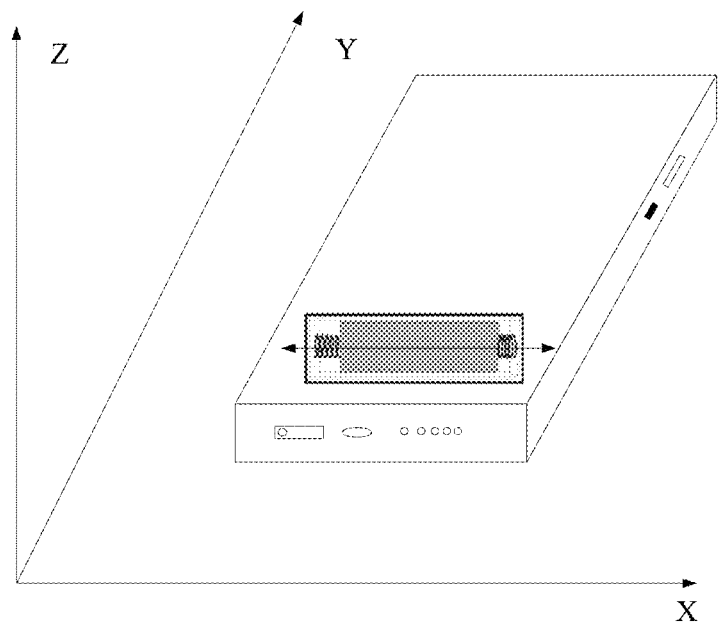
FIG. 1a is an exemplary diagram of a structure and application of an X-axis linear motor.
Figure 1B:
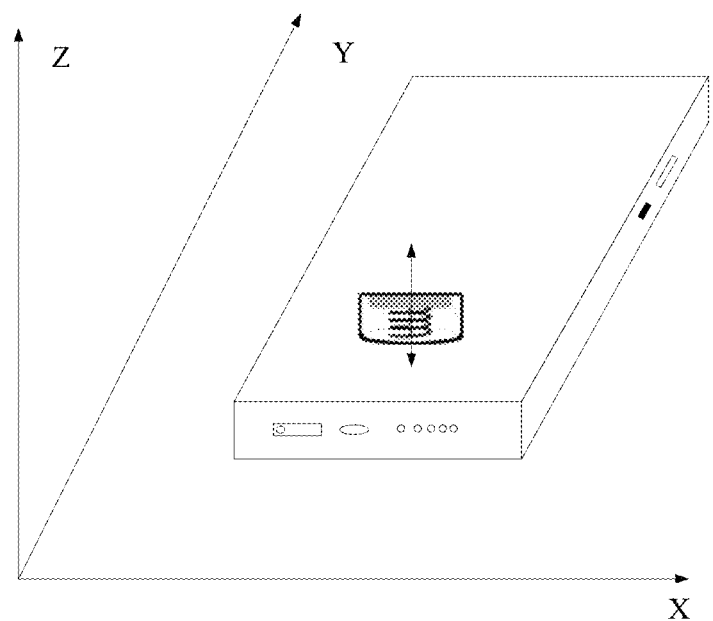
FIG. 1b is an exemplary diagram of a structure and application of a Z-axis linear motor.

Linear motors commonly used in electronic devices include X-axis linear motors (or referred to as square or lateral linear motors) and Z-axis linear motors (or referred to as circular or longitudinal linear motors). FIG. 1a is an exemplary diagram of a structure and application of an X-axis linear motor, and FIG. 1b is an exemplary diagram of a structure and application of a Z-axis linear motor.

As shown in FIG. 1a, the X-axis linear motor is in the form of a long bar or square. It is assumed that the X-axis is a horizontal axis, the Y-axis is a vertical axis, and the Z-axis is a vertical axis perpendicular to the X-axis and the Y-axis, a rotor of the X-axis linear motor may move in the X-axis or Y-axis direction according to the placement direction, and can achieve a longer stroke. When mounted in the X-axis direction in the electronic device, the X-axis linear motor can provide a vibration sense in the X-axis direction; and when mounted in the Y-axis direction, the Y-axis direction can provide a vibration sense in the Y-axis direction.

As shown in FIG. Tb, the Z-axis linear motor is cylindrical and a rotor thereof may move in the Z-axis direction. The Z-axis linear motor is disposed in the electronic device and can provide a vibration sense in a thickness direction of the electronic device.

The method for controlling a linear motor disclosed in the embodiments of this application is applied to an electronic device equipped with a linear motor. The electronic device equipped with a linear motor may be a device such as a mobile phone, a tablet computer, a desktop computer, a laptop computer, a notebook computer, an ultra-mobile personal computer (Ultra-Mobile Personal Computer, UMPC), a handheld computer, a netbook, a personal digital assistant (Personal Digital Assistant, PDA), a wearable electronic device, or a smartwatch.

Figure 2:
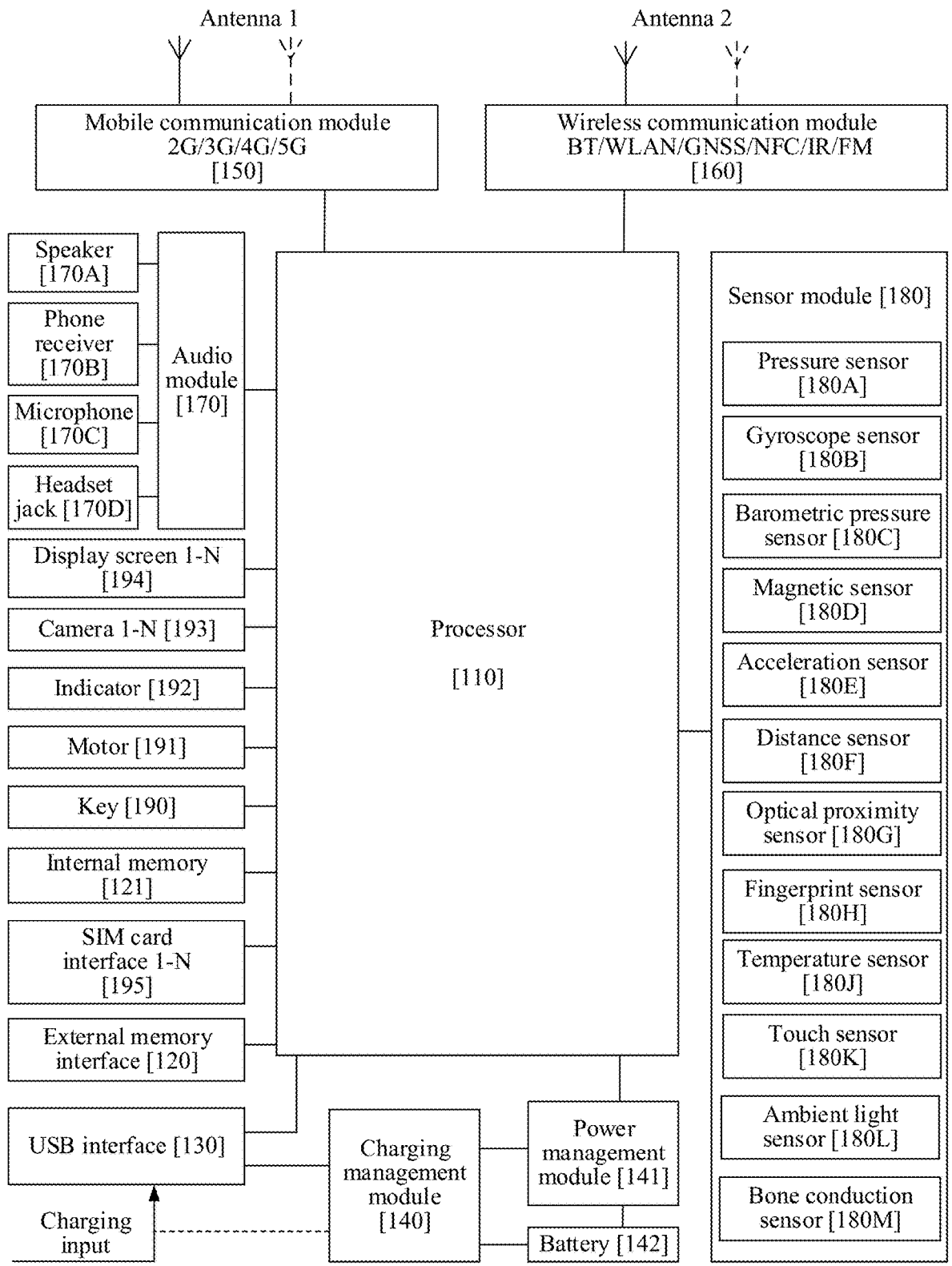
FIG. 2 is a schematic structural diagram of an electronic device according to an embodiment of this application.

The electronic device shown in FIG. 2 includes: a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headsetjack 170D, a sensor module 180, a key 190, a motor 191, an indicator 192, a camera 193, a display screen 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that the schematic structure in this embodiment constitutes no specific limitation on the electronic device. In some other embodiments, the electronic device may include more or fewer components than those shown in the figure, or some components may be combined, or some components may be split, or components are arranged in different manners. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device. The controller may generate an operating control signal according to an instruction operation code and a sequence signal, to complete control of fetching and executing an instruction.

A memory may be further configured in the processor 110, to store an instruction and data. In some embodiments, the memory in the processor 110 is a cache. The memory may store an instruction or data that has just been used or cyclically used by the processor 110. If the processor 110 needs to use the instruction or the data again, the processor may directly invoke the instruction or the data from the memory, to avoid repeated access and reduce a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be coupled to the touch sensor 180K, a charger, a flash light, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the electronic device.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transfer an audio signal to the wireless communication module 160 by using the I2S interface, to implement a function of answering a call by using a Bluetooth headset.

The PCM interface may also be used for audio communication, and sampling, quantization, and encoding of an analog signal. In some embodiments, the audio module 170 may be coupled to the wireless communication module 160 by using the PCM bus interface. In some embodiments, the audio module 170 may alternatively transfer an audio signal to the wireless communication module 160 by using the PCM interface, to implement the function of answering a call by using a Bluetooth headset. Both the I2S interface and the PCM interface may be used for audio communication.

The UART interface is a universal serial data bus used for asynchronous communication. The bus may be a two-way communication bus. The bus converts to-be-transmitted data between serial communication and parallel communication. In some embodiments, the UART interface is generally configured to connect the processor 110 and the wireless communication module 160. For example, the processor 110 communicates with a Bluetooth module in the wireless communication module 160 by using a UART interface, to implement a Bluetooth function. In some embodiments, the audio module 170 may transfer an audio signal to the wireless communication module 160 by using a UART interface, to implement a function of playing music by using a Bluetooth headset.

The MIPI interface may be configured to connect the processor 110 to a peripheral device such as the display screen 194 and the camera 193. The MIPI interface includes a camera serial interface (camera serial interface, CSI), a display serial interface (display serial interface, DSI), and the like. In some embodiments, the processor 110 communicates with the camera 193 by using the CSI interface, to implement a photographing function of the electronic device. The processor 110 communicates with the display screen 194 by using a DSI interface, to implement a display function of the electronic device.

The GPIO interface may be configured through software. The GPIO interface may be configured to transmit a control signal, or may be configured to transmit a data signal. In some embodiments, the GPIO interface may be configured to connect the processor 110 to the camera 193, the display screen 194, the wireless communication module 160, the audio module 170, the sensor module 180, and the like. The GPIO interface may also be configured as an I2C interface, an I2S interface, a UART interface, an MIPI interface, and the like.

The USB interface 130 is an interface that conforms to a USB standard specification, and may be specifically a mini USB interface, a micro USB interface, a USB Type C interface, or the like. The USB interface 130 may be configured to connect to the charger to charge the electronic device, or may be used for data transmission between the electronic device and a peripheral device, The USB interface may also be connected to a headset to play audios through the headset. The interface may alternatively be configured to connect to another electronic device such as an AR device.

It may be understood that an interface connection relationship between the modules illustrated in this embodiment is merely an example for description, and does not constitute a limitation on a structure of the electronic device. In some other embodiments of this application, the electronic device may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger by using the USB interface 130. In some embodiments of wireless charging, the charging management module 140 may receive a wireless charging input by using a wireless charging coil of the electronic device. The charging management module 140 may supply power to the electronic device by using the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, the display screen 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may be alternatively disposed in the processor 110. In some other embodiments, the power management module 141 and the charging management module 140 may further be configured in the same device.

A wireless communication function of the electronic device may be implemented by using the antenna 1, the antenna 2, the mobile communication module 150, the wireless communication module 160, the modem processor, the baseband processor, and the like.

The antenna 1 and the antenna 2 are configured to transmit or receive an electromagnetic wave signal. Each antenna in the electronic device may be configured to cover one or more communication frequency bands. Different antennas may also be multiplexed to improve utilization of the antennas. For example, the antenna 1 may be multiplexed as a diversity antenna of a wireless local area network. In some other embodiments, the antenna may be used in combination with a tuning switch.

The mobile communication module 150 may provide a solution to wireless communication such as 2G/3G/4G/5G applied to the electronic device. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in the same device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Next, the demodulator transmits the demodulated low-frequency baseband signal to the baseband processor for processing. The low-frequency baseband signal is processed by the baseband processor and then transmitted to an AP. The AP outputs a sound signal through an audio device (which is not limited to the speaker 170A, the phone receiver 170B, and the like), or displays an image or a video through the display screen 194. In some embodiments, the modem processor may be an independent device. In some other embodiments, the modem processor may be independent of the processor 110, and the modem processor and the mobile communication module 150 or another functional module may be disposed in the same component.

The wireless communication module 160 may provide a solution for wireless communication including a wireless local area network (wireless local area network, WLAN) (for example, a wireless fidelity (wireless fidelity, Wi-Fi) network), Bluetooth (Bluetooth, BT), and a global navigation satellite system (global navigation satellite system, GNSS), frequency modulation (frequency modulation, FM), a near field communication (near field communication, NFC) technology, an infrared (infrared, IR) technology, and the like to be applied to the electronic device. The wireless communication module 160 may be one or more components into which at least one communication processing module is integrated. The wireless communication module 160 receives an electromagnetic wave by using the antenna 2, performs frequency modulation and filtering processing on an electromagnetic wave signal, and sends a processed signal to the processor 110. The wireless communication module 160 may alternatively receive a to-be-sent signal from the processor 110, perform frequency modulation and amplification on the to-be-sent signal, and convert the signal into an electromagnetic wave for radiation by using the antenna 2.

In some embodiments, in the electronic device, the antenna 1 is coupled to the mobile communication module 150, and the antenna 2 is coupled to the wireless communication module 160, so that the electronic device may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), and a Beidou navigation satellite system (Beidou navigation satellite system, BDS), a quasi-zenith satellite system (quasi-zenith satellite system, QZSS), and/or a satellite based augmentation system (satellite based augmentation system, SBAS).

The electronic device implements a display function by using the GPU, the display screen 194, the application processor, and the like. The GPU is a microprocessor for image processing, and is connected to the display screen 194 and the application processor. The GPU is configured to perform mathematical and geometric calculation, and is configured to render graphics. The processor 110 may include one or more GPUs, and execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini LED, a micro LED, a micro-OLED, a quantum dot light emitting diode (quantum dot light emitting diode, QLED), or the like. In some embodiments, the electronic device may include one or N display screens 194, and N is a positive integer greater than 1.

The display screen 194 of the electronic device may display a series of graphical user interfaces (graphical user interface, GUI), which are home screens of the electronic device. Generally, the size of the display screen 194 of the electronic device is fixed, and only a limited quantity of controls can be displayed on the display screen 194 of the electronic device. A control is a GUI element, which is a software component that is included in an application and controls all data processed by the application and the interaction operations about the data. The user may interact with the control through direct manipulation (direct manipulation) to read or edit information about the application. Generally, a control may include visual interface elements such as icons, keys, menus, tabs, text boxes, dialog boxes, status bars, navigation bars, and widgets. For example, in the embodiments of this application, the display screen 194 may display a virtual key.

The electronic device may implement a photographing function by using the ISP, the camera 193, the video codec, the GPU, the display screen 194, the AP, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may also perform algorithm optimization on image noise point, brightness, and skin tone. The ISP may alternatively optimize parameters such as exposure and a color temperature of a photographing scenario. In some embodiments, the ISP may be arranged in the camera 193.

The camera 193 is configured to capture a static image or a video. An optical image of an object is generated through a lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in RGB and YUV formats. In some embodiments, the electronic device may include one or N cameras 193, and N is a positive integer greater than 1.

The DSP is configured to process a digital signal, and may further process another digital signal in addition to a digital image signal. For example, when the electronic device performs frequency selection, the DSP is configured to perform Fourier transform and the like on frequency energy.

The video codec is configured to compress or decompress a digital video. The electronic device may support one or more video codecs. In this way, the electronic device may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, and quickly processes input information by using a biological neural network structure such as a mode of transmission between human-brain nerve cells, and may further constantly perform self-learning. The NPU may be used to implement an application such as intelligent cognition of the electronic device, for example, image recognition, facial recognition, voice recognition, and text understanding.

The external memory interface 120 may be configured to connect to an external storage card, for example, a micro SD card, to expand a storage capability of the electronic device. The external storage card communicates with the processor 110 by using the external memory interface 120, so as to implement a data storage function, such as storing a file such as a music or a video in the external storage card.

The internal memory 121 may be configured to store computer executable program code, and the executable program code includes instructions. The processor 110 runs the instruction stored in the internal memory 121, to perform various function applications and data processing of the electronic device 100. The internal memory 121 may include a program storage region and a data storage region. The program storage region may store an operating system, an application program required by at least one function (for example, a voice playing function or an image playing function), and the like. The data storage region may store data (for example, audio data and an address book) and the like created when the electronic device 100 is used. In addition, the internal memory 121 may include a high-speed random access memory, or may include a non-volatile memory such as at least one magnetic disk memory, a flash memory, or a universal flash storage (universal flash storage, UFS).

In the embodiments of this application, the internal memory 121 stores instructions for executing the method for controlling a linear motor. The processor 110 may implement universal control of the linear motor by executing instructions stored in the internal memory 121.

The electronic device may implement an audio function by using the audio module 170, the loudspeaker 170A, the phone receiver 170B, the microphone 170C, the headset jack 170D, the application processor, and the like. The audio function is, for example, music playing or recording.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be arranged in the processor 110, or some functional modules of the audio module 170 are arranged in the processor 110.

The speaker 170A, also referred to as a "horn", is configured to convert an audio electrical signal into a sound signal. The electronic device may be used to listen to music or answer a call in a hands-free mode by using the loudspeaker 170A.

The phone receiver 170B, also referred to as a "receiver", is configured to convert an audio electrical signal into a sound signal. When the electronic device is configured to answer a call or receive voice information, the phone receiver 170B may be put close to a human ear to receive a voice.

The microphone 170C, also referred to as a "mouthpiece" or a "megaphone", is configured to convert a sound signal into an electrical signal. When making a call or sending voice information, the user may make a sound near the microphone 170C through the mouth of the user, to input a sound signal into the microphone 170C. At least one microphone 170C may be disposed in the electronic device. In some other embodiments, two microphones 170C may be disposed in the electronic device, to collect a sound signal and implement a noise reduction function. In some other embodiments, three, four, or more microphones 170C may be alternatively disposed in the electronic device, to collect a sound signal, implement noise reduction, recognize a sound source, implement a directional recording function, and the like.

The headsetjack 170D is configured to connect to a wired headset. The headsetjack 170D may be a USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display screen 194. There are a plurality of types of pressure sensors 180A, for example, a resistive pressure sensor, an inductive pressure sensor, and a capacitive pressure sensor. The capacitive pressure sensor may include at least two parallel plates having conductive materials. When force is exerted on the pressure sensor 180A, capacitance between electrodes changes. The electronic device determines strength of pressure based on a change of the capacitance. When a touch operation is performed on the display screen 194, the electronic device detects strength of the touch operation by using the pressure sensor 180A. The electronic device may further calculate a position of the touch based on a detection signal of the pressure sensor 180A. In some embodiments, touch operations that are performed on a same touch position but have different touch operation strength may correspond to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the SMS message application icon, an instruction of creating a new SMS message is executed.

The gyroscope sensor 180B may be configured to determine a motion posture of the electronic device. In some embodiments, an angular velocity of the electronic device around three axes (that is, x, y, and z axes) may be determined by using the gyroscope sensor 180B. The gyroscope sensor 180B may be used for image stabilization during photographing. For example, when the shutter is pressed, the gyro sensor 180B detects an angle at which the electronic device jitters, and calculates, based on the angle, a distance for which a lens module needs to compensate, and allows the lens to cancel the jitter of the electronic device through reverse motion, thereby implementing image stabilization. The gyro sensor 180B may also be used in navigation and a motion sensing game scene.

The barometric pressure sensor 180C is configured to measure barometric pressure. In some embodiments, the electronic device calculates an altitude by using a barometric pressure value measured by the barometric pressure sensor 180C, to assist in positioning and navigation.

The magnetic sensor 180D includes a Hall sensor. The electronic device may detect opening and closing of a flip leather case by using the magnetic sensor 180D. In some embodiments, when the electronic device is a clamshell phone, the electronic device may detect opening and closing of a flip cover based on the magnetic sensor 180D. Further, based on a detected opening or closing state of the leather case or a detected opening or closing state of the flip cover, a feature such as automatic unlocking of the flip cover is set.

The acceleration sensor 180E may detect acceleration values of the electronic device in all directions (generally in three axes). When the electronic device is stationary, a magnitude and a direction of gravity may be detected. The acceleration sensor may be further configured to recognize a posture of the electronic device, and is applied to an application such as switching between landscape orientation and portrait orientation or a pedometer.

The distance sensor 180F is configured to measure a distance. The electronic device may measure a distance through infrared or laser. In some embodiments, in a photographing scenario, the electronic device may measure a distance by using the distance sensor 180F, to implement quick focusing.

The optical proximity sensor 180G may include, for example, a light-emitting diode (LED) and an optical detector such as a photodiode. The light emitting diode may be an infrared light emitting diode. The electronic device may emit infrared light by using the light-emitting diode. The electronic device detects infrared reflected light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, by using the optical proximity sensor 180G, that the user holds the electronic device close to an ear for a call, so that automatic screen-off is implemented to achieve power saving. The optical proximity sensor 180G may be further configured to automatically unlock and lock the screen in a leather cover mode and a pocket mode.

The ambient light sensor 180L is configured to sense luminance of ambient light. The electronic device may adaptively adjust a luminance of the display screen 194 according to sensed brightness of the ambient light. The ambient light sensor 180L may be further configured to automatically adjust white balance during photo taking. The ambient light sensor 180L may further cooperate with the optical proximity sensor 180G to detect whether the electronic device is in a pocket, so as to prevent an accidental touch.

The fingerprint sensor 180H is configured to collect a fingerprint. The electronic device may implement fingerprint unlock, application lock accessing, fingerprint photographing, fingerprint-based call answering, and the like by using a feature of the collected fingerprint.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device reduces performance of a processor near the temperature sensor 180J, to reduce power consumption and implement heat protection. In some other embodiments, when the temperature is lower than another threshold, the electronic device heats the battery 142, to avoid an abnormal shutdown of the electronic device caused by a low temperature. In some other embodiments, when the temperature is lower than still another threshold, the electronic device boosts an output voltage of the battery 142, to avoid an abnormal shutdown caused by a low temperature.

The touch sensor 180K is also referred to as a "touch device". The touch sensor 180K may be disposed on the display screen 194. The touch sensor 180K and the display screen 194 form a display screen, which is also referred to as a "display screen". The touch sensor 180K is configured to detect a touch operation performed on or near the touch sensor 180K. The touch sensor may transmit the detected touch operation to the application processor, to determine a touch event type. The touch sensor may provide a visual output related to the touch operation by using the display screen 194. In some other embodiments, the touch sensor 180K may be alternatively disposed on a surface of the electronic device, and is located on a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may alternatively contact a human pulse, and receive a blood pressure beating signal. In some embodiments, the bone conduction sensor 180M may be alternatively disposed in a headset, to form a bone conduction headset. The audio module 170 may obtain a voice signal through parsing based on the vibration signal, of the vibration bone of the vocal-cord part, that is obtained by the bone conduction sensor 180M, to implement a voice function. The application processor may parse heart rate information based on the blood pressure beating signal obtained by the bone conduction sensor 180M, to implement a heart rate detection function.

The key 190 includes a power key, a volume key, and the like. The key 190 may be a mechanical key, or a touch-type key. The electronic device may receive a key input, and generate a key signal input related to user setting and function control of the electronic device.

The motor 191 may generate a vibration prompt. The motor 191 may be configured to provide a vibration prompt for an incoming call, and may be further configured to provide touch vibration feedback. For example, touch operations performed on different applications (for example, photo taking and audio playing) may correspond to different vibration feedback effects. For touch operations performed on different regions of the flexible display screen 194, the motor 191 may also correspond to different vibration feedback effects. Different application scenarios (for example, a time prompt, information receiving, an alarm clock, and a game) may also correspond to different vibration feedback effects. A touch vibration feedback effect may be further customized.

In the embodiments of this application, there may be a variety of linear motors 191, and the processor 110 executes drive programs of the linear motors to drive the linear motors to run.

The indicator 192 may be an indicator light, and may be configured to indicate a charging state or a battery change, or may be further configured to indicate a message, a missed call, a notification, or the like.

The SIM card interface 195 is configured to connect to a SIM card. The SIM card may be inserted into the SIM card interface 195 or plugged from the SIM card interface 195, to come into contact with or be separated from the electronic device. The electronic device may support one or N SIM card interfaces. N is a positive integer greater than 1. The SIM card interface 195 can support a nano SIM card, a micro SIM card, a SIM card, and the like. A plurality of cards may all be inserted into the same SIM card interface 195. The plurality of cards may be of the same type or different types. The SIM card interface 195 may further be compatible with different types of SIM cards. The SIM card interface 195 may also be compatible with an external memory card. The electronic device interacts with a network by using a SIM card, to implement functions such as a call and data communication. In some embodiments, the electronic device uses an eSIM, that is, an embedded SIM card. The eSIM card may be embedded in the electronic device and cannot be separated from the electronic device.

Figure 3A:
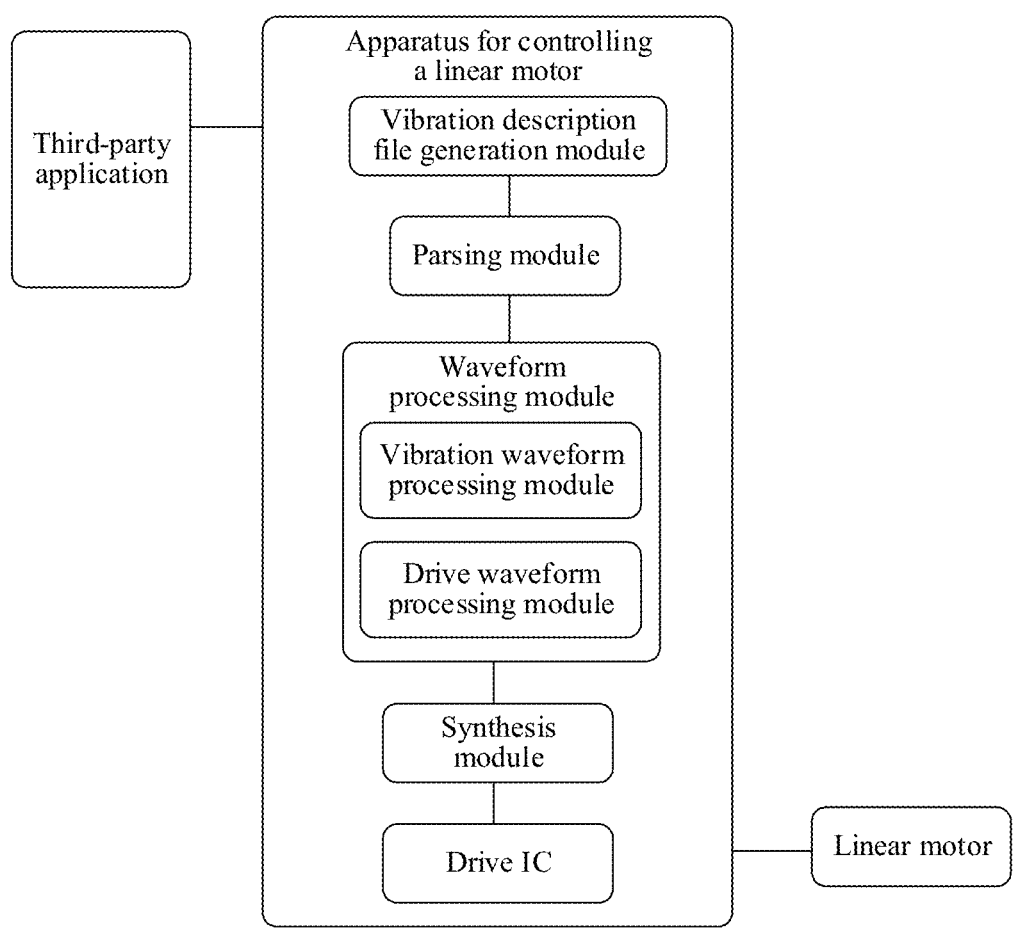
FIG. 3a is an exemplary diagram of a software architecture to which a method for adjusting a vibration waveform of a linear motor is applied according to an embodiment of this application.

Further, FIG. 3a is an example of a software architecture to which a technical solution disclosed in an embodiment of this application is applied. It can be learned with reference to the content of FIG. 3b that:

A vibration description file generation module (capable of interacting with a third-party application) is configured to generate a vibration description file. A parsing module parses the vibration description file, to obtain a file in a json format used for describing a vibration waveform. Waveform processing modules perform waveform processing operations on the file in the json format. Specifically, a vibration waveform processing module first uses a synthetic motor displacement algorithm for operations, to generate a vibration waveform in the form of a displacement bitstream according to the file in the json format and an attribute of the motor. A drive waveform processing module then performs an inverse solution operation on the vibration waveform and the attribute of the motor by using an inverse solution motor voltage drive algorithm to obtain a drive waveform.

The drive waveform obtained through the waveform processing operation by the waveform processing module is synthesized and processed by a synthesis module to obtain an audio bitstream in a format such as pulse code modulation (Pulse Code Modulation, PCM). The audio bitstream is then transmitted to an integrated circuit (Integrated Circuit, IC) through a protocol such as a real-time transport protocol (Real-time Transport Protocol, RTP), and finally acts on the linear motor to control operation of the linear motor.

Figure 3B:
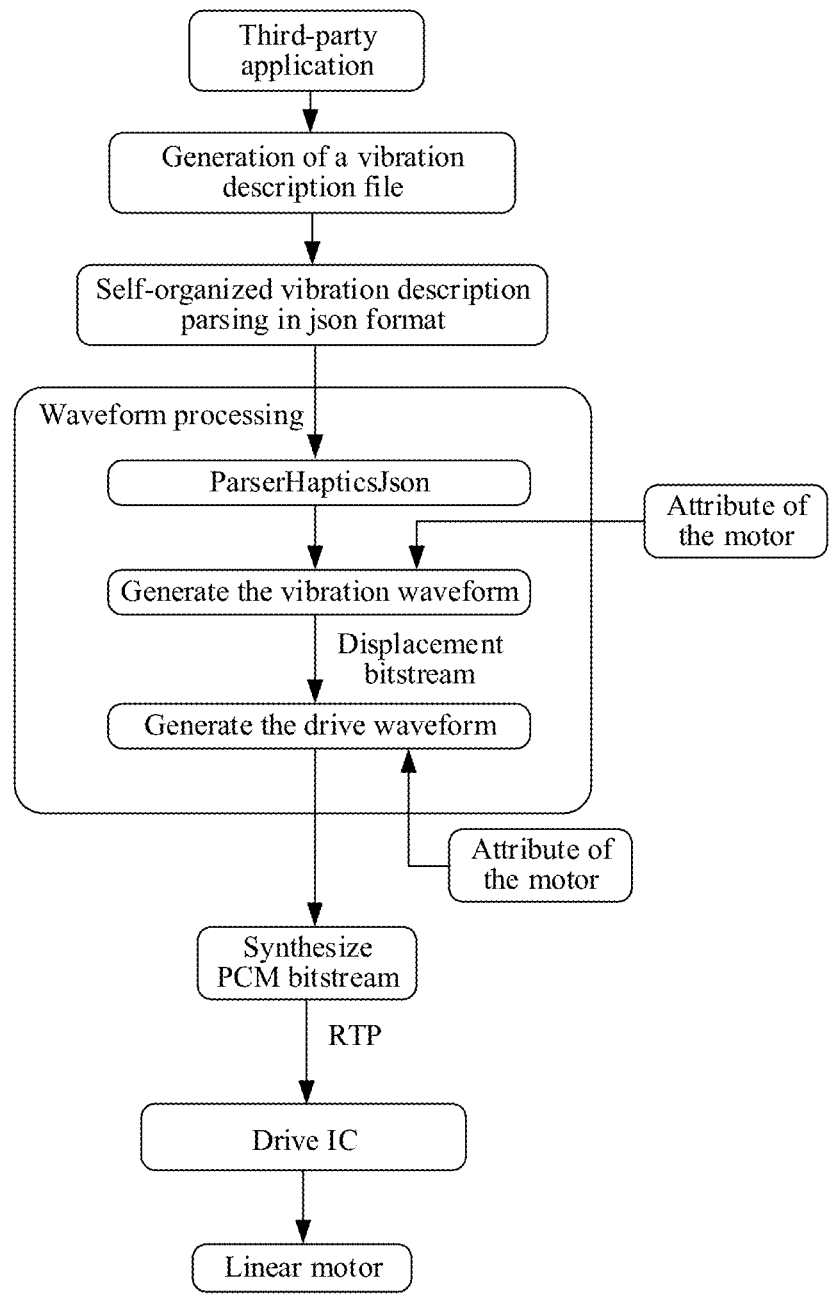

With reference to the structure of the foregoing electronic device, the software architecture shown in FIG. 3a may be stored in the internal memory 121 and invoked by the processor 110 to implement the process described in FIG. 3b.

Working scenarios of the linear motor are described below with reference to several application scenarios. Certainly, the application scenarios described below are only exemplary, and the operating scenarios of the linear motor are not limited thereto.

Figure 4A:
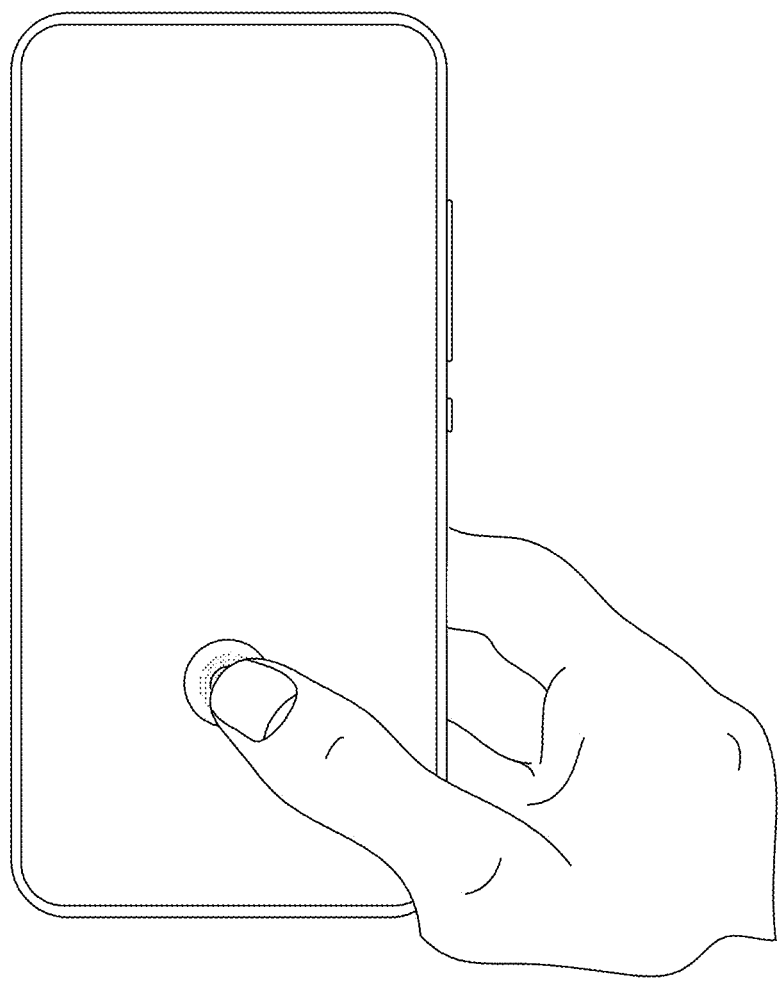
FIG. 4a to FIG. 4d are schematic diagrams of four application scenarios according to an embodiment of this application.

In an application scenario, the user enters an operation instruction to unlock the electronic device. As shown in FIG. 4a, the user enters a touch operation in a fingerprint recognition area on the display screen of the electronic device. A fingerprint of the user is verified, and the electronic device is unlocked when the verification succeeds. In this application scenario, while the finger of the user touches the display screen, the linear motor is driven to provide tactile feedback to the user. The user may feel, through the finger that performs the touch operation, a vibration sense outputted by the linear motor.

Figure 4B:
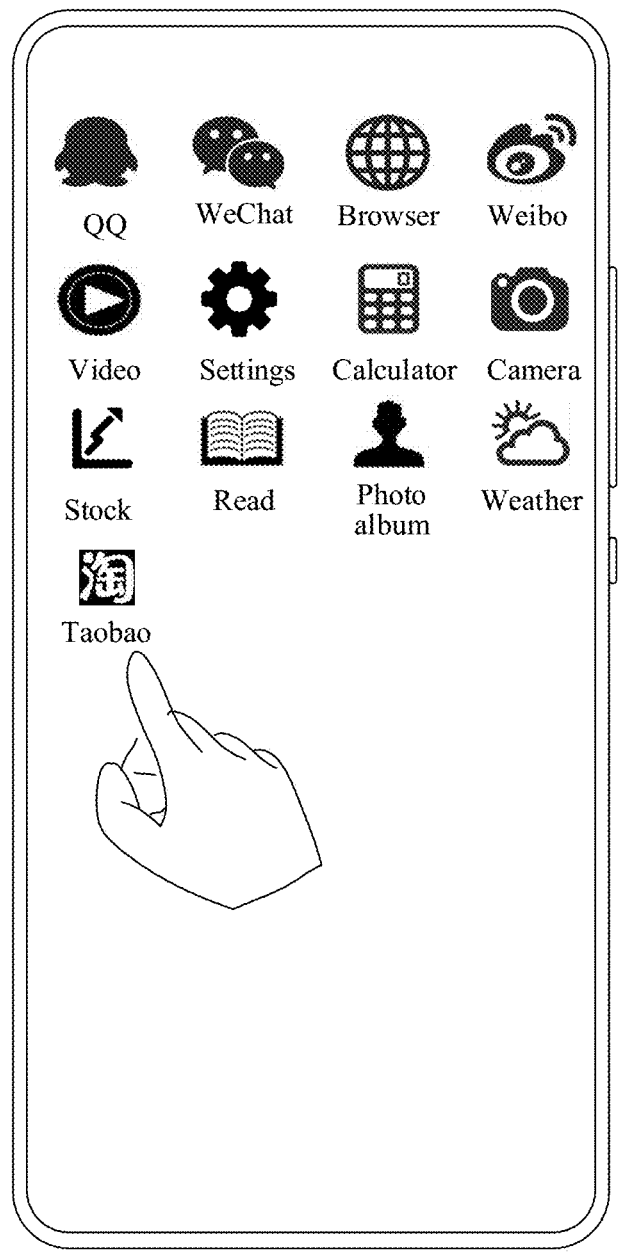

In another application scenario, the user enters an operation instruction to start an application. As shown in FIG. 4b, a plurality of applications (Application, APP) are displayed on the display screen of the electronic device. The finger of the user touches an APP, and the APP is started to output an application interface. Similarly, while the finger of the user touches an APP, the linear motor may also be driven to provide tactile feedback to the user.

Figure 4C:
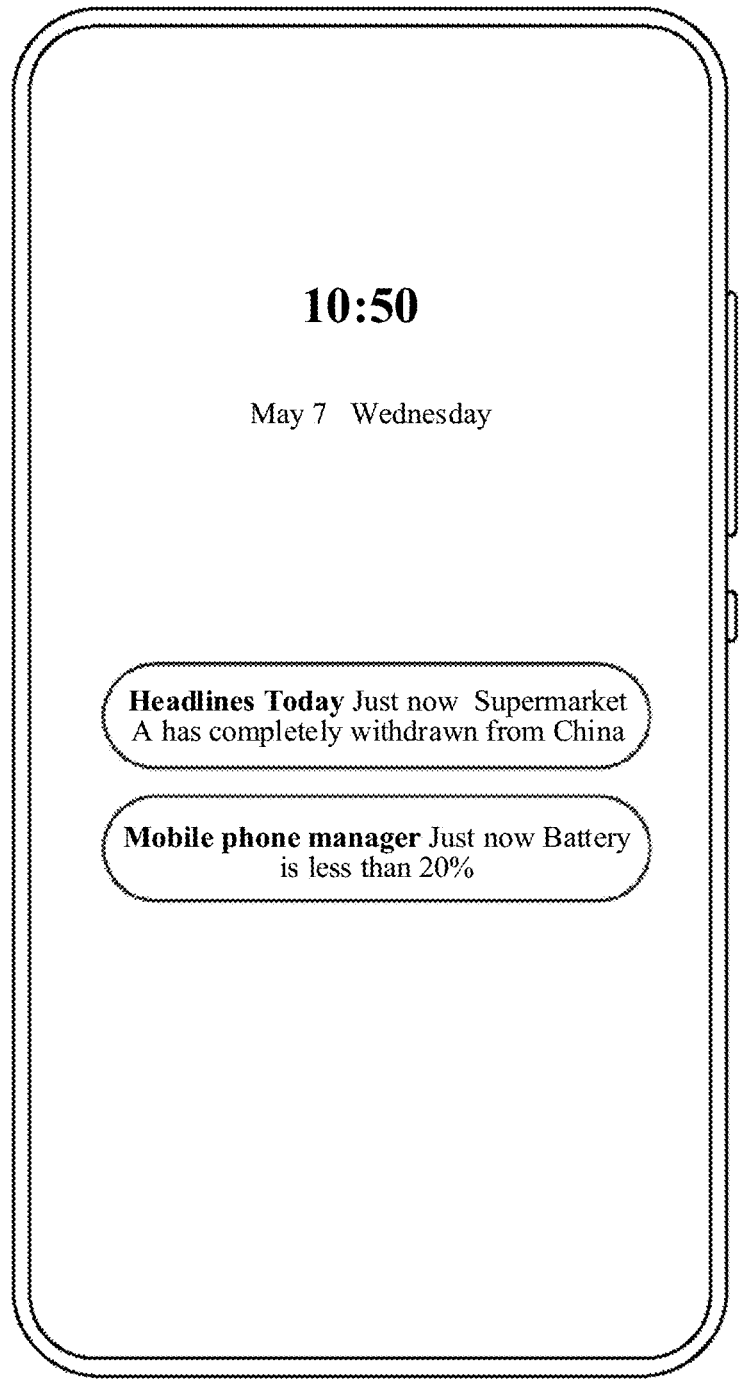

In another application scenario, the electronic device outputs a push message of the application. As shown in FIG. 4c, an application, for example, Headlines Today shown in the figure, keeps a connection with the backend during running. After a push message from the backend is received, an operation instruction is generated to display the push message to the user through the display screen. While the display screen displays the push message, the linear motor may also be driven to provide tactile feedback to the user.

Figure 4D:
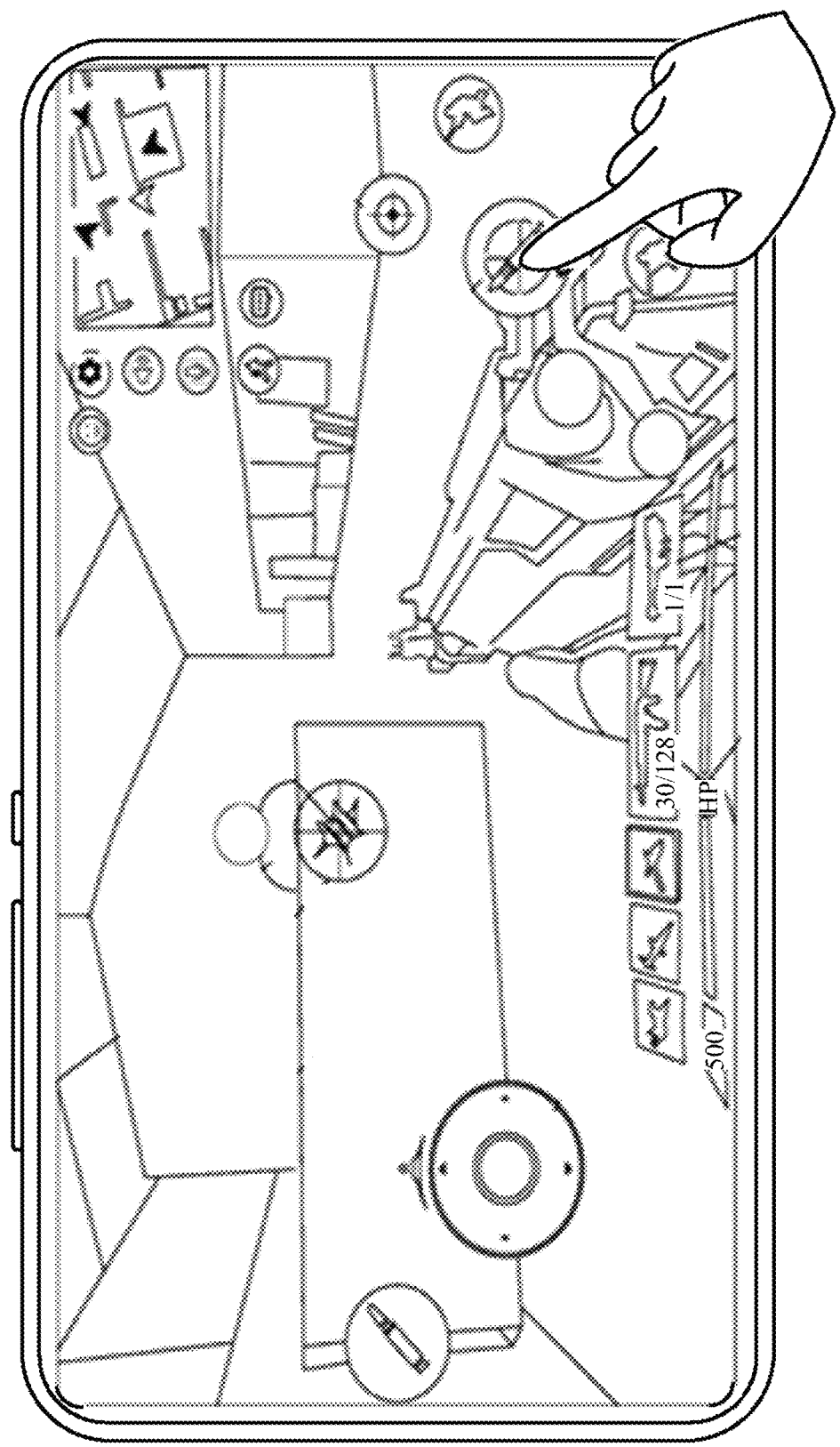

In another application scenario, FIG. 4d shows a game scene. The user touches an object in the game scene, for example, a gun in the figure. To simulate a real scene, while the user enters an operation instruction to control the gun to fire, the linear motor is also driven to provide tactile feedback to the user.

As can be seen from the foregoing application scenarios, after the user enters the operation instruction or the electronic device generates the operation instruction, the linear motor is also driven to run and provide vibration sense to the user in a vibration state.

There are various types of linear motors, and different types of linear motors have different attributes. Even the same linear motors have different attributes due to differences in production process. Based on this, it is necessary to use a universal method for controlling a linear motor, which can drive linear motors with different attributes to run.

Figure 5:
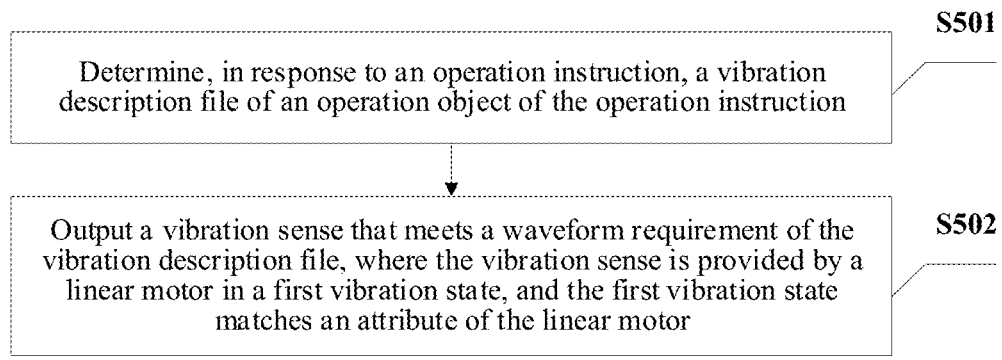
FIG. 5 is a flowchart of a method for controlling a linear motor according to an embodiment of this application.

An embodiment of this application provides a method for controlling a linear motor, applicable to an electronic device. As shown in FIG. 5, the method includes the following steps:

S501: Determine, in response to an operation instruction, a vibration description file of an operation object of the operation instruction.

The operation instruction includes an operation instruction that needs to be inputted for an object in a variety of application scenarios, such as an unlocking instruction inputted by the user in FIG. 4a or an APP start instruction inputted by the user in FIG. 4b. Certainly, the operation instruction may be alternatively a control instruction generated by the electronic device, for example, a push message display instruction generated by the electronic device when the APP in FIG. 4c is connected to the backend, or a playback instruction of audio and video.

The operation instruction acts on the operation object, the electronic device responds to the operation instruction, and the operation object is triggered.

The vibration description file is one of the key elements to control the vibration of the linear motor. The vibration description file is used for describing a vibration waveform of the linear motor. The vibration waveform indicates various vibration parameters, such as an amplitude and a frequency, in the vibration process of the motor. As can be seen, the function of the vibration description file is to indicate how the motor vibrates. The triggering of the operation object requires the linear motor to output vibration, so that the operation object is configured with the vibration description file.

S502: Output a vibration sense that meets a waveform requirement of the vibration description file, where the vibration sense is provided by a linear motor in a first vibration state, and the first vibration state matches an attribute of the linear motor.

Driving the linear motor according to the vibration description file of the operation object is to require the linear motor to vibrate, so that the electronic device provides the vibration sense that meets the waveform requirement of the vibration description file. However, due to an attribute difference of the linear motor, a vibration state corresponding to the vibration of the linear motor needs to match an attribute of the linear motor.

In this way, when the linear motor is controlled to run in various application scenarios, the vibration state of the linear motor is adjusted, so that the linear motor can provide a vibration sense according to a vibration state that matches an attribute thereof, thereby implementing universal control of the linear motor with different attributes.

As described above, the vibration description file is one of the key elements to control the vibration of the linear motor. The vibration description file is used for describing a vibration waveform of the linear motor. The vibration waveform indicates various vibration parameters, such as an amplitude and a frequency, in the vibration process of the motor. As can be seen, the function of the vibration description file is to indicate how the motor vibrates. Therefore, the user can configure an expected vibration effect through the vibration description file.

At present, the vibration description file is generated by technicians through handwritten code, which not only has high technical threshold and low efficiency, but also has the following problems:

With the development of terminals, there is a need to expand the function of terminals and improve the user experience of the terminals. As the scenarios described above, the vibration function has a large expansion space, and the expansion of the vibration function is conducive to improving the user experience.

Due to complexity and diversity of the service scenarios of terminals, it is difficult for technicians to pre-write vibration description files for each service scenario. Moreover, due to the high technical threshold for writing vibration description files, it is difficult for a user of a terminal to customize a vibration description file required for a service scenario in this manner.

As can be seen, the current manner of obtaining a vibration description file has become a constraint on expanding the vibration function and improving the user experience.

Therefore, an embodiment of this application provides a method and apparatus for generating a vibration description file, to lower the technical threshold for obtaining a vibration description file, improve the efficiency of obtaining a vibration description file, and mitigate the contradiction between obtaining a vibration description file and expanding the vibration function and improving the user experience.

Figure 6A:
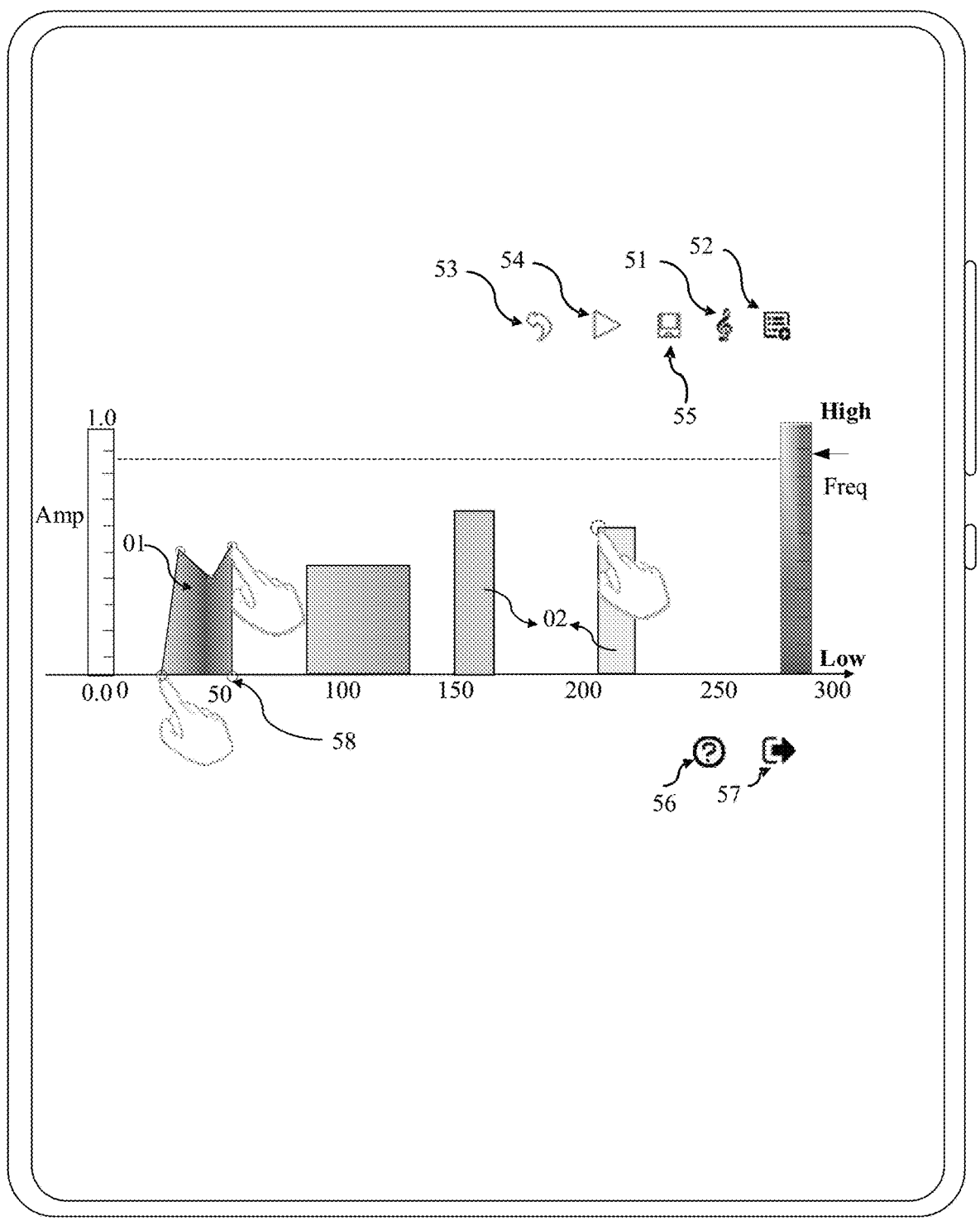
FIG. 6a is an exemplary diagram of an interaction interface for generating a vibration description file according to an embodiment of this application.

In this embodiment of this application, vibration description files are configured for different operations by using an exemplary user interaction interface shown in FIG. 6a:

In the interaction interface shown in FIG. 6a, an import control is displayed, including a note icon 51 and a file icon 52. In FIG. 6a, the Y (vertical) axis on the left represents an amplitude (Amplitude, or referred to as Intensity, Amp for short). The Y (vertical) axis on the right represents a frequency (or referred to as Sharpness, Freq for short). The X (horizontal) axis represents a duration (Time for short, in milliseconds). The Y-axis on the left has a range of 0 to 1, where intermediate values are indicated in scale. The Y-axis on the right represents the magnitude of the frequency in shades of gray scale or color. A deeper shade indicates a lower frequency, and a shallower shade indicates a higher frequency.

The note icon 51 is configured to import an audio file (an example of a multimedia file). The user may click the note icon 51 in the upper right corner of the interaction interface to import the audio file. The interaction interface displays a basic waveform generated based on the imported audio file.

In this embodiment, the basic waveform may be generated based on parameters of the audio such as an envelope, a frequency, an amplitude, tone, and rhythm.

The file icon 52 is configured to import a waveform in a scene vibration sense library, that is, in response to a selection instruction triggered by a selection operation of the user, the waveform selected by the user from the scene vibration sense library is imported as the basic waveform and displayed.

Pre-configured scene vibration sense waveforms include waveforms corresponding to vibration senses in a variety of scenes, such as a waveform corresponding to a vibration sense in a shooting scene in a game and a waveform corresponding to a vibration sense in an explosion scene in a game.

The scene vibration sense waveforms may be downloaded from the backend server of the application, where such waveforms are waveforms corresponding to vibration senses in scenes of the application. The scene vibration sense waveforms may be alternatively obtained from locally generated and stored waveforms of the electronic device, and so on, which is not limited herein.

Further, the scene vibration sense waveforms may be pre-stored in the scene vibration sense library, and the scene vibration sense library may be in a specific form such as a database or a folder. Waveform files in the scene vibration sense library may be added, deleted, or modified.

The file icon 52 is further configured to import a waveform received from an external source. The external source may be a source that provides waveforms, such as an application or a device. That is, the waveform received from the external source is stored in the terminal. In response to a selection instruction triggered by a selection operation of the user, the waveform received from the external source and selected by the user is imported as a basic waveform and displayed.

The user may adjust the basic waveform displayed in the interaction interface, and display the adjusted waveform in the interaction interface.

Specifically, 1: Display, in response to an operation instruction on a preset adjustment point on the basic waveform displayed in the interaction interface, an adjustment point on the waveform. In response to a drag instruction on the adjustment point in a first vibration parameter adjustment mode, a waveform after a first vibration parameter is adjusted is displayed, where the first vibration parameter includes an amplitude and/or a frequency.

For example, for a displayed steady-state waveform 01 or a displayed transient waveform 02, the user touches and holds on the waveform to pop up a dialog box or an option box, and selects addition of an adjustment point (a point for short, represented by a circle) from the dialog box or the option box. In response to the instruction of adding the point, the added point is displayed on the waveform. It may be understood that, since the transient waveform 02 does not involve adjustment of the envelope, the point on the transient waveform 02 is only a vertex of the upper edge. Alternatively, for the transient waveform 02, the vertex of the upper edge is defaulted as an adjustment point. No new adjustment point can be added, and no existing adjustment point can be changed.

The process of adjusting an amplitude of the steady-state waveform 01 by the user is as follows: clicking the Y-axis on the left to trigger an amplitude adjustment mode, and adjusting the amplitude of the steady-state waveform 01 by dragging any point. In other words, in response to the operation of clicking the Y-axis on the left by the user, the amplitude adjustment mode is entered; and in response to the drag instruction on the point (that is, the instruction triggered by the drag operation), the waveform after the amplitude adjustment is displayed.

The process of adjusting a frequency of the steady-state waveform 01 by the user is as follows: clicking the Y-axis on the right to trigger a frequency adjustment mode, and selecting the frequency of the steady-state waveform 01 by dragging any point. In other words, in response to the operation of clicking the Y-axis on the right by the user, the frequency adjustment mode is entered; and in response to the drag instruction on the point (that is, the instruction triggered by the drag operation), the waveform after the frequency adjustment is displayed.

It should be noted that, in the process of adjusting the amplitude, the rightmost point on the steady-state waveform 01 can only move up and down since the point is currently in the amplitude adjustment mode and cannot change the current frequency. That is, in the amplitude adjustment model, a left-right drag instruction for the rightmost point on the steady-state waveform 01 is not responded to.

For the steady-state waveform 01, a time parameter may be further adjusted through a point: A point of the steady-state waveform 01 on the X-axis is selected to trigger a time adjustment mode. In the time adjustment mode, at least two adjustment points 58 are displayed on the X-axis. The adjustment point on the left is dragged left and right along the X-axis to adjust a start time (a moment at which the waveform starts) of the steady-state waveform 01. The adjustment point on the right is dragged left and right along the X-axis to adjust a duration of the steady-state waveform 01.

That is, in response to the operation of clicking the points on the X-axis by the user, a time adjustment mode is entered. In response to the drag instruction on the adjustment point on a time axis in a time adjustment mode, the waveform after the time parameter is adjusted is displayed.

The process of adjusting an amplitude of the transient waveform 02 by the user is as follows: clicking the Y-axis on the left to trigger an amplitude adjustment mode, and adjusting the amplitude of the transient waveform 02 by dragging the vertex of the upper edge up or down. In other words, in response to the operation of clicking the Y-axis on the left by the user, the amplitude adjustment mode is entered; and in response to the up-down drag instruction on the point (that is, the instruction triggered by the up-down drag operation), the waveform after the amplitude adjustment is displayed.

The process of adjusting a frequency of the transient waveform 02 by the user is as follows: clicking the Y-axis on the right to trigger a frequency adjustment mode, and adjusting the frequency of the transient waveform 02 by dragging the vertex of the upper edge left and right. In other words, in response to the operation of clicking the Y-axis on the right by the user, the frequency adjustment mode is entered; and in response to the left-right drag instruction on the point (that is, the instruction triggered by the left-right drag operation), the waveform after the frequency adjustment is displayed. [00162] 2: Display, in response to a drag instruction on the waveform displayed in the interaction interface, the waveform after the time adjustment.

The user drags the entire steady-state waveform 01 along the X-axis to adjust the start time, that is, in response to the drag instruction for the steady-state waveform 01 along the X-axis, the waveform after the start time adjustment is displayed.

The user drags the entire transient waveform 02 along the X-axis to adjust the start time, that is, in response to the drag instruction for the transient waveform 02 along the X-axis, the waveform after the start time adjustment is displayed.

To enhance the visibility of the adjustment, indication information corresponding to a value of an adjusted parameter is displayed in the interaction interface.

Specifically, in the displayed waveform, a gray scale or color representing the currently selected frequency is filled, and the selected frequency is adjusted in real time as the point moves, to visually display the currently selected frequency.

Further, in a waveform that is not in a frequency adjustment state (steady state or transient state), a gray scale or color representing the current frequency of the waveform may also be filled to visually display the current frequency of the waveform that is not in the adjustment state. Further, in the frequency adjustment mode, an arrow is displayed near the frequency axis, pointing to the currently selected frequency to visually display the current frequency of the waveform.

It may be understood that, the transient waveform 02 is filled with only one color since the transient waveform 02 has only one frequency.

In addition to the adjustment of a single waveform, in this embodiment, the superimposition of a plurality of waveforms is also supported. If the user selects a plurality of waveforms and drags the waveforms to a state in which time ranges overlap, the superimposition of the plurality of waveforms in the state in which the time ranges overlap is triggered. That is, in response to a superimposition instruction of dragging the plurality of waveforms to the state in which the time ranges overlap, a waveform after the plurality of waveforms are superimposed is displayed. For example, if a first waveform is dragged to a time range of a second waveform, the first waveform and the second waveform are superimposed. The plurality of waveforms are at least a part of the foregoing basic waveform.

An example of a specific calculation manner of waveform superimposition is addition of amplitude values, and details are not described herein again. The purpose of waveform superimposition is to display and expand a variety of vibration effects through superimposition, which can support superimposition of vibration effects of a variety of scenes, thereby enriching the vibration experience of the user. It may be understood that, the implementation of waveform superimposition is not limited to the foregoing interaction interface.

In addition to the foregoing adjustment operations, the interaction interface shown in FIG. 6a may further implement the following functions:

The dialog box or the option box popped up by touching and holding the waveform further includes an option of deleting an adjustment point. The user may select the option to delete the adjustment point. Similarly, the dialog box or the option box popped up by touching and holding the waveform further includes an option of delete the Slice/Event. The user may select the option to delete the waveform.

In the adjustment process, the user may cancel the adjustment operation by clicking a return control 53, and click a playback control 54 to play vibration triggered by the adjusted waveform, to feel a vibration effect of the adjusted waveform and assist in the adjustment. The adjusted waveform may be further saved by clicking a save control 55. Optionally, a help control 56 and an exit control 57 may be further disposed in the interaction interface in FIG. 6a.

The motor 191 includes at least one of the X-axis linear motor shown in FIG. 1a or the Z-axis linear motor shown in FIG. 1b.

The internal memory 121 may be configured to store computer executable program code, and the executable program code includes instructions. The processor 110 runs the instruction stored in the internal memory 121, to perform various function applications and data processing of the electronic device. For example, in this embodiment, the processor 110 may generate a vibration description file by executing instructions, apparatuses, or modules stored in the internal memory 121. In another example, the processor 110 selects and adjusts a waveform in response to a signal triggered by a user operation received in an interaction interface in the touch screen, and generates a vibration description file based on the adjusted waveform.

The internal memory 121 may include a program storage region and a data storage region. The program storage region may store an operating system, an application program required by at least one function (for example, a voice playing function or an image playing function), and the like. The data storage region may store data (for example, audio data and an address book) and the like created when the electronic device is used. In addition, the internal memory 121 may include a high-speed random access memory, or may include a non-volatile memory such as at least one magnetic disk memory, a flash memory, or a universal flash storage (universal flash storage, UFS). The processor 110 runs the instructions stored in the internal memory 121 and/or the instructions stored in the memory disposed in the processor, to implement various functional applications and data processing of the electronic device.

Figure 6B:
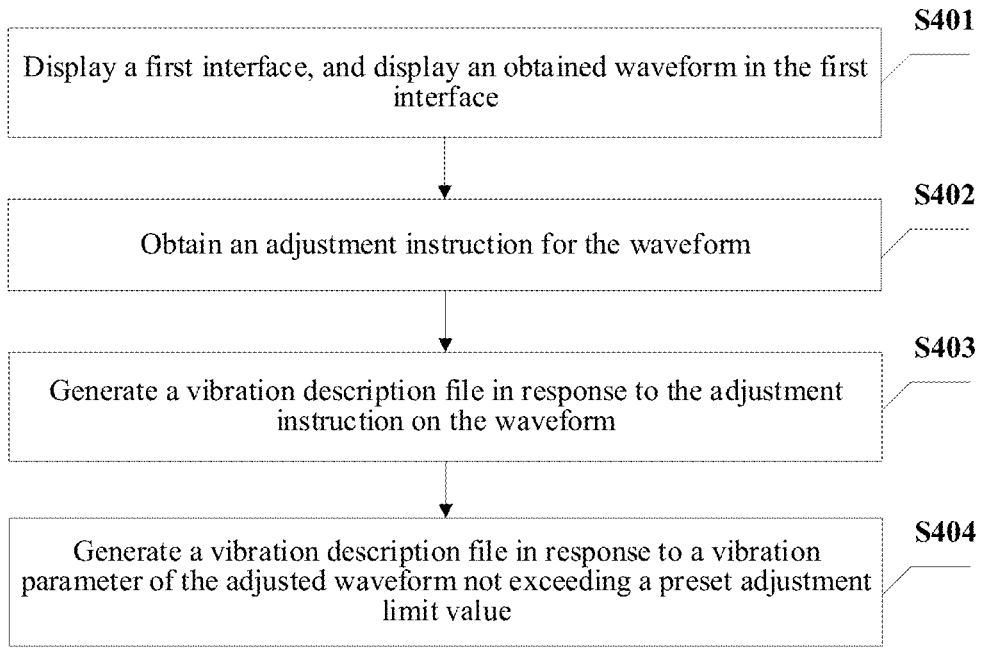
FIG. 6b is a flowchart of a method for generating a vibration description file according to an embodiment of this application.

The method for generating a vibration description file described in the embodiments of this application is described in detail below. FIG. 6b shows a method for generating a vibration description file disclosed in an embodiment of this application. The method includes the following steps:

S401: Display a first interface, and display an obtained waveform in the first interface.

Specifically, there are the following manners of obtaining a waveform:

1. Generate a waveform according to a vibration feature of an application.

The vibration feature of the application refers to a feature of an object that can use vibration in the application.

For example, the application may be a multimedia player, and the object that can use vibration may be multimedia. In this way, a waveform is generated according to a feature of the multimedia, for example, an envelope, a frequency, an amplitude, tone, or rhythm.

It may be understood that, types of objects that can use vibration in various applications may be pre-configured, and such objects may receive externally, for example, audio files imported by the user.

2. Select a waveform from pre-configured scene vibration sense waveforms.

The pre-configured scene vibration sense waveforms include waveforms corresponding to vibration senses in a variety of scenes, such as a waveform corresponding to a vibration sense in a shooting scene in a game and a waveform corresponding to a vibration sense in an explosion scene in a game.

The scene vibration sense waveforms may be downloaded from the backend server of the application, where such waveforms are waveforms corresponding to vibration senses in scenes of the application. The scene vibration sense waveforms may be alternatively obtained from locally generated and stored waveforms of the electronic device, and so on, which is not limited herein.

Further, the scene vibration sense waveforms may be pre-stored in the scene vibration sense library, and the scene vibration sense library may be in a specific form such as a database or a folder. Waveform files in the scene vibration sense library may be added, deleted, or modified.

3. Receive a waveform from an external source. The external source may be a source that provides waveforms, such as an application or a device.

4. Invoke a pre-configured waveform used as a template. That is, at least one waveform is pre-configured as a template, and a waveform is obtained by invoking the template. It may be understood that, the waveform as a template may be considered as a default waveform.

In this embodiment, the foregoing manners of obtaining a waveform are provided, and either manner can provide an existing or a configured waveform. Therefore, regardless of in which service scenario a vibration description file is customized, the user does not need to design a waveform from scratch, but may adjust an obtained waveform, thereby greatly facilitating the user and lowering the technical threshold.

S402: Obtain an adjustment instruction for the waveform.

S403: Generate a vibration description file in response to the adjustment instruction on the waveform.

Specifically, the electronic device displays an interaction interface, displays an adjusted waveform in response to the adjustment instruction on the waveform in the interaction interface, and generates the vibration description file of the adjusted waveform. The first interface may be a display interface, and the interaction interface is a touch screen interface. It may be understood that, the first interface is displayed on the touch display screen, and the interaction interface is also displayed on the touch display screen. The adjustment instruction is received through a touch layer on the touch display screen.

A detailed implementation of this step is described in the embodiment shown in FIG. 5.

S404: Generate a vibration description file in response to a vibration parameter of the adjusted waveform not exceeding a preset adjustment limit value.

S404 is an optional step, and the purpose of setting the adjustment limit value is to protect a linear motor to be controlled from being damaged. That is, in a case that a value of a vibration parameter of a basic waveform adjusted by the user exceeds the adjustment limit value, the adjustment instruction is not responded to.

Further, prompt information may be further displayed. The prompt information is used for indicating that the adjustment exceeds the adjustment limit value.

Specifically, the adjustment limit value may include, but is not limited to, an amplitude limit value, a startup time limit value, and a stop time limit value.

The amplitude limit value may be determined according to a maximum displacement of the linear motor to be controlled. The startup time limit value and the stop time limit value may be determined according to an attribute of the linear motor to be controlled.

As can be seen, in the process of this embodiment, the waveform is first obtained and displayed, the displayed waveform is further adjusted, and the vibration description file of the adjusted waveform is then generated. That is, the waveform obtained and displayed in S401 may be considered as a basic waveform, and the basic waveform may be adjusted to obtain a required vibration waveform. Further, a required vibration description file is obtained. Compared with the prior art, no handwritten code is required to form the vibration description file, which can lower the technical threshold for obtaining the vibration description file, and improve the obtaining efficiency.

From the perspective of the user, the user has more space to freely configure the vibration waveform, so that vibration modes can be designed for more service scenarios, which can expand the vibration function and improve the user experience.

During researches, it is found by the applicant that, during usage of the actual product, vibration originally designed for one or some service scenarios to improve the user experience may cause interference to other service scenarios.

For example, during audio playback, if a short message is received, vibration of the audio playback may affect the short message service. For example, the vibration interferes with prompt information, so that the user does not sense the prompt information, and thus does not view the short message in time. In another example, the user opens the short message interface to view the short message, but the vibration of the linear motor interferes with the viewing of the short message, which reduces the user experience.

To resolve the foregoing problems, the vibration description files described in the foregoing embodiments are divided into a static description file and a dynamic description file.

The role of the dynamic description file is to control vibration of the linear motor according to a vibration parameter in the dynamic description file if an interruption event occurs during vibration of the linear motor.

The interruption refers to a case that when a second event (for example, a short message application) is triggered (for example, a short message is received) during execution of a program implementing a first event (for example, audio playback), the program implementing the first event is aborted, and a program implementing the second event is executed. Until the second event is completed, the program implementing the first event is continuously executed. Alternatively, the first event and the second event are executed simultaneously. That is, the program implementing the first event and the program implementing the second event are executed in parallel. Simply put, execution of an event is interrupted, or a parallel event is added during execution of an event.

An interruption event refers to interrupting an event that is being executed, or adding an event that is executed in parallel with another event while the another event is being executed.

As can be seen, a dynamic description file may be configured for an interruption event, so that when the interruption event occurs, the vibration sense can be dampened to reduce the interference for the interruption event.

Based on the foregoing manners of obtaining a basic waveform, in this embodiment, a waveform received from an external source is used as a basic waveform for generating a dynamic description file. It may be understood that, the waveform received from the external source may be imported and displayed by using the interaction interface shown in FIG. 6a, and a dynamic description file is obtained after adjustment. The external source may be the executing body of the interruption event, for example, the foregoing short message application. That is, after an application is installed on the electronic device, the application may be pre-configured with a basic waveform for generating a dynamic description file, for the user to generate the dynamic description file, thereby providing a possibility to reduce the extent to which the application is interrupted by vibration in use.

Certainly, the waveform received from the external source may be alternatively used for other purposes, not limited to generating the dynamic description file.

Correspondingly, a vibration description file generated by a basic waveform that is obtained according to a feature of an object to be applied to vibration or that is selected from the pre-configured scene vibration sense library may be used to control vibration of the linear motor if no interruption event occurs. In this scenario, to distinguish between the two types of vibration description files, the latter may be referred to as a static description file.

The specific application process of the dynamic description file and the static description file does not fall within the scope of the disclosure and is thus not described in detail. It may be understood that, a vibration parameter described in the static description file may be the same as or different from a vibration parameter described in the dynamic description file. Further, types of vibration parameters described in the dynamic description file are a subset of types of vibration parameters described in the static description file. That is, since the dynamic description file is used in the case of an interruption event, with reference to the foregoing application scenario, not all parameters of a drive waveform need to be adjusted, but only parameters that are highly correlated with the vibration sense may be adjusted. Therefore, the dynamic description file may only describe the parameters that are highly correlated with the vibration sense. Therefore, types of parameters described in the dynamic description file may be less than types of parameters described in the static description file. For example, the static description file only describes amplitudes. This manner can simplify the content of the dynamic description file, thereby reducing the costs of generating the dynamic description file.

The dynamic description file may be alternatively visualized and adjusted, to provide greater possibilities and flexibility for subsequent dynamic adjustment of the vibration of the linear motor.

Figure 6C:
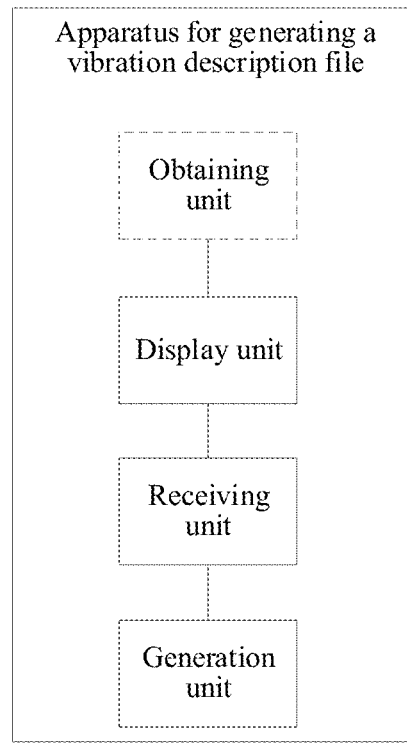
FIG. 6c is a schematic structural diagram of an apparatus for generating a vibration description file according to an embodiment of this application.

FIG. 6c shows an apparatus for generating a vibration description file according to an embodiment of this application. The apparatus is applied to an electronic device. The electronic device includes a linear motor. The apparatus includes: a display unit, a receiving unit, and a generation unit. Optionally, the apparatus may further include an obtaining unit.

The obtaining unit is configured to generate a waveform according to a vibration feature of an application; or select a waveform from pre-configured scene vibration sense waveforms; or receive a waveform from an external source; or invoke a pre-configured waveform as a template.

The display unit is configured to display a first interface, and the first interface displays the waveform obtained by the obtaining unit. The receiving unit is configured to obtain an adjustment instruction for the waveform, and the generation unit is configured to generate a vibration description file in response to the adjustment instruction.

Optionally, a specific implementation for the generation unit to generate the vibration description file in response to the adjustment instruction is: generating the dynamic description file in response to the adjustment instruction on the waveform received from the external source. The dynamic description file is used for controlling vibration of the linear motor according to a vibration parameter in the dynamic description file if an interruption event occurs.

Optionally, that the generation unit generates a vibration description file in response to the adjustment instruction further includes the following step: responding to the waveform generated according to the vibration feature of the application; or generating a static description file in response to an adjustment instruction for the waveform selected from the pre-configured scene vibration sense waveform. The static description file is used for controlling vibration of the linear motor according to a vibration parameter in the static description file if no interruption event occurs.

Optionally, types of vibration parameters indicated in the dynamic description file are a subset of types of vibration parameters indicated in the static description file.

Optionally, a specific implementation for the generation unit to generate the vibration description file in response to the adjustment instruction is: displaying an adjusted waveform in response to an adjustment instruction on the waveform in the interaction interface; and generating a vibration description file of the adjusted waveform.

Optionally, a specific implementation for the generation unit to display an adjusted waveform in response to an adjustment instruction on the waveform in the interaction interface is: displaying, in response to an operation instruction on a preset adjustment point on the waveform displayed in the interaction interface, an adjustment point on the waveform; and displaying, in response to a drag instruction on the adjustment point in a first vibration parameter adjustment mode, a waveform after a first vibration parameter is adjusted, where the first vibration parameter includes an amplitude and/or a frequency.

optionally, the waveform includes a steady-state waveform, and the first vibration parameter further includes a time parameter; and a specific implementation for the generation unit to display, in response to a drag instruction on the adjustment point in a first vibration parameter adjustment mode, a waveform after a first vibration parameter is adjusted is: displaying, in response to the drag instruction on the adjustment point on a time axis in a time adjustment mode, the waveform after the time parameter is adjusted.

Optionally, a specific implementation for the generation unit to display an adjusted waveform in response to an adjustment instruction on the waveform in the interaction interface is: displaying, in response to a drag instruction on the waveform displayed in the interaction interface, the waveform after a time parameter is adjusted.

Optionally, the display unit is further configured to display indication information corresponding to a value of an adjusted parameter in the interaction interface.

Optionally, the generation unit is further configured to: superimpose a plurality of waveforms in response to a superimposition instruction, and generate a vibration description file of a superimposed waveform. The plurality of waveforms are at least a part of the foregoing waveform.

Optionally, a specific implementation for the generation unit to superimpose a plurality of waveforms in response to a superimposition instruction is: superimposing the plurality of waveforms in response to an instruction of dragging the plurality of waveforms to the state in which the time ranges overlap.

Optionally, a specific implementation for the generation unit to generate the vibration description file is: generating a vibration description file in response to a vibration parameter of the adjusted waveform not exceeding a preset adjustment limit value.

According to the apparatus for generating a vibration description file in this embodiment, no handwritten code is required to form the vibration description file, which can lower the technical threshold for obtaining the vibration description file, and improve the obtaining efficiency. Since the technical threshold is lowered, the user has more space to customize the vibration waveform, so that vibration modes can be designed for more service scenarios, which can expand the vibration function and improve the user experience.

An embodiment of this application further provides a readable storage medium, storing a computer program, where the computer program, when executed by a processor, implements the method for generating a vibration description file according to the foregoing embodiments.

As described above, the vibration description file is one of the key elements to control the vibration of the linear motor. The vibration description file is used for describing a vibration waveform of the linear motor. The vibration waveform indicates various vibration parameters, such as an amplitude and a frequency, in the vibration process of the motor.

Figure 7A:
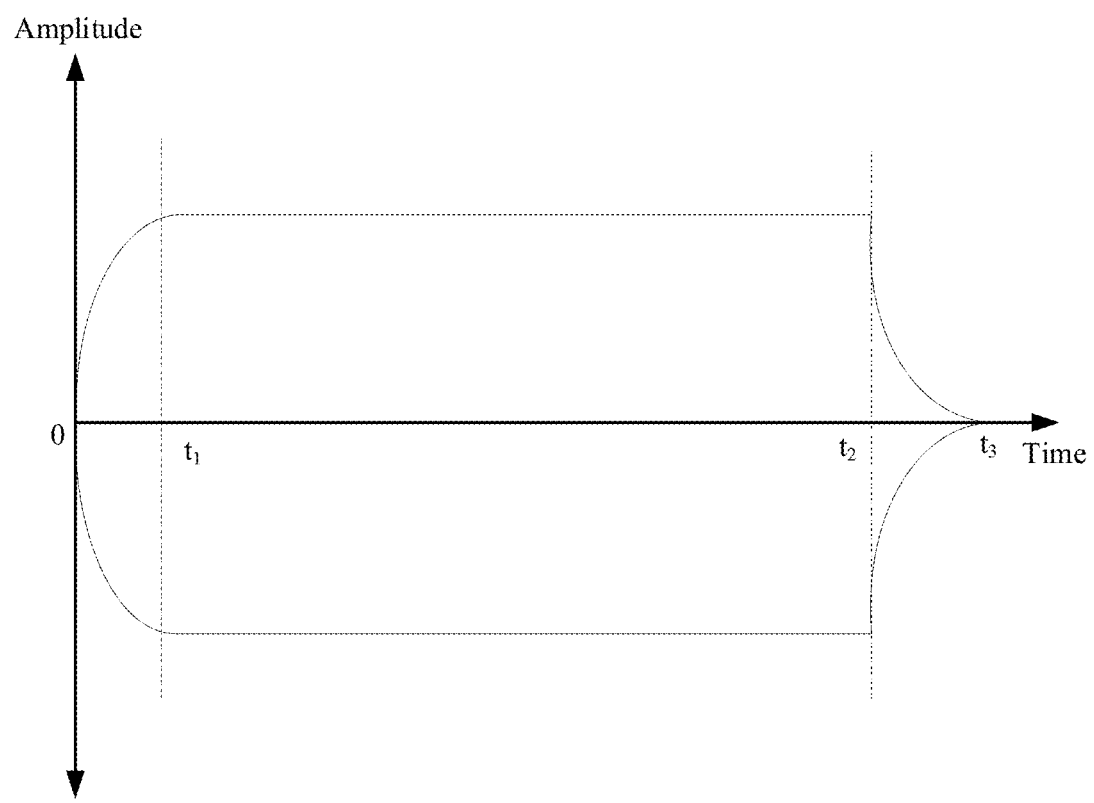
FIG. 7a shows an envelope of a vibration waveform of a resonant frequency at which a linear motor is driven to run.

The application scenario shown in FIG. 4d is described as an example. Each operated object in the game scene shown in this example is configured with a vibration description file. When the linear motor is controlled to run at a resonant frequency according to a vibration waveform described in a vibration description file, referring to FIG. 7a, the amplitudes of the linear motor smoothly transition within a startup time (0 to t1) and a stop time (t2 to t3). Therefore, a vibration sense brought by the linear motor is smooth, the vibration noise is low, the user can feel the smooth and stable vibration, and the vibration sound of the linear motor is smooth and not sharp.

The resonant frequency of the linear motor is a key parameter for operation of the linear motor. The resonant frequency is also referred to as a resonance frequency, which refers to a case that a physical system (referring to the linear motor) vibrates at a greater amplitude than other frequencies at a specific frequency. The specific frequency is referred to as the resonance frequency. At the resonance frequency, a small driving force can cause great vibration of the linear motor. Therefore, generally, a linear motor is driven to run at a resonant frequency.

Figure 7B:
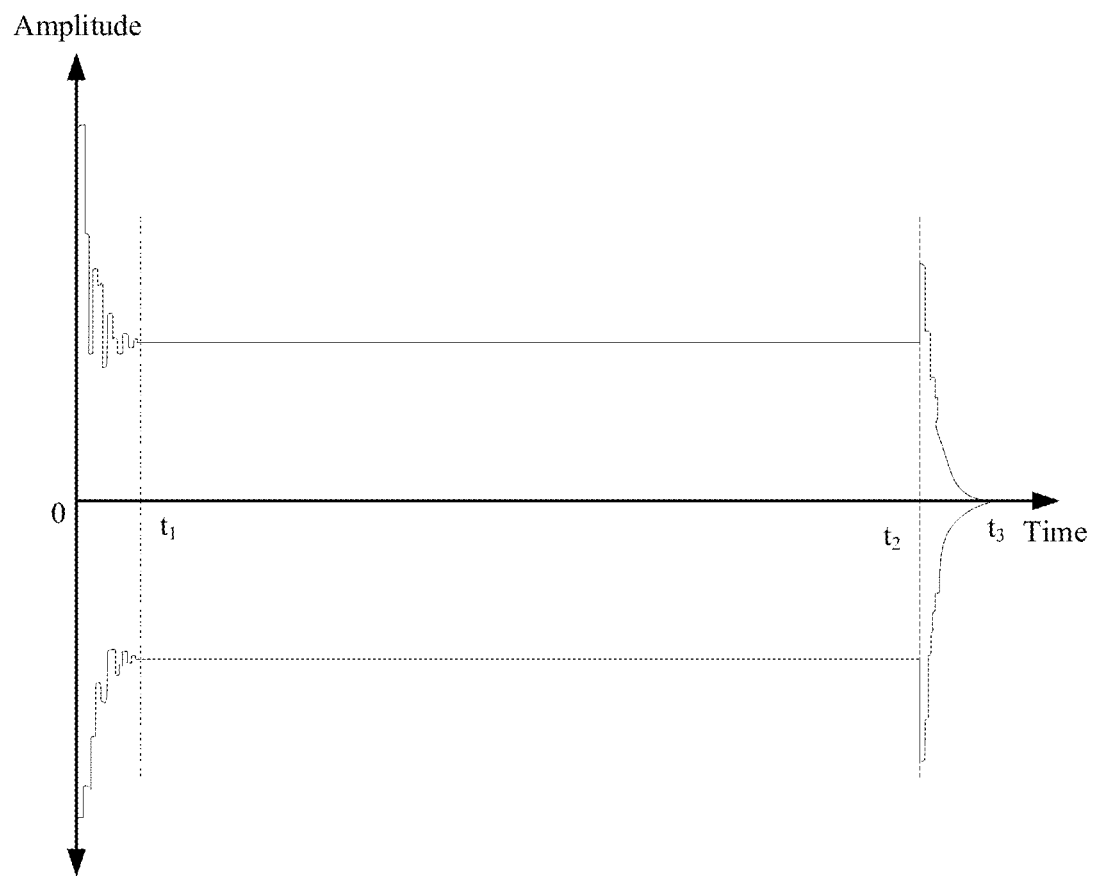
FIG. 7b shows an envelope of a vibration waveform of a non-resonant frequency at which a linear motor is driven to run.

However, to meet the requirements of the user for experiencing a plurality of vibration senses, or meet the requirements of different applications for different vibration senses, the linear motor needs to be driven to run at any frequency point in a specific frequency range. This indicates that the linear motor is not run at a resonant frequency, which leads to a problem of amplitude disturbance of the linear motor within the startup time (0 to t1) and the stop time (t2 to t3) with reference to FIG. 7b. The amplitude disturbance is referred to as a motor overdrive problem. In this case, the vibration sense brought by the linear motor is unstable and unsmooth, and the vibration noise is high.

In this example, due to the large quantity of operation objects in the game scene, frequencies in the vibration description files configured by the objects may be diverse. For example, different types of guns have different requirements for vibration senses. In this case, the linear motor needs to be driven to run at any frequency point in a specific frequency range. If a frequency of a vibration description file configured by an object is not the resonant frequency of the linear motor, the vibration provided through operation of the linear motor is unstable and unsmooth. Therefore, the user experience is not good and the vibration sound may be harsh.

Therefore, it is necessary to adjust the vibration waveform described in the vibration description file, so that when the vibration waveform is outputted by the linear motor that implements the vibration, the amplitude of the linear motor is smooth, the vibration sense is stable and smooth, and the noise is low within the startup time and the stop time. It may be understood that, the electronic device needs to output a vibration sense corresponding to a waveform that has a first change trend within a startup time and has a second change trend within a stop time, where the first change trend is that an amplitude of a steady-state waveform changes smoothly from zero to an amplitude of a linear motor stable vibration state, and the second change trend is that the amplitude of the steady-state waveform changes smoothly from the amplitude of the linear motor stable vibration state to zero.

The electronic device outputs the vibration sense corresponding to the waveform having the foregoing change trends, and the corresponding processing flow by the processor is described in the following embodiment.

According to the method for processing a vibration waveform of a linear motor disclosed in the embodiments of this application, the vibration waveform described in the vibration description file is adjusted based on the feature of the linear motor that implements the vibration, so that the linear motor that implements the vibration can output a smooth amplitude within the startup time and the stop time, thereby resolving the overdrive problem.

Figure 8A:
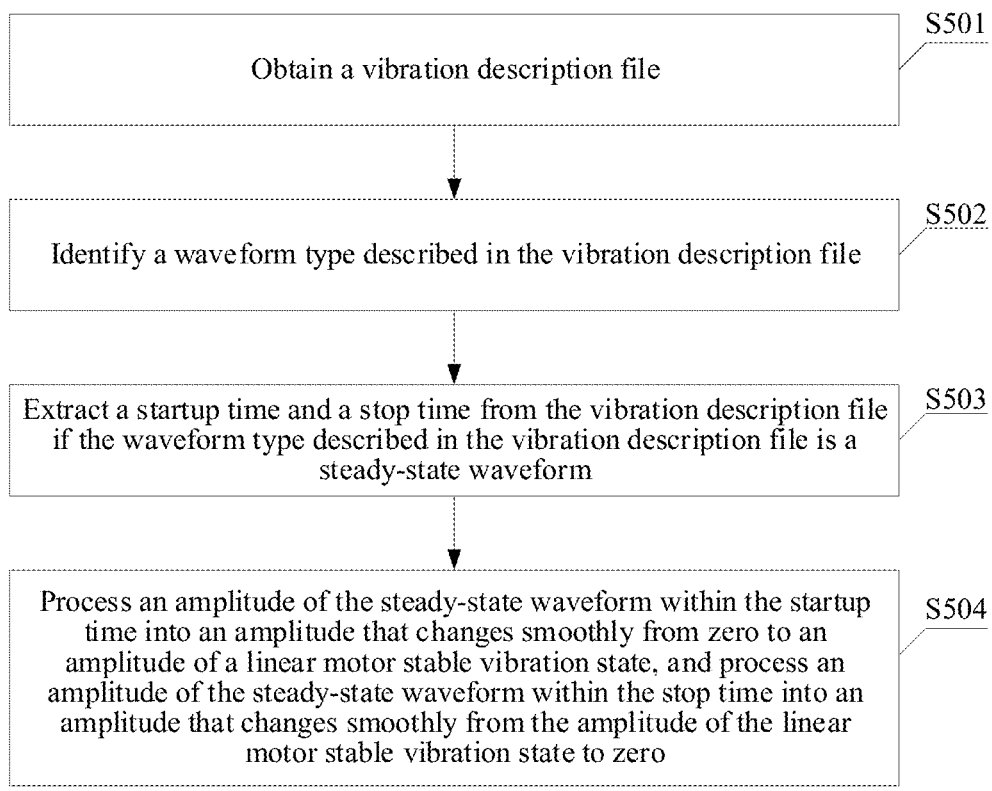
FIG. 8a is a flowchart of a method for processing a vibration waveform according to an embodiment of this application.

Referring to FIG. 8a, this application provides a method for processing a vibration waveform, applicable to an electronic device. The electronic device includes a linear motor. The method for processing a vibration waveform includes:

S501: Obtain a vibration description file.

The vibration description file includes a variety of vibration parameters. The vibration description file is parsed to obtain each vibration parameter included in the vibration description file, and a vibration waveform of the linear motor can be generated by using the vibration parameters. The vibration waveform of the linear motor may be understood as a displacement bitstream that reflects the displacement of the linear motor at different time points.

As described above, the rotor of the X-axis linear motor may move in the X-axis or Y-axis direction, and the rotor of the Z-axis linear motor may move in the Z-axis direction. Therefore, regardless of the type of linear motor, the operation of the linear motor driven by the waveform refers to the motion of the rotor of the linear motor on the corresponding axis (the X-axis, the Y-axis, or the Z-axis). The expression of the motion of the rotor on the corresponding axis is a displacement change of the rotor along the corresponding axis at different moments. The displacement change of the rotor at different moments brings the vibration sense felt by the user.

The vibration parameters in the vibration description file may include, but are not limited to, intensity, sharpness (or referred to as frequency), a waveform type, a startup time, and a stop time.

S502: Identify a waveform type described in the vibration description file.

The vibration parameters in the vibration description file include the waveform type. The waveform type is analyzed, to determine whether the vibration description file describes a steady-state waveform or a transient waveform.

It may be understood that, the steady-state waveform is a vibration waveform of the linear motor that is driven to undergo a rising stage, a stable vibration stage, and a stop stage. The rising stage, the stable vibration stage, and the stop stage are three stages that the linear motor undergoes from the beginning of the vibration to the end of the vibration. In the rising stage, the vibration form of the linear motor is expressed as free damping vibration accompanied by forced vibration. In the stable vibration stage, the vibration form of the linear motor is expressed as steady-state forced vibration of equal magnitude. In the stop stage, the vibration form of the linear motor is expressed as free damping vibration.

The transient waveform is a vibration waveform of the linear motor that is driven to undergo only the rising stage.

S503: Extract a startup time and a stop time from the vibration description file if the waveform type described in the vibration description file is a steady-state waveform.

As described above, when the linear motor runs at a non-resonant frequency, the amplitude within the startup time and the stop time is disturbed, and there is an overdrive problem. Therefore, the startup time and the stop time described in the vibration parameters in the vibration description file need to be obtained.

The startup time and the stop time are both time periods. The startup time is a time between an operation start time point and a stable vibration state time point of the linear motor. The stop time is a time between the stable vibration state time point and an operation stop time point of the linear motor.

S504: Process an amplitude of the steady-state waveform within the startup time into an amplitude that changes smoothly from zero to an amplitude of a linear motor stable vibration state, and process an amplitude of the steady-state waveform within the stop time into an amplitude that changes smoothly from the amplitude of the linear motor stable vibration state to zero.

The amplitude of the steady-state waveform within the startup time of the linear motor is processed into the amplitude that changes smoothly from zero to the amplitude of a linear motor stable vibration state; and the amplitude of the steady-state waveform within the stop time of the linear motor is processed into the amplitude that changes smoothly from the amplitude of the linear motor stable vibration state to zero, which ensures that when the linear motor runs with the processed steady-state waveform, the amplitudes outputted within the startup time and the stop time smoothly transition, the amplitudes are not disturbed, the vibration sense brought by the linear motor is stable and smooth, and the vibration noise is low.

Figure 8B:
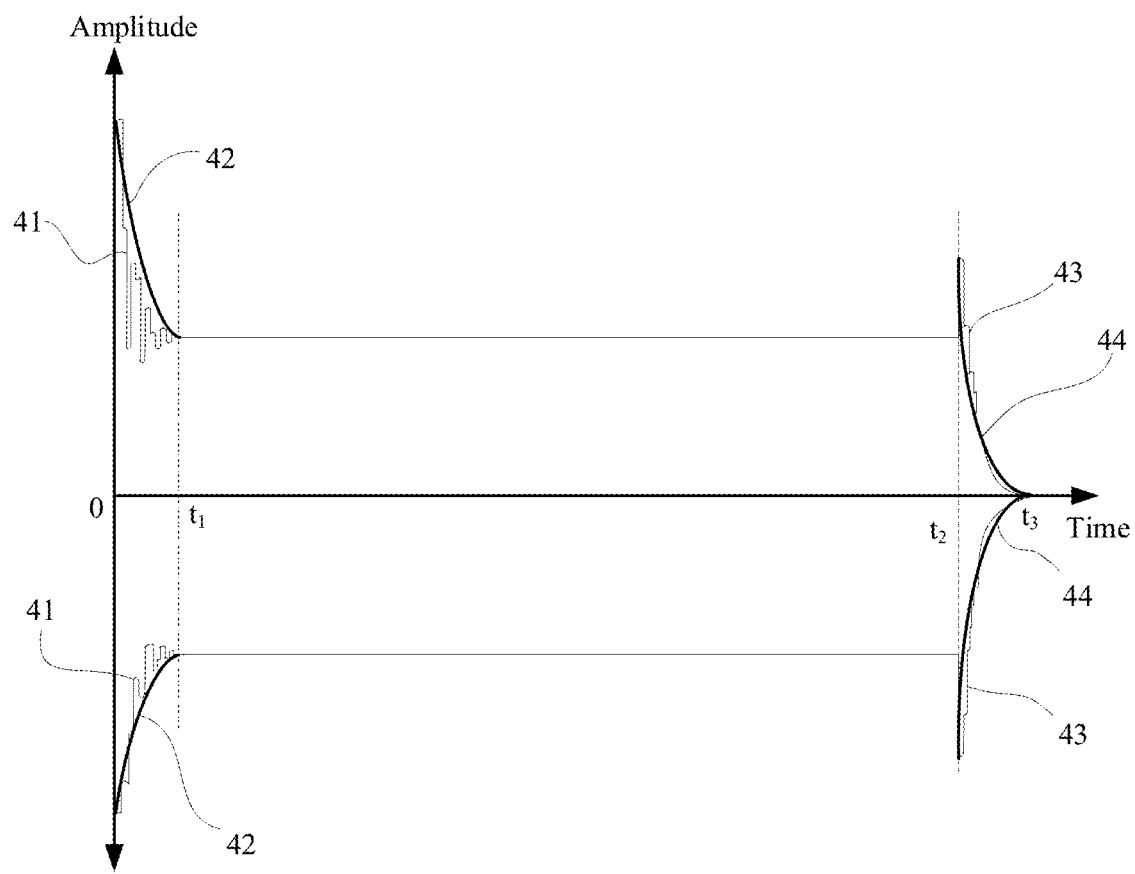
FIG. 8b is a schematic diagram of adjusting a vibration waveform of a linear motor according to an embodiment of this application.

The smoothing change described in the foregoing content may be understood as that the amplitude of the linear motor smoothly transitions from zero smoothing to the amplitude of the stable vibration state within the startup time; and the amplitude of the linear motor smoothly transitions from the amplitude of the stable vibration state to zero within the stop time. Referring to FIG. 8b, an original vibration waveform 41 of the startup time (0 to t1) is smoothed to obtain a vibration waveform 42. Similarly, an original vibration waveform 43 of the stop time (t2 to t3) is smoothed to obtain a vibration waveform 44.

As described above, the vibration description file is used for generating the vibration waveform of the linear motor. The vibration waveform is a displacement bitstream that reflects the displacement of the linear motor at different time points. Moreover, displacement of the linear motor at each time point is equivalent to an amplitude of the linear motor at each time point. Therefore, adjusting the amplitude of the steady-state waveform in the manner of step S504 is equivalent to adjusting displacement at each time point within the startup time and the stop time in the vibration description file.

In a possible implementation, the smoothing includes the following two manners:

In the first manner, cosine waveforms are superimposed on steady-state vibration waveforms within the startup time and the stop time of the linear motor.

The cosine waveforms are superimposed on the steady-state vibration waveforms of the linear motor within the startup time and the stop time, and a value of the cosine waveforms at each time point is used to offset a value of the steady-state vibration waveforms that is too sharp of the linear motor within the startup time and the stop time.

There are two cosine waveforms. A duration of one of the cosine waveforms is the same as the startup time. This cosine waveform includes waveform values of the same quantity as amplitude values of a plurality of time points included in the startup time. The waveform values of the cosine waveform are opposite to an amplitude value at the peak of the waveform within the startup time, and are in the same direction as an amplitude value at the trough of the waveform within the startup time, which ensures that the waveform within the startup time is peaked. Similarly, a duration of the other cosine waveform is the same as the stop time. A value of each time point of the cosine waveform is opposite to the amplitude value at the peak of the waveform within the stop time, and is in the same direction as an amplitude value at the trough of the waveform within the stop time, which ensures that the waveform within the stop time is peaked.

In the second manner, a ramp algorithm is used to process the steady-state vibration waveforms within the startup time and the stop time of the linear motor.

The ramp algorithm is an algorithm that makes a waveform look like a ramp. Using the ramp algorithm for processing may be understood as multiplying the amplitudes of the steady-state waveforms of the linear motor within the startup time and the stop time by coefficients. Certainly, the coefficients multiplied by the amplitudes of the steady-state waveforms at each point also smoothly change within the startup time and the stop time.

Figure 9:
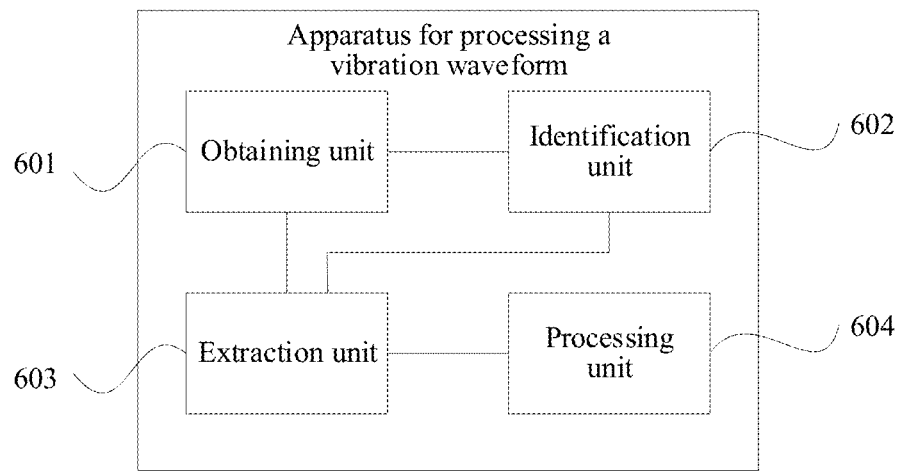
FIG. 9 is a schematic structural diagram of an apparatus for processing a vibration waveform according to an embodiment of this application.

Referring to FIG. 9, an embodiment of this application provides an apparatus for processing a vibration waveform, including:

an obtaining unit 601, configured to obtain a vibration description file;

an identification unit 602, configured to identify a waveform type described in the vibration description file;

an extraction unit 603, configured to extract a startup time and a stop time from the vibration description file if the waveform type described in the vibration description file is a steady-state waveform; and a processing unit 604, configured to process an amplitude of the steady-state waveform within the startup time into an amplitude that changes smoothly from zero to an amplitude of a linear motor stable vibration state, and process an amplitude of the steady-state waveform within the stop time into an amplitude that changes smoothly from the amplitude of the linear motor stable vibration state to zero.

It should be noted that, in the apparatus for processing a vibration waveform provided in this embodiment, when the identification unit 602 identifies that the waveform described in the vibration description file is the steady-state waveform, the processing unit 604 processes, within the startup time, the amplitude of the linear motor into the amplitude that changes smoothly from zero to the amplitude of the linear motor stable vibration state, and processes, within the stop time, the amplitude of the linear motor into the amplitude that changes smoothly from the amplitude of the linear motor stable vibration state to zero, so that the linear motor can be controlled to run smoothly within the startup time and the stop time to overcome the overdrive problem.

Optionally, in another embodiment of this application, the processing unit 604 processes the amplitude of the steady-state waveform within the startup time into the amplitude that changes smoothly from zero to the amplitude of the linear motor stable vibration state, to superimpose a cosine waveform on the steady-state waveform within the startup time, to obtain the steady-state waveform whose amplitude within the startup time changes smoothly from zero to the amplitude of the linear motor stable vibration state; or process the steady-state waveform within the startup time by using the ramp algorithm, to obtain the steady-state waveform whose amplitude within the startup time changes smoothly from zero to the amplitude of the linear motor stable vibration state.

Optionally, in another embodiment of this application, the processing unit 604 processes the amplitude of the steady-state waveform within the stop time into the amplitude that changes smoothly from the amplitude of the linear motor stable vibration state to zero, to superimpose a cosine waveform on the steady-state waveform within the stop time, to obtain the steady-state waveform whose amplitude within the stop time changes smoothly from the amplitude of the linear motor stable vibration state to zero; or process the steady-state waveform within the stop time by using the ramp algorithm, to obtain the steady-state waveform whose amplitude within the stop time changes smoothly from the amplitude of the linear motor stable vibration state to zero.

In the apparatus for processing a vibration waveform provided in the foregoing embodiments of this application, for the specific operating processes of the obtaining unit 601, the identification unit 602, the extraction unit 603, and the processing unit 604, reference may be made to the content the corresponding method embodiments, and details are described herein again.

Another embodiment of this application provides a readable storage medium, where instructions in the readable storage medium, when executed by a processor of an electronic device, cause the electronic device to perform the method for processing a vibration waveform in any of the foregoing embodiments.

Optionally, the readable storage medium may be a non-temporary computer-readable storage medium. For example, the non-temporary computer readable storage medium may be a ROM, a random access memory (RAM), a CD-ROM, a tape, a floppy disk, or an optical data storage device.

As described above, the vibration description file is one of the key elements to control the vibration of the linear motor. The vibration description file is used for describing a vibration waveform of the linear motor. The vibration waveform indicates various vibration parameters, such as an amplitude and a frequency, in the vibration process of the motor.

As can be seen, the function of the vibration description file is to indicate how the motor vibrates. Therefore, the user can configure an expected vibration effect through the vibration description file. In practice, the linear motor is the implementation body of vibration, so that the vibration effect is related to attributes of the linear motor. Therefore, although a vibration description file is configured based on an expected vibration effect, vibration generated by the linear motor controlled by the vibration description file does not necessarily achieve the expected vibration effect.

Based on the features of the different types of linear motors described above, it is found by the applicant during researches that, that the linear motor cannot provide the expected vibration effect is mainly reflected in:

different resonant frequencies of different types of linear motors or the same type of linear motors. The linear motors of different resonant frequencies are all applied to the electronic device. Therefore, a frequency of a transient drive waveform described in the same vibration description file cannot match a resonant frequency of each linear motor that implements the vibration. For example, a vibration description file defines a vibration waveform with a frequency of 230 Hz, and resonant frequencies of linear motors that implement vibration are 150 Hz and 230 Hz. As described above, the resonant frequency of the linear motor is 150 Hz, so that only when the linear motor outputs a drive waveform with a frequency of 150 Hz, it can be ensured that the linear motor produces great vibration at a small driving force. The frequency of the vibration waveform defined in the vibration description file is 230 Hz, so that when the linear motor with the resonant frequency of 150 Hz outputs a vibration waveform with a frequency 230 Hz, a vibration sense outputted by the linear motor cannot meet the requirements. Therefore, it is necessary to adjust the vibration waveform described in the vibration description file, so that the vibration waveform is adapted to each resonant frequency of the linear motor that implements the vibration, to ensure that the expected vibration effect and the expected vibration sense are obtained.

Similarly, the application scenario shown in FIG. 4d is described as an example. The application scenario shown in FIG. 4d is a game. With the popularity of the game, there are increasingly more electronic devices with the game installed. Linear motors in the electronic devices with the game installed may be of different types, or may be of the same type but originate from different manufacturers or different batches. In this case, resonant frequencies of the linear motors in the electronic devices are different. As a result, when the user plays the same game in different electronic devices, the user feels different vibration senses due to different resonant frequencies of the linear motors. A vibration sense outputted by a linear motor may even differ greatly from the expectation of a vibration description file of an object in the application scenario. In this case, a method for adjusting a vibration waveform of a linear motor disclosed in the following embodiment needs to be used to adjust the vibration waveform described in the vibration description file based on the feature of the linear motor that implements the vibration, so that the vibration waveform is adapted to the resonant frequency of the linear motor that implements the vibration, to ensure that the expected vibration effect and the expected vibration sense are obtained.

It may be understood that, the method for adjusting a vibration waveform of a linear motor provided in the following embodiment can enable the linear motor to be in a first vibration state.

In the embodiments of this application, the internal memory 121 stores instructions for executing the method for adjusting a drive waveform. The processor 110 may adjust a drive waveform described in a vibration description file by executing the instructions stored in the internal memory 121, to ensure that a frequency of the drive waveform matches a resonant frequency of each linear motor, and remove the difference in the resonant frequencies of the different linear motors.

In the embodiments of this application, there may be a variety of linear motors 191, and the processor 110 executes drive programs of the linear motors to drive the linear motors to run. In addition, the solution for adjusting a drive waveform involved when the drive program of the linear motor drives the linear motor to run is, for example, the method for adjusting a drive waveform provided in the following embodiment of this application.

The method for adjusting a drive waveform of a linear motor according to the embodiments of this application may be applied to the waveform processing module in FIG. 3a. The method for adjusting a drive waveform of a linear motor is described in detail below.

Figure 10:
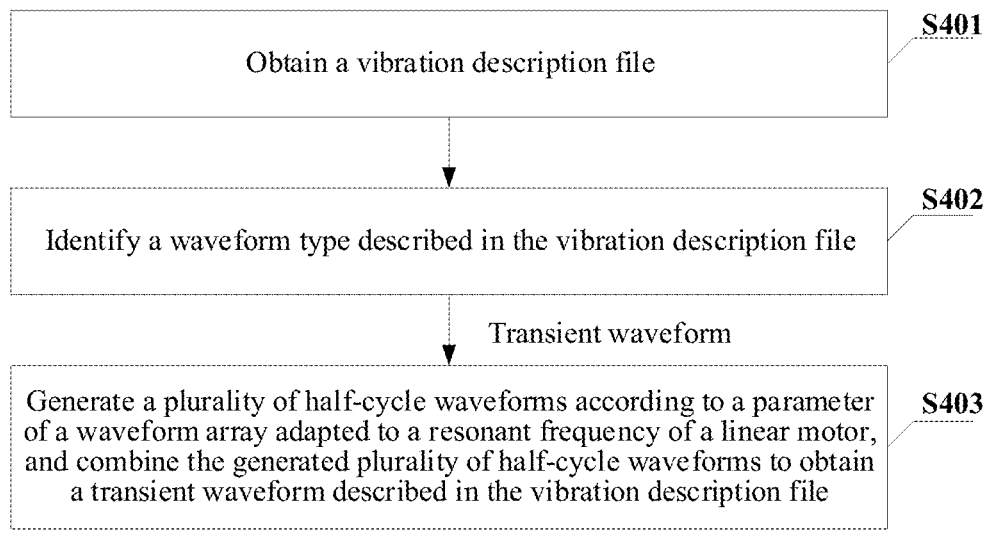
FIG. 10 to FIG. 12 are flowcharts of a method for adjusting a drive waveform according to an embodiment of this application.

FIG. 10 shows a method for adjusting a drive waveform, applicable to an electronic device. The electronic device includes a linear motor. The method for adjusting a drive waveform includes:

S401: Obtain a vibration description file.

The vibration description file includes a variety of vibration parameters. The vibration description file is parsed to obtain each vibration parameter included in the vibration description file, and a vibration waveform of the linear motor can be generated by using the vibration parameters. The vibration waveform of the linear motor may be understood as a displacement bitstream that reflects the displacement of the linear motor at different time points.

As described above, the rotor of the X-axis linear motor may move in the X-axis or Y-axis direction, and the rotor of the Z-axis linear motor may move in the Z-axis direction. Therefore, regardless of the type of linear motor, the operation of the linear motor driven by the waveform refers to the motion of the rotor of the linear motor on the corresponding axis (the X-axis, the Y-axis, or the Z-axis). The expression of the motion of the rotor on the corresponding axis is a displacement change of the rotor along the corresponding axis at different moments. The displacement change of the rotor at different moments brings the vibration sense felt by the user.

The vibration parameters in the vibration description file may include, but are not limited to, intensity, sharpness (or referred to as frequency), a waveform type, a startup time, and a stop time.

S402: Identify a waveform type described in the vibration description file.

If the waveform type described in the vibration description file is a transient waveform, step S203 is performed.

The vibration parameters in the vibration description file include the waveform type. The waveform type is analyzed, to determine whether the vibration description file describes a steady-state waveform or a transient waveform.

It may be understood that, the steady-state waveform is a vibration waveform of the linear motor that is driven to undergo a rising stage, a stable vibration stage, and a stop stage. The rising stage, the stable vibration stage, and the stop stage are three stages that the linear motor undergoes from the beginning of the vibration to the end of the vibration. In the rising stage, the vibration form of the linear motor is expressed as free damping vibration accompanied by forced vibration. In the stable vibration stage, the vibration form of the linear motor is expressed as steady-state forced vibration of equal magnitude. In the stop stage, the vibration form of the linear motor is expressed as free damping vibration.

The transient waveform is a vibration waveform of the linear motor that is driven to undergo only the rising stage.

S403: Generate a plurality of half-cycle waveforms according to a parameter of a waveform array adapted to a resonant frequency of a linear motor, and combine the generated plurality of half-cycle waveforms to obtain a transient waveform described in the vibration description file.

The vibration parameters included in the vibration description file define the vibration waveform to be generated. Therefore, based on a vibration parameter of the transient waveform described in the vibration description file, a vibration waveform that meets the requirements of the vibration parameter can be generated. For example, the vibration parameter defined in the vibration description file includes that: the frequency is 230 Hz. Based on the vibration parameter, a vibration waveform with a frequency of 230 Hz can be generated.

However, as described above, different linear motors are adapted to different frequencies (or referred to as resonant frequencies). When the frequency of the transient waveform described in the vibration description file does not match the resonant frequency of the linear motor, the vibration sense of the linear motor cannot meet the vibration sense requirements of the transient waveform described in the vibration description file. Therefore, the vibration parameter of the transient waveform described in the vibration description file needs to be processed to generate a drive waveform that matches each resonant frequency adapted to the linear motor. It may be alternatively understood that, the difference in the resonant frequencies of the linear motors needs to be removed, and the plurality of linear motors with different resonant frequencies are controlled to output the transient waveform described in the same vibration description file. For example, the vibration waveform with the frequency of 230 Hz defined in the vibration description file needs to be outputted by a linear motor with a resonant frequency of 230 Hz and a linear motor with a resonant frequency of 150 Hz.

To ensure that the transient waveform described in the vibration description file can be outputted by linear motors of different resonant frequencies, a waveform array corresponding to each resonant frequency of the linear motors is predefined and stored in the internal memory of the electronic device. The waveform array includes a plurality of half-cycle waveforms. Each half-cycle waveform is obtained by splitting the transient waveform adapted to the resonant frequency of the linear motor by using a half cycle of the transient waveform as a split unit. Certainly, the waveform array is stored in the internal memory of the electronic device to generate a frequency and an amplitude of each half-cycle waveform.

In addition, the period of the transient waveform described in the vibration description file is fixed. For example, if a transient waveform includes waveforms of three periods, a waveform array of the linear motor of each resonant frequency includes: frequencies and amplitudes corresponding to six half-cycle waveforms.

In a case that the waveform type described in the vibration description file is a transient waveform, a waveform array corresponding to the resonant frequency of the linear motor in the electronic device is selected from waveform arrays corresponding to each pre-stored resonant frequency. Each half-cycle waveform is generated according to frequencies and amplitudes of a plurality of half-cycle waveforms indicated in the waveform array. The generated half-cycle waveforms are then combined to obtain a transient waveform.

Figure 11:
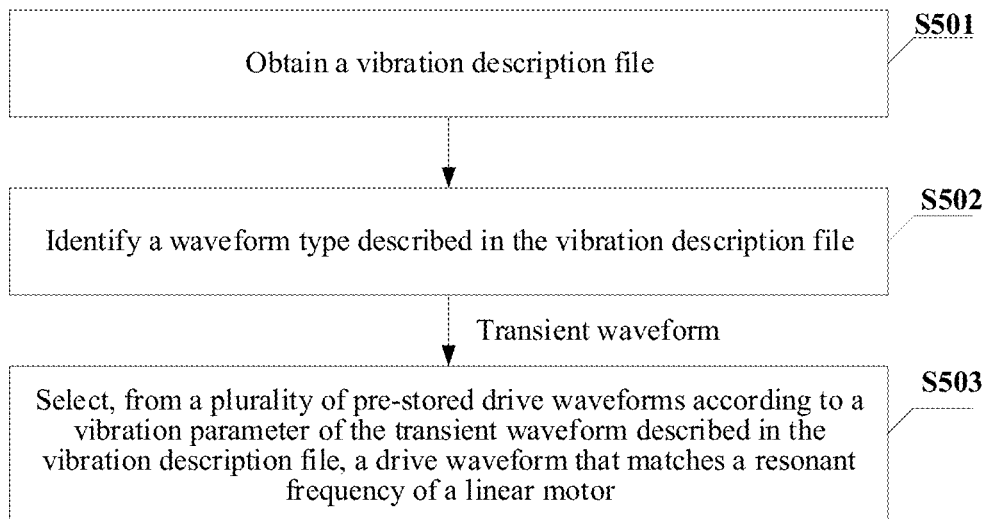

FIG. 11 shows another method for adjusting a drive waveform, applicable to an electronic device as well. The electronic device includes a linear motor. The method for adjusting a drive waveform includes:

S501: Obtain a vibration description file.

S502: Identify a waveform type described in the vibration description file.

If the waveform type described in the vibration description file is a transient waveform, step S503 is performed.

For detailed content of step S501 and step S502, reference may be made to content of step S501 and step S502 in the corresponding embodiment of FIG. 4.

S503: Select, from a plurality of pre-stored drive waveforms according to a vibration parameter of the transient waveform described in the vibration description file, a drive waveform that matches a resonant frequency of a linear motor.

It may be understood that, selecting, from the plurality of pre-stored drive waveforms, the drive waveform that matches the resonant frequency of the linear motor also needs to meet the requirements of the vibration parameter of the transient waveform described in the vibration description file. In this manner, a plurality of drive waveforms are pre-stored, and according to the requirements of the vibration parameter of the transient waveform described in the vibration description file and the resonant frequency of the linear motor, a drive waveform for driving the linear motor is selected. This manner can also remove the difference in the resonant frequencies of the linear motors. Certainly, due to the direct selection, the efficiency of obtaining the drive waveform can be higher.

Due to the limited resonant frequency requirements of linear motors, different linear motors require drive waveforms with different resonant frequencies. Therefore, drive waveforms of linear motors adapted to different resonant frequencies may be pre-generated and stored in the internal memory of the electronic device. Such pre-generated drive waveforms are referred to as atomic drive waveforms.

There are three manners of generating an atomic drive waveform:

In the first manner, a drive waveform of each resonant frequency of a linear motor is used as an atomic drive waveform. In this way, it can be ensured that each resonant frequency of the linear motor can match an atomic drive waveform from the stored atomic drive waveforms. However, this generation manner requires a large amount of storage space.

In the second manner, a drive waveform of each frequency in a frequency range of a frequency range of the linear motor is used as an atomic drive waveform. For example, the frequency range of all frequencies of the linear motor is 70 Hz to 185 Hz, and a drive waveform of each frequency in the frequency range is used as an atomic drive waveform; or a drive waveform of each frequency of a frequency range of 165 Hz to 175 Hz of a frequency range of 70 Hz to 185 Hz is used as an atomic drive waveform. Certainly, a standard of selecting a frequency range in the frequency range of the linear motor may be alternatively: selecting a frequency range with a high hit rate, which refers to a range including frequencies used by most linear motors. A quantity of atomic drive waveforms generated in this generation manner is relatively small compared to the first manner, and this manner does not need to take up a large amount of storage space. It is possible that an atomic drive waveform corresponding to a resonant frequency of the linear motor cannot be found.

In the third manner, a drive waveform of a resonant frequency of the linear motor with a relatively high hit rate is used as an atomic drive waveform. The resonant frequency with a relatively high hit rate refers to a resonant frequency used by most linear motors among resonant frequencies of a series of linear motors. For example, in the frequency range of 70 Hz to 185 Hz, frequencies of 70, 80, 90, 100, 120, 130, 150, and 170 Hz are resonant frequencies set by most linear motors and are set to resonant frequencies with a relatively high hit rate. On the basis of the second manner, this generation manner further reduces the requirements for storage space, and increases the probability of not finding an atomic drive waveform corresponding to a resonant frequency of the linear motor.

The transient waveform frequencies described in the vibration description file are diverse. That is, the linear motor may be required to run with waveforms of different frequencies. Based on this, when each atomic drive waveform includes a plurality drive waveforms, each drive waveform is adapted to a frequency requirement of a transient waveform described in the vibration description file. For example, an atomic drive waveform of a linear motor with a resonant frequency of 165 Hz includes: a drive waveform corresponding to a transient waveform with a frequency of 80 Hz, a drive waveform corresponding to a transient waveform with a frequency of 81 Hz, a drive waveform corresponding to a transient waveform with a frequency of 82 Hz, and so on.

As can be seen from the foregoing content, an atomic drive waveform adapted to different resonant frequencies of the linear motor is pre-stored. Therefore, for each resonant frequency of the linear motor, an adapted atomic drive waveform can be screened out from the stored atomic drive waveforms. In addition, since each atomic drive waveform includes drive waveforms adapted to a plurality of frequency requirements of the transient waveform described in the vibration description file, a drive waveform that conforms to a frequency of a transient waveform described in the vibration description file can be further screened out from the adapted atomic drive waveforms that are screened out. In this way, it can be ensured that linear motors with a plurality of resonant frequencies can output transient waveforms described in the same vibration description files, thereby removing the difference in the resonant frequencies of the linear motors.

It can be learned based on the foregoing content that, the plurality of pre-stored drive waveforms are saved in groups, and one group of drive waveforms (that is, an atomic drive waveform in the foregoing content) corresponds to one resonant frequency of the linear motor. Each group of drive waveforms includes at least one drive waveform, and each drive waveform is adapted to one frequency requirement of a transient waveform described in the vibration description file.

Therefore, an implementation of step S503 is:

selecting, from a plurality of groups of drive waveforms, a group of drive waveforms whose frequency matches the resonant frequency of the linear motor.

In an example, the vibration parameters of the vibration description file include that: the vibration frequency is 82 Hz; and the resonant frequency of the linear motor is 165 Hz. According to the manner of this step, a group of drive waveforms with a frequency of 165 Hz is screened out from a plurality of groups of drive waveforms.

From the selected group of drive waveforms, a drive waveform is selected according to the vibration parameter of the transient waveform described in the vibration description file.

In the foregoing example, a group of drive waveforms of 165 Hz includes a plurality of drive waveforms, and each drive waveform is a frequency of a corresponding vibration waveform. Based on this, a drive waveform with a frequency of 82 Hz is screened out from the group of drive waveforms of 165 Hz.

In one possible implementation, atomic drive waveforms are generated and stored by using the foregoing second and the third methods for generating atomic drive waveforms. If an atomic drive waveform that matches the resonant frequency of the linear motor cannot be screened out from the plurality of pre-stored atomic drive waveforms, atomic drive waveforms closest to the resonant frequency of the linear motor are first selected from the plurality of stored atomic drive waveforms. Drive waveforms are selected from the selected atomic drive waveforms according to the vibration parameter of the transient waveform described in the vibration description file. The selected drive waveforms are then interpolated according to the resonant frequency of the linear motor to obtain a drive waveform that matches the resonant frequency of the linear motor. A frequency closest to the resonant frequency of the linear motor may be understood as being the same as or having a smallest difference with the resonant frequency of the linear motor.

Optionally, according to the resonant frequency of the linear motor, the selected drive waveforms may be interpolated by using a resampling algorithm. The drive waveforms are sampled to obtain values of a plurality of sampling points. The values of the plurality of sampling points are then inserted into the drive waveforms, to adjust the drive waveforms, thereby obtaining the drive waveform that matches the resonant frequency of the linear motor.

Figure 12:
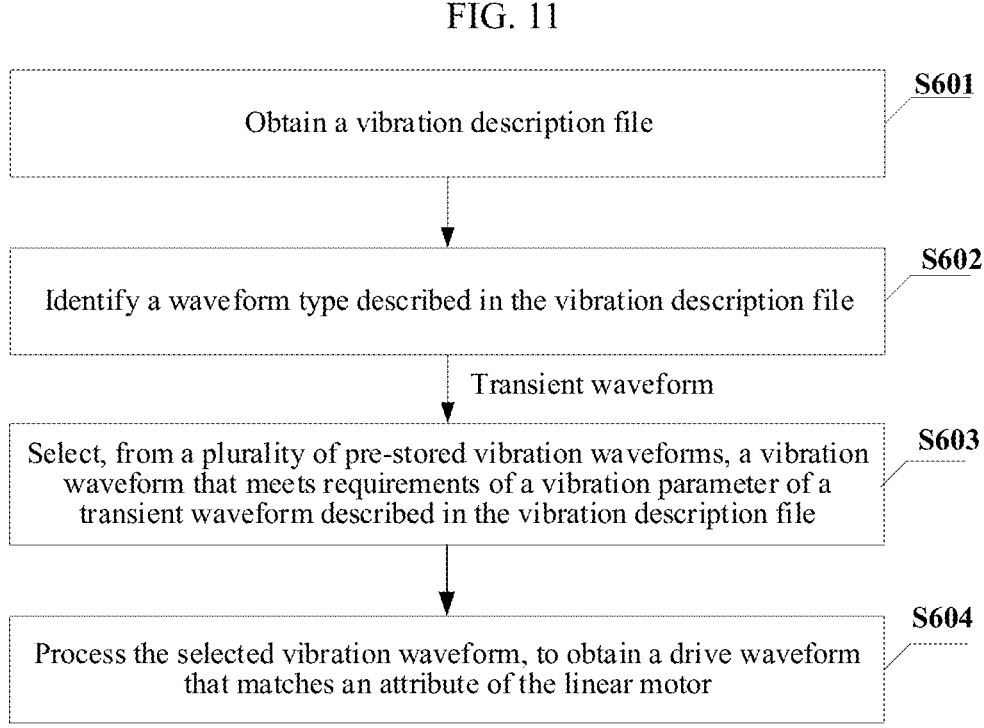

FIG. 12 shows another method for adjusting a drive waveform, applicable to an electronic device as well. The electronic device includes a linear motor. The method for adjusting a drive waveform includes:

S601: Obtain a vibration description file.

S602: Identify a waveform type described in the vibration description file.

If the waveform type described in the vibration description file is a transient waveform, step S603 is performed.

For detailed content of step S601 and step S602, reference may be made to content of step S401 and step S402 in the corresponding embodiment of FIG. 4.

S603: Select, from a plurality of pre-stored vibration waveforms, a vibration waveform that meets requirements of a vibration parameter of a transient waveform described in the vibration description file.

To meet the requirements of driving the linear motor to output vibration waveforms at different frequencies, vibration waveforms of a plurality of frequencies are pre-stored (transient vibration waveforms). If the waveform type described in the vibration description file is a transient waveform, according to a vibration parameter of the transient waveform described in the vibration description file, a vibration waveform that matches the vibration parameter of the transient waveform described in the vibration description file is selected from the plurality of pre-stored vibration waveforms.

S604: Process the selected vibration waveform, to obtain a drive waveform that matches the resonant frequency of the linear motor.

After the vibration waveform that meets the requirements of the vibration parameter of the transient waveform described in the vibration description file is selected, the inverse solution operation is performed on the vibration waveform by using the inverse solution motor voltage drive algorithm, to obtain the drive waveform that matches the resonant frequency of the linear motor.

When the inverse solution operation is performed on the vibration waveform by using the inverse solution motor voltage drive algorithm, the vibration waveform is adjusted according to the resonant frequency of the linear motor to obtain the drive waveform that matches the resonant frequency of the linear motor.

The inverse solution motor voltage drive algorithm has the function of inversely solution of the vibration waveform into a resonant frequency adapted to the linear motor. In this embodiment, the difference in the resonant frequencies of the linear motors is removed by using this function of the algorithm.

It should be further noted that, if the pre-stored vibration waveforms of a plurality of frequencies are not sufficient to cover the requirements of driving the linear motor to output according to the waveforms of all frequencies, the vibration waveform that meets the requirements of the vibration parameter of the transient waveform described in the vibration description file cannot be selected from the pre-stored plurality of vibration waveforms. For example, vibration waveforms of 100 Hz to 130 Hz are pre-stored, and the frequency of the transient waveform described in the vibration description file is 135 Hz. For the requirements of a frequency of 135 Hz of the transient waveform described in the vibration description file, a vibration waveform of the same frequency cannot be found in the vibration waveforms of 100 Hz to 130 Hz.

In this case, vibration waveforms closest to the vibration parameter of the transient waveform described in the vibration description file need to be selected from the plurality of pre-stored vibration waveforms. Certainly, the closest indicates a small difference between a frequency and the vibration parameter of the transient waveform described in the vibration description file. The selected vibration waveforms are interpolated according to the vibration parameter of the transient waveform described in the vibration description file, to obtain the vibration waveform that matches the vibration parameter of the transient waveform described in the vibration description file.

In a possible implementation, the selected vibration waveforms may be interpolated according to the vibration parameter of the transient waveform described in the vibration description file by using the resampling algorithm. The vibration waveforms are sampled to obtain values of a plurality of sampling points. The values of the plurality of sampling points are then inserted into the vibration waveforms, to adjust the vibration waveforms, thereby obtaining the vibration waveform that matches the vibration parameter of the transient waveform described in the vibration description file.

It should be further noted that, the vibration waveform processing module and the drive waveform processing module use content of three embodiments corresponding to FIG. 2, FIG. 3, or FIG. 4 to generate a drive waveform. The implementation principle thereof may be understood as follows: the drive waveform of the linear motor is generated according to the vibration parameters described in the vibration description file and the resonant frequency of the linear motor. As can be seen, in the case that the waveform type described in the vibration description file is a transient waveform, the drive waveform of the linear motor is generated according to the vibration parameters described in the vibration description file and the resonant frequency of the linear motor, which ensures that the generated drive waveform of the linear motor can be adapted to the resonant frequency of the linear motor, and the transient waveform that removes the motor difference is generated to drive the linear motor.

Figure 13:
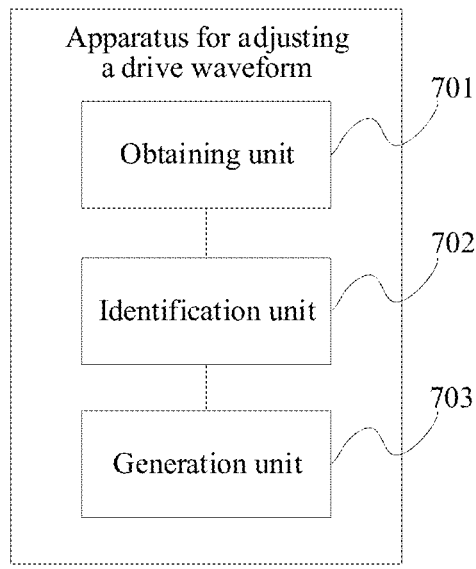
FIG. 13 is a structural diagram of an apparatus for adjusting a drive waveform according to another embodiment of this application.

An embodiment of this application provides an apparatus for adjusting a drive waveform. As shown in FIG. 13, the apparatus includes:

an obtaining unit 701, configured to obtain a vibration description file;

an identification unit 702, configured to identify a waveform type described in the vibration description file; and a generation unit 703, configured to generate, if the waveform type described in the vibration description file is a transient waveform, a drive waveform of a linear motor according to vibration parameters described in the vibration description file and a resonant frequency of the linear motor.

Optionally, in another embodiment of this application, when generating a drive waveform of a linear motor according to vibration parameters described in the vibration description file and a resonant frequency of the linear motor, the generation unit 703 is configured to: generate a plurality of half-cycle waveforms according to a parameter of a waveform array adapted to a resonant frequency of a linear motor, and combine the generated plurality of half-cycle waveforms to obtain a transient waveform described in the vibration description file.

Optionally, in another embodiment of this application, when generating a drive waveform of a linear motor according to vibration parameters described in the vibration description file and a resonant frequency of the linear motor, the generation unit 703 is configured to: select, from the plurality of pre-stored drive waveforms, a drive waveform that matches the resonant frequency of the linear motor and a drive waveform that matches the resonant frequency of the linear motor, which meets the requirements of the vibration parameter of the transient waveform described in the vibration description file.

Optionally, in another embodiment of this application, the plurality of drive waveforms are stored in groups, and one group of drive waveforms corresponds to one resonant frequency of the linear motor. Each group of drive waveforms includes at least one drive waveform, and each drive waveform is adapted to one frequency requirement of a vibration waveform of the linear motor.

When selecting, from the plurality of pre-stored drive waveforms, a drive waveform that matches the resonant frequency of the linear motor and a drive waveform that matches the resonant frequency of the linear motor, which meets the requirements of the vibration parameter of the transient waveform described in the vibration description file, the generation unit 703 is configured to: select, from a plurality of groups of drive waveforms, a group of drive waveforms that matches the resonant frequency of the linear motor; and determine, from the selected group of drive waveforms, a drive waveform that meets the requirements of the vibration parameter of the transient waveform described in the vibration description file.

Optionally, in another embodiment of this application, when generating a drive waveform of a linear motor according to vibration parameters described in the vibration description file and a resonant frequency of the linear motor, the generation unit 703 is configured to:

select, from a plurality of pre-stored vibration waveforms, a vibration waveform that meets requirements of a vibration parameter of a transient waveform described in the vibration description file; and process the selected vibration waveform, to obtain a drive waveform that matches the resonant frequency of the linear motor.

In the apparatus for adjusting a drive waveform provided in the foregoing embodiments of this application, for the specific operating processes of the obtaining unit 701, the identification unit 702, and the generation unit 703, reference may be made to the content the corresponding method embodiments, and details are described herein again.

Another embodiment of this application provides a readable storage medium, where instructions in the readable storage medium, when executed by a processor of an electronic device, cause the electronic device to perform the method for adjusting a drive waveform in any of the foregoing embodiments.

Optionally, the readable storage medium may be a non-temporary computer-readable storage medium. For example, the non-temporary computer readable storage medium may be a ROM, a random access memory (RAM), a CD-ROM, a tape, a floppy disk, or an optical data storage device.

The vibration description file is one of the key elements to control the vibration of the linear motor. The vibration description file is used for describing a vibration waveform of the linear motor. The vibration waveform indicates various vibration parameters, such as an amplitude and a frequency, in the vibration process of the motor. In the following embodiments, vibration waveforms (including a steady-state waveform and a transient waveform) of the vibration description file refer to waveforms generated by parsing the vibration description file to obtain vibration parameters and vibrating with the vibration parameters. Therefore, the waveforms may be referred to as the vibration waveforms described in the vibration description file.

As can be seen, the function of the vibration description file is to indicate how the motor vibrates. Therefore, the user can configure an expected vibration effect through the vibration description file. In product realization, the vibration effect of the electronic device is realized by the linear motor. Therefore, the vibration effect is related to the attributes of the linear motor. Therefore, although the vibration effect of the electronic device is realized by configuring the vibration description file, due to different parameters of different linear motors, the vibration generated by different linear motors may not necessarily achieve the expected vibration effect even if the corresponding vibration description file is used for configuration.

Based on the features of the different types of linear motors described above, it is found by the applicant during researches that, the reasons why the linear motor cannot provide the expected vibration effect is mainly reflected in the following two aspects:

In one aspect, the vibration sense provided by the linear motor is weak and cannot be sensed by the user or the vibration sense sensed by the user does not match the scene. For example, in a game scene, a vibration sense in an explosion scene that should be strongly sensed by the user is not sensed by the user. The reason for this problem is that a frequency of the steady-state waveform of the vibration description file does not match the linear motor that implements the vibration. For example, the steady-state waveform of the vibration description file is a debug generation of the X-axis linear motor. That is, when the expected vibration sense is provided, the X-axis linear motor can provide the expected vibration sense based on the debugging of the X-axis linear motor, to obtain the vibration description file. However, the linear motor to be driven by the vibration description file is the Z-axis linear motor. As described above, the Z-axis linear motor has a smaller volume than that of the X-axis linear motor, and thus has a smaller amplitude, so that a vibration sense realized by the Z-axis linear motor under the same parameter control is weaker than a vibration sense realized by the X-axis linear motor. Moreover, since the resonant frequency of the Z-axis linear motor is higher than the resonant frequency of the X-axis linear motor, the vibration of the Z-axis linear motor cannot be sensed after the frequency is below a threshold.

In another aspect, the tactile feedback effect of virtual keys is poor. In a case that a physical key is replaced by a virtual key, after the user presses the virtual key, the user obtains different vibration senses by using different vibration effects, to provide the user with a "soft" or "hard" press tactile sense, which, however, cannot be realized since the transient waveform of the vibration description file does not match the linear motor that implements the vibration. For example, the X-axis linear motor uses a transient waveform that has a relatively low frequency, a long duration, and an amplitude that may be large or small to simulate the "soft" tactile sense (uses a transient waveform that has a relatively high frequency, a short duration, and an amplitude that may be large or small to simulate the "hard" tactile sense). Since the resonant frequency of the Z-axis linear motor is lower than the resonant frequency of the X-axis linear motor, resulting in a decrease in the low-frequency vibration sense. Therefore, if the transient waveform that simulates the "soft" vibration sense is described in the vibration description file according to a feature of the X-axis linear motor and is implemented by the Z-axis linear motor, the user may not sense the "soft" vibration sense, and thus may not distinguish between "soft" and "hard" tactile senses.

Therefore, it is necessary to adjust the vibration waveform of the vibration description file, so that the vibration waveform is adapted to the linear motor that implements the vibration, to ensure that the expected vibration effect and the expected vibration sense are obtained.

According to the method for adjusting a vibration waveform of a linear motor disclosed in the embodiments of this application, the vibration waveform described in the vibration description file is adjusted based on the feature of the linear motor that implements the vibration, so that the vibration waveform is adapted to the linear motor that implements the vibration, to ensure that the expected vibration effect and the expected vibration sense are obtained.

The motor 191 includes at least one Z-axis linear motor shown in FIG. 1b. This is because the Z-axis linear motor is smaller in volume, thereby saving space inside the electronic device and facilitating thinning of the electronic device. In this case, the vibration waveform described in the vibration description file may not achieve the expected vibration effect through the Z-axis linear motor. Therefore, it is necessary to adjust the vibration waveform described in the vibration description file.

The internal memory 121 may be configured to store computer executable program code, and the executable program code includes instructions. The processor 110 runs the instruction stored in the internal memory 121, to perform various function applications and data processing of the electronic device. For example, in this embodiment, the processor 110 may adjust the vibration waveform described in the vibration description file by executing instructions, apparatuses, or modules stored in the internal memory 121. In another example, in response to a signal inputted from the virtual key in the touch screen, the processor 110 drives, by using the adjusted vibration waveform, the linear motor to vibrate, to provide vibration feedback on the operation of the user pressing the virtual key.

The internal memory 121 may include a program storage region and a data storage region. The program storage region may store an operating system, an application program required by at least one function (for example, a voice playing function or an image playing function), and the like. The data storage region may store data (for example, audio data and an address book) and the like created when the electronic device is used. In addition, the internal memory 121 may include a high-speed random access memory, or may include a non-volatile memory such as at least one magnetic disk memory, a flash memory, or a universal flash storage (universal flash storage, UFS). The processor 110 runs the instructions stored in the internal memory 121 and/or the instructions stored in the memory disposed in the processor, to implement various functional applications and data processing of the electronic device.

The method for adjusting a vibration waveform of a linear motor according to the embodiments of this application may be applied to the vibration waveform processing module in FIG. 3a. The method for adjusting a vibration waveform of a linear motor is described in detail below.

Figure 14:
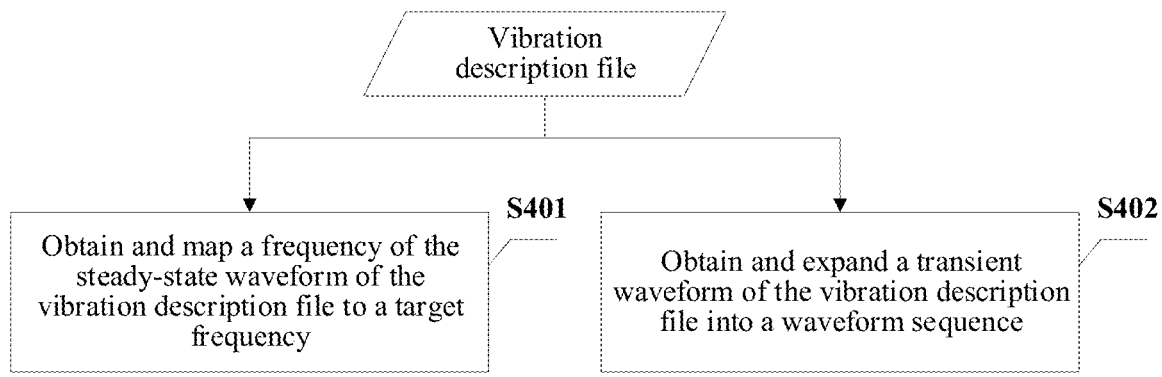
FIG. 14 is a flowchart of a method for adjusting a vibration waveform of a linear motor according to an embodiment of this application.

FIG. 14 shows a method for adjusting a vibration waveform of a linear motor disclosed in an embodiment of this application. The method includes the following steps:

S401. Map a frequency of a steady-state waveform described in a vibration description file to a target frequency.

The steady-state waveform is a vibration waveform of the linear motor that is driven to undergo a rising stage, a stable vibration stage, and a stop stage. The rising stage, the stable vibration stage, and the stop stage are three stages that the linear motor undergoes from the beginning of the vibration to the end of the vibration. In the rising stage, the vibration form of the linear motor is expressed as free damping vibration accompanied by forced vibration. In the stable vibration stage, the vibration form of the linear motor is expressed as steady-state forced vibration of equal magnitude. In the stop stage, the vibration form of the linear motor is expressed as free damping vibration.

In this step, the target frequency is obtained according to a lower limit frequency, an upper limit frequency, and a preset first mapping rule.

The lower limit frequency meets that: an amplitude of the linear motor at the lower limit frequency is greater than a preset threshold. The purpose of setting the preset threshold is to ensure that the vibration intensity can be sensed by the user. Therefore, the preset threshold may be pre-configured according to the actual vibration effect of the linear motor. When the amplitude is not greater than the preset threshold, the vibration sense of the linear motor may be weak, which reduces the sensing of the user for the vibration. Therefore, an amplitude of the lower limit frequency is greater than the preset threshold, so that the sensing of the user for the vibration is not weakened.

The upper frequency falls within a resonant frequency range of the linear motor, that is, may be any value in the resonant frequency range. Since a frequency in the resonant frequency range of the linear motor corresponds to a large amplitude, the upper limit frequency is set in the resonant frequency range, which ensures that the linear motor has large vibration intensity, to ensure that the user can sense the vibration sense.

The first mapping rule indicates a rule for mapping from the lower limit frequency and the upper limit frequency to the target frequency. The first mapping rule may be pre-configured, and detailed content is described in the following embodiments.

Figure 15:
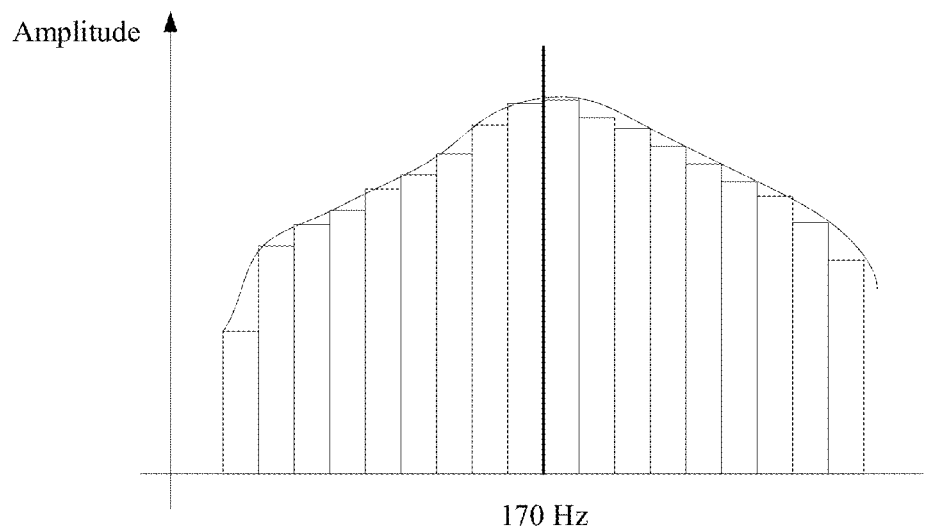
FIG. 15 is an exemplary diagram of a steady-state waveform of a vibration description file.
Figure 16:
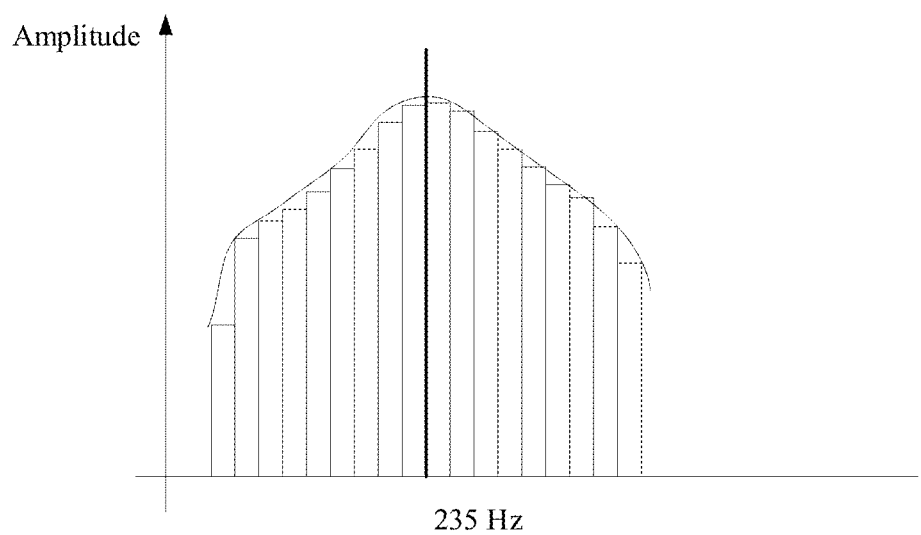
FIG. 16 is an example diagram of a waveform obtained by performing frequency mapping on the steady-state waveform shown in FIG. 15.

Taking FIG. 15 as an example, the frequency of the steady-state waveform described in the vibration description file is 170 Hz, that is, the resonant frequency of the X-axis linear motor. It is assumed that the linear motor that implements the vibration is the Z-axis linear motor. The resonant frequency of the Z-axis linear motor is generally 235 Hz. Therefore, when the vibration waveform described in the vibration description file is directly used to control the vibration of the Z-axis linear motor, the expected vibration sense may not be obtained. Therefore, according to S201, the exemplary steady-state waveform of FIG. 15 may be mapped to the exemplary steady-state waveform of FIG. 16. As can be seen, the frequency is mapped from 170 Hz to the target frequency of 235 Hz.

As can be seen, after the frequency mapping, the target frequency is not related to the frequency of the steady-state waveform described in the vibration description file, but only related to the linear motor that implements the vibration. Therefore, the vibration waveform is more adapted to the linear motor that implements the vibration. Even if the volume of the linear motor that implements the vibration is small, it can be ensured that under the same control parameters, the vibration waveform has a comparable vibration effect and vibration sense with the linear motor of a large volume. That is, S401 can resolve the problem of the first aspect above.

S402. Expand a transient waveform described in the vibration description file into a waveform sequence.

The transient waveform is a vibration waveform of the linear motor that is driven to undergo only the rising stage.

As described in the another aspect above, the "soft" tactile sense needs to be implemented by a low-frequency transient waveform, but a resonant spectrum of the Z-axis linear motor is higher than that of the X-axis linear motor. Therefore, a vibration sense generated by the Z-axis linear motor controlled by the transient waveform described in the vibration description file cannot be sensed. Therefore, in this step, the transient waveform described in the vibration description file is expanded into the waveform sequence formed by a plurality of transient waveforms. The waveform sequence, compared with the transient waveform, increases the quantity of vibrations, that is, the vibration sense changes from "vibrating once" to "vibrating many times", thereby helping the user to sense the vibration sense.

In this step, the waveform sequence is formed by a plurality of target transient waveforms, where a frequency of the waveform sequence is the same as a frequency of a transient waveform described in the vibration description file, and a frequency of a target transient waveform is adapted to the linear motor.

Figure 17:
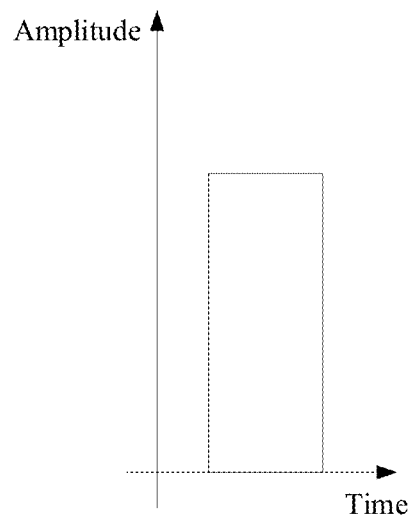
FIG. 17 is an exemplary diagram of a transient waveform of a vibration description file.
Figure 18:
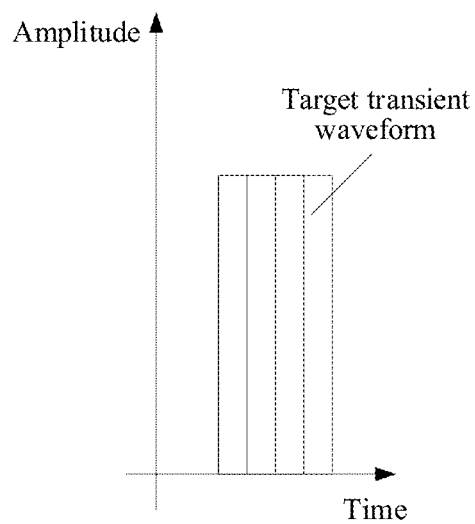
FIG. 18 is an exemplary diagram of a waveform sequence obtained by expanding the transient waveform shown in FIG. 17.

That the frequency of the target transient waveform is adapted to the linear motor means that the frequency of the target transient waveform is in the resonant frequency range of the linear motor. For example, the frequency of the target transient waveform is the resonant frequency of the linear motor, ensuring that the linear motor has higher vibration intensity, so that the user can sense the vibration sense, and the foundation for the user to further sense "soft" or "hard" is laid. FIG. 17 is an example of a transient waveform described in a vibration description file, and FIG. 18 shows a waveform sequence obtained by expanding the transient waveform shown in FIG. 17. A frequency of the waveform sequence in FIG. 18 is the same as a frequency of the transient waveform shown in FIG. 17.

As described above, the vibration duration is a feature distinguishing between "soft" and "hard". Moreover, the frequency of the waveform sequence is the same as the frequency of the transient waveform described in the vibration description file. Therefore, the transient waveform described in the description file is expanded into the waveform sequence, so that the waveform sequence can follow an expected tactile sense of the transient waveform described in the vibration description file due to different quantities of transient waveforms in the waveform sequence, to distinguish between "soft"" and "hard".

In summary, even if the linear motor that implements the vibration is small in volume, the simulation of "soft" or "hard" can be achieved, that is, S402 can resolve the problem of the second aspect above.

In summary, the method for adjusting a vibration waveform of a linear motor provided in this embodiment can improve the vibration effect of the linear motor, so that the linear motor achieves a vibration sense required (by the user).

It should be noted that, since the vibration description file may include a plurality of vibration events, that is, may include both transient vibration events and steady-state vibration events, at least S402 or S402 may be performed, or both S402 and S402 may be performed.

Figure 19:
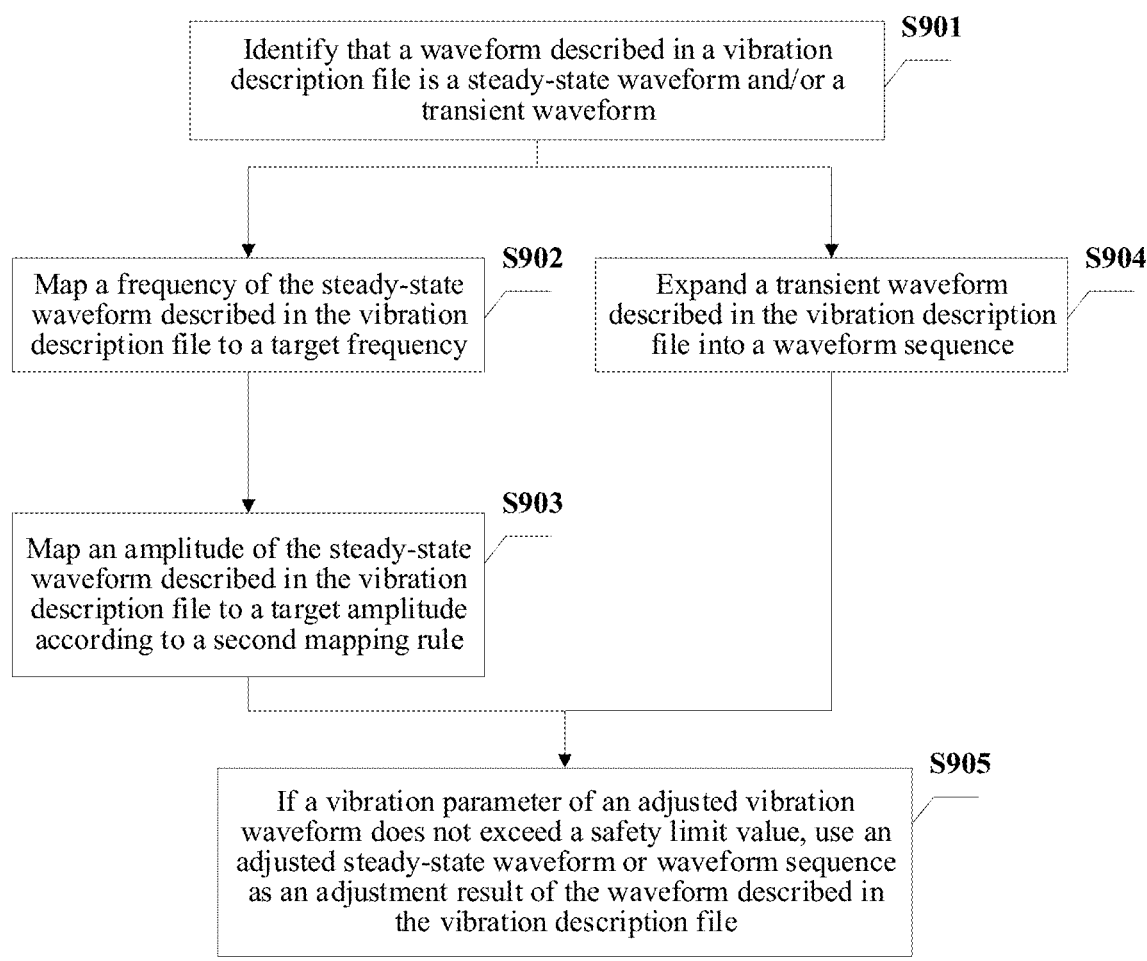
FIG. 19 is a flowchart of a method for adjusting a vibration waveform of a linear motor according to an embodiment of this application.

FIG. 19 shows another method for adjusting a vibration waveform of a linear motor disclosed in an embodiment of this application. Compared with the foregoing embodiment, the main difference is that frequency mapping rules and amplitude determination rules are further defined.

As shown in FIG. 19, the method includes the following steps:

S901: Identify that a waveform of a vibration description file is at least one of a steady-state waveform or a transient waveform.

It may be understood that, an identifier indicating the steady-state waveform or the transient waveform may be included in the vibration description file. The type of the waveform is identified through the identifier.

S902. Map a frequency of the steady-state waveform of the vibration description file to a target frequency.

The target frequency is obtained according to a lower limit frequency, an upper limit frequency, and a preset first mapping rule.

Optionally, the first mapping rule is an exponential rule met by a frequency distribution within a target frequency range, where the target frequency range is defined by the lower limit frequency and the upper limit frequency. That is, a frequency distributed in the target frequency range meets the exponential rule: assuming the target frequency range is [a, b], other frequency values in [a, b] meet an exponential relationship with a and b.

It should be noted that, in this embodiment, the exponential rule is adopted, to obtain through the following experimental process: frequencies mapped in various rules (including the exponential rule, a linear rule, and the like). Vibration sense parameters of the user corresponding to the frequencies are measured, and an optimal vibration sense parameter is obtained by comparison. A frequency corresponding to the optimal vibration sense parameter is an optimal frequency. Experiments prove that mapping through the exponential rule yields the optimal frequency. It may be understood that, the vibration sense parameters may be set according to requirements, and are not defined herein.

As can be seen, selecting the exponential relationship from the perspective of the vibration sense of the user can enable the user to obtain a better vibration sense, to obtain better user experience.

S903: Map an amplitude of the steady-state waveform described in the vibration description file to a target amplitude according to a second mapping rule.

The second mapping rule is a sin-like function rule met by an amplitude distribution within a first target amplitude range, where the first target amplitude range is defined by a lower limit amplitude of the linear motor and an upper limit amplitude of the linear motor. That is, an amplitude distributed in the first target amplitude range meets the sin-like function rule: assuming the first target amplitude range is [c, d], other amplitude values in [c, d], c, and d meet a sin-like function relationship.

Specifically, the lower limit amplitude of the linear motor is generally a minimum amplitude that can be felt, for example, 0; and the upper limit amplitude is an amplitude at a specified frequency, for example, an amplitude corresponding to a resonant frequency. The amplitude is selected from this range to ensure that the vibration is sensed. Further, the process of selecting the sin-like function rule is similar to the process of selecting the foregoing exponential rule, that is, selected from a variety of rules based on a vibration sense. Therefore, for the limitation of the amplitude, it is ensured that the user senses the vibration sense from the dimension of the amplitude, and the sin-like function rule is further used, which enables the user to obtain a better vibration sense.

An example of an application scenario of S902 and S903 is: According to an expected vibration sense, the user generates a steady-state waveform based on the debugging of the X-linear motor, and further generates a vibration description file of the steady-state waveform.

However, the linear motor configured on the electronic device is the Z-axis linear motor, that is, the linear motor to be driven by the vibration description file is the Z-axis linear motor. The Z-axis linear motor has a smaller volume than that of the X-axis linear motor, and resonant frequencies thereof are much different, so that a vibration sense realized by the Z-axis linear motor under the same parameter control is weaker than a vibration sense realized by the X-axis linear motor. Therefore, the vibration generated by the Z-axis linear motor driven by the vibration description file on the electronic device cannot achieve the expected vibration sense. In the prior art, the user needs to reconfigure a vibration description file for the Z-axis linear motor. However, in this embodiment, S902 and S903 redefines the frequency and the amplitude adapted to the Z-axis linear motor through the mapping of the frequency and amplitude, to adjust the vibration waveform adapted to the X-axis linear motor to obtain the vibration waveform adapted to the Z-axis linear motor, thereby providing the possibility for the Z-axis linear motor to realize a vibration sense similar to that of the X-axis linear motor. Therefore, the user does not need to reconfigure the vibration description file to achieve the expected vibration sense on different types of linear motors by using the same vibration description file.

S904. Expand a transient waveform described in the vibration description file into a waveform sequence.

The waveform sequence is formed by a plurality of target transient waveforms. A frequency of the waveform sequence is the same as a frequency of the transient waveform described in the vibration description file.

Optionally, an amplitude of the target transient waveform is adapted to the linear motor, for example, the amplitude of the target transient waveform is an amplitude of a resonant frequency of the linear motor.

Further, an amplitude of the waveform sequence is obtained by mapping an amplitude of a transient waveform described in the vibration description file according to a third mapping rule. Specifically, the third mapping rule includes a sin-like function rule met by an amplitude distribution within a second target amplitude range, where the second target amplitude range is defined by a lower limit amplitude of the linear motor and an upper limit amplitude of the linear motor. The limitation of amplitude can further improve the vibration effect. In addition, the used of the sin-like function rule can enable the user to obtain a better vibration sense, to obtain better user experience.

It may be understood that in this embodiment, an example is taken in which the second mapping rule and the third mapping rule are the same. In practice, the second mapping rule and the third mapping rule may be alternatively the same, which is not limited herein.

An example of an application scenario of S904 is: According to expected "soft" and "hard" tactile senses, the user generates a steady-state waveform based on the debugging of the X-linear motor, and further generates a vibration description file of the steady-state waveform. However, the linear motor configured on the electronic device is the Z-axis linear motor, that is, the linear motor to be driven by the vibration description file is the Z-axis linear motor. The Z-axis linear motor has a smaller volume than that of the X-axis linear motor, and resonant frequencies thereof are much different, so that a vibration sense realized by the Z-axis linear motor under the same parameter control is weaker than a vibration sense realized by the X-axis linear motor. Even an amplitude of a low frequency part of a vibration waveform of the X-axis linear motor cannot be sensed on the Z-axis linear motor. Therefore, on the electronic device equipped with the Z-axis linear motor, the user cannot obtain the "soft" or "hard" tactile senses after a virtual key is pressed. However, in S904, the quantity of transient waveforms is increased, so that the "soft" tactile sense can be simulated. Further, since the frequency of the waveform sequence is the same as the frequency of the transient waveform described in the vibration description file, the "soft" and "hard" tactile senses can be distinguished. Therefore, the user does not need to reconfigure the vibration description file to distinguish between the "soft" and "hard" tactile senses on different types of linear motors by using the same vibration description file.

S905: If a vibration parameter of an adjusted vibration waveform does not exceed a safety limit value, use an adjusted steady-state waveform or waveform sequence as an adjustment result of the waveform described in the vibration description file.

Specifically, the safety limit value may include an amplitude limit value. The amplitude limit value is determined according to a maximum voltage and a maximum stroke of the linear motor. The purpose of setting the safety limit value is to reduce the probability of damage to the linear motor caused by adjusting the vibration waveform.

In summary, the method for adjusting a vibration waveform of a linear motor disclosed in this embodiment has the following beneficial effects:

1. In a case of mismatch between the vibration description file and the linear motor, the vibration sense of the linear motor of a small volume can be improved, so that the linear motor of a small volume can achieve richer vibration sense experience.
2. The universality of the vibration description file is improved. Even if the vibration description file does not match the linear motor, it is not necessary to modify the vibration description file to adapt to the linear motor, but instead, the vibration waveform is adjusted to obtain a vibration waveform adapted to the linear motor.
3. Based on the adjustment of the vibration waveform, the safety of the linear motor is ensured.

It should be noted that, the foregoing embodiments are described by taking the linear motor of a small volume as an example, but are not limited to the linear motor of a small volume, but instead, to all linear motors.

Figure 20:
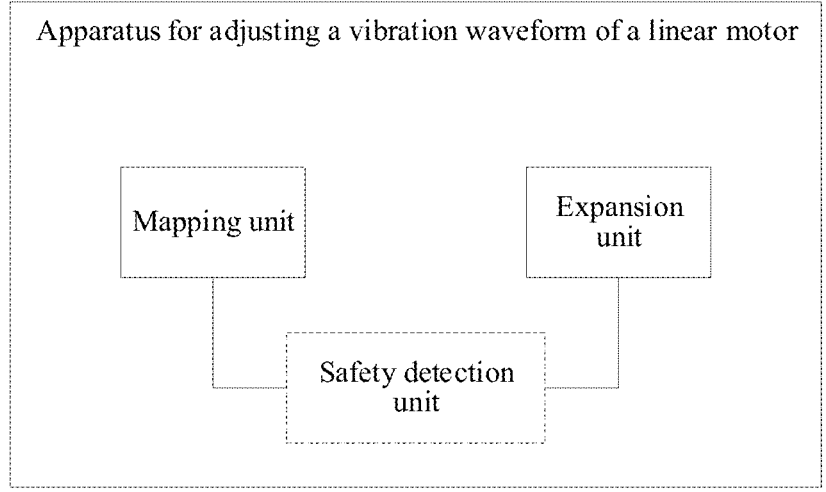
FIG. 20 is a schematic structural diagram of an apparatus for adjusting a vibration waveform of a linear motor according to an embodiment of this application.

FIG. 20 shows an apparatus for adjusting a vibration waveform of a linear motor disclosed in an embodiment of this application. The apparatus includes a mapping unit and an expansion unit. Optionally, the apparatus may further include a safety detection unit.

The mapping unit is configured to map a frequency of a steady-state waveform described in a vibration description file to a target frequency. The target frequency is obtained according to a lower limit frequency, an upper limit frequency, and a preset first mapping rule. The lower limit frequency meets that: an amplitude of the linear motor at the lower limit frequency is greater than a preset threshold. The upper frequency falls within a resonant frequency range of the linear motor.

The expansion unit is configured to expand a transient waveform described in the vibration description file into a waveform sequence. The waveform sequence is formed by a plurality of target transient waveforms, where a frequency of the waveform sequence is the same as a frequency of a transient waveform described in the vibration description file, and a frequency of a target transient waveform is adapted to the linear motor.

The safety detection unit is configured to use, if a vibration parameter of an adjusted vibration waveform does not exceed a safety limit value, an adjusted steady-state waveform or waveform sequence as an adjustment result of the waveform described in the vibration description file.

Optionally, the first mapping rule may be an exponential rule met by a frequency distribution within a target frequency range, where the target frequency range is defined by the lower limit frequency and the upper limit frequency.

Optionally, the mapping unit is further configured to map, after mapping the frequency of the steady-state waveform described in the vibration description file to the target frequency, an amplitude of the steady-state waveform described in the vibration description file to a target amplitude according to a second mapping rule. The second mapping rule includes a sin-like function rule met by an amplitude distribution within a first target amplitude range, where the first target amplitude range is defined by a lower limit amplitude of the linear motor and an upper limit amplitude of the linear motor.

Optionally, an amplitude of the target transient waveform in the waveform sequence is adapted to the linear motor.

For specific implementations of the functions of the foregoing units, reference may be made to the foregoing embodiments, and details are not described herein again.

The apparatus for adjusting a vibration waveform of a linear motor shown in FIG. 20 can achieve the expected vibration effect, especially in a case that the vibration waveform described in the vibration description file is implemented based on a linear motor of a large volume and the linear motor that implements the vibration has a small volume, so that the linear motor of a small volume achieves a vibration effect comparable to that of the linear motor of a large volume.

An embodiment of this application further provides a readable storage medium, storing a computer program, where the computer program, when executed by a processor, implements the method for adjusting a vibration waveform of a linear motor according to the foregoing embodiments, to improve the vibration effect of the linear motor.

An embodiment of this application provides an apparatus for controlling a linear motor, applicable to an electronic device. The electronic device includes a linear motor. The apparatus includes:
a determining unit, configured to determine, in response to an operation instruction, a vibration description file of an operation object of the operation instruction; and
an output unit, configured to output a vibration sense that meets a waveform requirement of the vibration description file, where the vibration sense is provided by a linear motor in a first vibration state, and the first vibration state matches an attribute of the linear motor.

Figure 21:
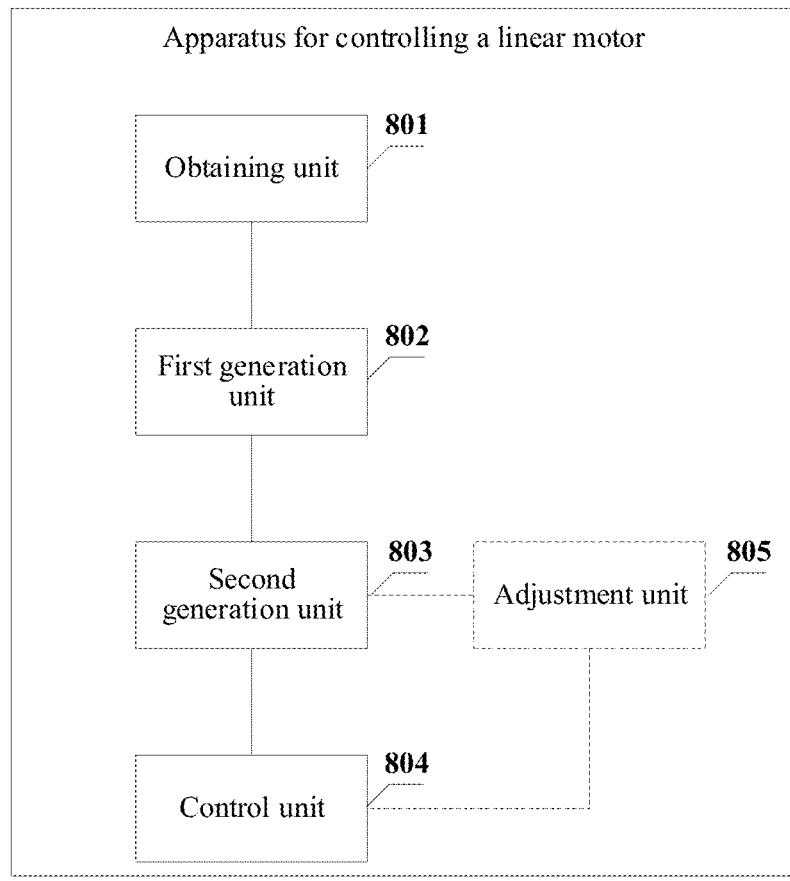
FIG. 21 is a schematic structural diagram of an apparatus for controlling a linear motor according to an embodiment of this application.

To support operating of the determining unit and the output unit in the foregoing embodiment, execution units in the apparatus for controlling a linear motor include:

FIG. 21 shows an apparatus for controlling a linear motor provided in an embodiment of this application. The apparatus includes: an obtaining unit 801, a first generation unit 802, a second generation unit 803, and a control unit 804.

The obtaining unit 801 is configured to obtain a vibration description file. The first generation unit 802 is configured to generate a vibration waveform according to a vibration parameter described in the vibration description file and an attribute of a linear motor. The second generation unit 803 is configured to generate a drive waveform according to the attribute of the linear motor and the vibration waveform. The control unit 804 is configured to control the linear motor by using the drive waveform.

The obtaining unit, the first generation unit, and the second generation unit may be understood as execution units in the waveform processing module in FIG. 3*a*, the first generation unit belongs to the vibration waveform processing module, and the second generation unit belongs to the drive waveform processing module. The control unit refers to the synthesis module and a drive IC in FIG. 3*a*.

Optionally, the obtaining unit 801 is configured to obtain a vibration description file, which is used for displaying a first interface, and displaying an obtained waveform in the first interface; obtain an adjustment instruction for the waveform; and generate a vibration description file in response to the adjustment instruction.

Optionally, the obtaining unit 801 performs the step of generating a vibration description file in response to the adjustment instruction, to: display an adjusted waveform in response to an adjustment instruction on the waveform in the interaction interface; and generate a vibration description file of the adjusted waveform.

Optionally, the obtaining unit 801 performs the step of displaying an adjusted waveform in response to an adjustment instruction on the waveform in the interaction interface, to: display, in response to an operation instruction on a preset adjustment point on the waveform displayed in the interaction interface, an adjustment point on the waveform; and display, in response to a drag instruction on the adjustment point in a first vibration parameter adjustment mode, a waveform after a first vibration parameter is adjusted, where the first vibration parameter includes an amplitude and/or a frequency.

Optionally, the waveform includes a steady-state waveform, and the first vibration parameter further includes a time parameter; and the obtaining unit 801 performs the step of displaying, in response to a drag instruction on the adjustment point in a first vibration parameter adjustment mode, a waveform after a first vibration parameter is adjusted, to: display, in response to the drag instruction on the adjustment point on a time axis in a time adjustment mode, the waveform after the time parameter is adjusted.

Optionally, that the obtaining unit 801 performs the step of displaying an adjusted waveform in response to an adjustment instruction on the waveform in the interaction interface includes: displaying, in response to a drag instruction on the waveform displayed in the interaction interface, the waveform after a time parameter is adjusted.

Optionally, the obtaining unit 801 is further configured to display indication information corresponding to a value of an adjusted parameter in the interaction interface.

Optionally, the obtaining unit 801 performs the step of generating a vibration description file in response to the adjustment instruction, to: superimpose a plurality of waveforms in response to a superimposition instruction, and generate a vibration description file of a superimposed waveform. The plurality of waveforms are at least a part of the foregoing waveform.

Optionally, when generating a vibration waveform according to a vibration parameter described in the vibration description file and an attribute of a linear motor, the first generation unit 802 is configured to: obtain a frequency of a steady-state waveform of the vibration description file, and map the frequency to a target frequency according to a preset first mapping rule and a frequency of the linear motor; and/or obtain a transient waveform of the vibration description file and expand the transient waveform into a waveform sequence. The waveform sequence is formed by a plurality of target transient waveforms, where a frequency of the waveform sequence is the same as a frequency of a transient waveform of the vibration description file, and a frequency of a target transient waveform is adapted to the linear motor.

Optionally, the target frequency is obtained according to a lower limit frequency, an upper limit frequency, and a preset first mapping rule. The lower limit frequency meets that: an amplitude of the linear motor at the lower limit frequency is greater than a preset threshold. The upper frequency falls within a resonant frequency range of the linear motor.

Optionally, after mapping the frequency to the target frequency, the first generation unit 802 is further configured to:
map an amplitude of the steady-state waveform to a target amplitude according to a second mapping rule. The second mapping rule includes a sin-like function rule met by an amplitude distribution within a first target amplitude range, where the first target amplitude range is defined by a lower limit amplitude of the linear motor and an upper limit amplitude of the linear motor.

Optionally, an amplitude of the waveform sequence is obtained by mapping an amplitude of a transient waveform of the vibration description file according to a third mapping rule. The third mapping rule includes a sin-like function rule met by an amplitude distribution within a second target amplitude range, where the second target amplitude range is defined by a lower limit amplitude of the linear motor and an upper limit amplitude of the linear motor.

Optionally, when generating a vibration waveform according to a vibration parameter described in the vibration description file and an attribute of a linear motor, the first generation unit 802 is configured to: extract a startup time and a stop time from the vibration description file if the waveform type described in the vibration description file is a steady-state waveform; and process an amplitude of the steady-state waveform within the startup time into an amplitude that changes smoothly from zero to an amplitude of a linear motor stable vibration state, and process an amplitude of the steady-state waveform within the stop time into an amplitude that changes smoothly from the amplitude of the linear motor stable vibration state to zero.

Optionally, the first generation unit 802 processes the amplitude of the steady-state waveform within the startup time into the amplitude that changes smoothly from zero to the amplitude of the linear motor stable vibration state, to:
superimpose a cosine waveform on the steady-state waveform within the startup time, to obtain the steady-state waveform whose amplitude within the startup time changes smoothly from zero to the amplitude of the linear motor stable vibration state; or
process the steady-state waveform within the startup time by using the ramp algorithm, to obtain the steady-state waveform whose amplitude within the startup time changes smoothly from zero to the amplitude of the linear motor stable vibration state.

Optionally, the first generation unit 802 processes the amplitude of the steady-state waveform within the stop time into the amplitude that changes smoothly from the amplitude of the linear motor stable vibration state to zero, to:
superimpose a cosine waveform on the steady-state waveform within the stop time, to obtain the steady-state waveform whose amplitude within the stop time changes smoothly from the amplitude of the linear motor stable vibration state to zero; or process the steady-state waveform within the stop time by using the ramp algorithm, to obtain the steady-state waveform whose amplitude within the stop time changes smoothly from the amplitude of the linear motor stable vibration state to zero.

Optionally, during operation, the first generation unit 802 and the second generation unit 803 are configured to:
generate, if the waveform type described in the vibration description file is a transient waveform, a drive waveform of a linear motor according to vibration parameters described in the vibration description file and a resonant frequency of the linear motor.

Optionally, that the first generation unit 802 and the second generation unit 803 generate a drive waveform of a linear motor according to vibration parameters described in the vibration description file and a resonant frequency of the linear motor includes:
generating a plurality of half-cycle waveforms according to a parameter of a waveform array adapted to a resonant frequency of a linear motor, and
combining the generated plurality of half-cycle waveforms to obtain a transient waveform described in the vibration description file.

Optionally, when generating a drive waveform of a linear motor according to vibration parameters described in the vibration description file and a resonant frequency of the linear motor, the first generation unit 802 and the second generation unit 803 are configured to:
select, from the plurality of pre-stored drive waveforms, a drive waveform that matches the resonant frequency of the linear motor and a drive waveform that matches the resonant frequency of the linear motor, which meets the requirements of the vibration parameter of the transient waveform described in the vibration description file.

Optionally, the plurality of pre-stored drive waveforms are stored in groups, and one group of drive waveforms corresponds to one resonant frequency of the linear motor. Each group of drive waveforms includes at least one drive waveform, and each drive waveform is adapted to one frequency requirement of a vibration waveform of the linear motor.

When selecting, from the plurality of pre-stored drive waveforms, a drive waveform that matches the resonant frequency of the linear motor and a drive waveform that matches the resonant frequency of the linear motor, which meets the requirements of the vibration parameter of the transient waveform described in the vibration description file, the first generation unit 802 and the second generation unit 803 are configured to:
select, from a plurality of groups of drive waveforms, a group of drive waveforms that matches the resonant frequency of the linear motor; and determine, from the selected group of drive waveforms, a drive waveform that meets the requirements of the vibration parameter of the transient waveform described in the vibration description file.

Optionally, when generating a drive waveform of a linear motor according to vibration parameters described in the vibration description file and a resonant frequency of the linear motor, the first generation unit 802 and the second generation unit 803 are configured to: select, from a plurality of pre-stored vibration waveforms, a vibration waveform that meets requirements of a vibration parameter of a transient waveform described in the vibration description file; and process the selected vibration waveform, to obtain a drive waveform that matches the resonant frequency of the linear motor.

To achieve stronger functions and better user experience, the vibration of the linear motor may be designed for different service scenarios of the electronic device. For example, when a mobile phone plays music, the linear motor vibrates with the rhythm of the music. However, different services of the electronic device may overlap, for example, receiving information when the mobile phone plays music, that is, the music playing service coincides with the information service. When different services of the electronic device overlap, vibration of the linear motor in a service scenario may cause interference to other services. In the example above, when the user views the information, the mobile phone still plays the music, and the linear motor is still controlled to vibrate with the music. In this case, the vibration causes interference to the user viewing the information.

Specifically, it is assumed that a second event (for example, a short message application) is triggered (for example, a short message is received) when the electronic device executes a program implementing a first event (for example, audio playback), the program implementing the first event is aborted, and a program implementing the second event is executed. Until the second event is completed, the program implementing the first event is continuously executed. Alternatively, the first event and the second event are executed simultaneously. That is, the program implementing the first event and the program implementing the second event are executed in parallel.

Simply put, interruption means that execution of an event is interrupted, or a parallel event is added during execution of an event.

An interruption event refers to interrupting an event that is being executed, or adding an event that is executed in parallel with another event while the another event is being executed.

As can be seen, the vibration originally designed for the service scenario to achieve better user experience may, in some cases, reduce the user experience. As can be seen, the vibration function of the electronic device needs to be further improved. To improve the vibration function of the electronic device and avoid the possibility of reducing the user experience, an embodiment of this application provides a method and apparatus for adjusting a drive waveform.

The motor 191 includes at least one of the linear motors shown in FIG. 1*a* and FIG. 1*b*.

The internal memory 121 may be configured to store computer executable program code, and the executable program code includes instructions. The processor 110 runs the instruction stored in the internal memory 121, to perform various function applications and data processing of the electronic device. For example, in this embodiment, the processor 110 may adjust a drive waveform by executing instructions, apparatuses, or modules stored in the internal memory 121.

The internal memory 121 may include a program storage region and a data storage region. The program storage region may store an operating system, an application program required by at least one function (for example, a voice playing function or an image playing function), and the like. The data storage region may store data (for example, audio data and an address book) and the like created when the electronic device is used. In addition, the internal memory 121 may include a high-speed random access memory, or may include a non-volatile memory such as at least one magnetic disk memory, a flash memory, or a universal flash storage (universal flash storage, UFS). The processor 110 runs the instructions stored in the internal memory 121 and/or the instructions stored in the memory disposed in the processor, to implement various functional applications and data processing of the electronic device.

The method for adjusting a drive waveform according to the embodiments of this application may be applied to the drive waveform processing module in FIG. 3*a*. Further, the cooperation of the vibration description file generation module is also required.

The method for adjusting a drive waveform described in the embodiments of this application is described in detail below.

Figure 22A:
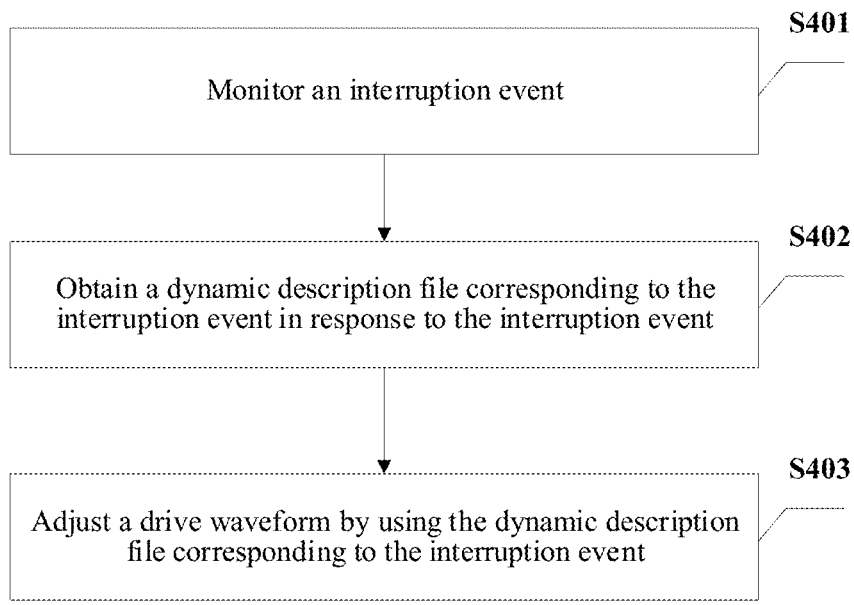
FIG. 22a is a flowchart of a method for adjusting a drive waveform according to an embodiment of this application.

FIG. 22*a* shows a method for adjusting a drive waveform disclosed in an embodiment of this application. The method includes the following steps:

S401: Monitor an interruption event.

Information about the interruption event that needs to be monitored, for example, an identifier, may be pre-configured as needed. It is determined that the interruption event is monitored after the information about the interruption event is monitored.

S402: Obtain a dynamic description file corresponding to the interruption event in response to the interruption event.

A vibration description file is used for describing vibration parameters of a vibration waveform, for example, a frequency and an amplitude of the vibration waveform. The dynamic description file refers to a vibration description file that describes vibration parameters for controlling vibration of the linear motor when the interruption event occurs.

The dynamic description file corresponds to a static description file. The static description file refers to a vibration description file that describes vibration parameters for controlling vibration of the linear motor when the interruption event does not occur.

That is, when the interruption event does not occur, the vibration of the linear motor is controlled by using the static description file; and when the interruption event occurs, the vibration of the linear motor is controlled by using the dynamic description file, to mitigate the interference of the vibration of the linear motor with the interruption event.

In this embodiment, the interruption event takes a short message received by a short message application as an example, and an interrupted event takes the playback of music as an example.

The correspondence between the interruption event and the dynamic description file may be pre-configured. For example, an identifier of the corresponding interruption event is written in the dynamic description file.

Optionally, the dynamic description file may be pre-configured, and is obtained from the storage space in this step. Alternatively, the dynamic description file corresponding to the interruption event may be generated in response to the interruption event. The method for generating the dynamic description file is described in the following embodiment.

S403: Adjust a drive waveform by using the dynamic description file corresponding to the interruption event.

As described above, the dynamic description file and the static description file both describe vibration parameters, such as amplitudes and frequencies. In addition, the role of the dynamic description file is to mitigate the interference of the vibration of the linear motor to the interruption event. Therefore, it may be understood that, in the vibration parameters described in the dynamic description file, at least one vibration parameter has a value that is smaller than a value of the vibration parameter in the static description file.

For example, an amplitude of a transient waveform 01 described in the static description file is 0.9, and an amplitude of a transient waveform 02 described in the dynamic description file is 0.3. The transient waveform 01 described in the static description file and the transient waveform 02 described in the dynamic description file have the same frequencies.

Figure 22B:
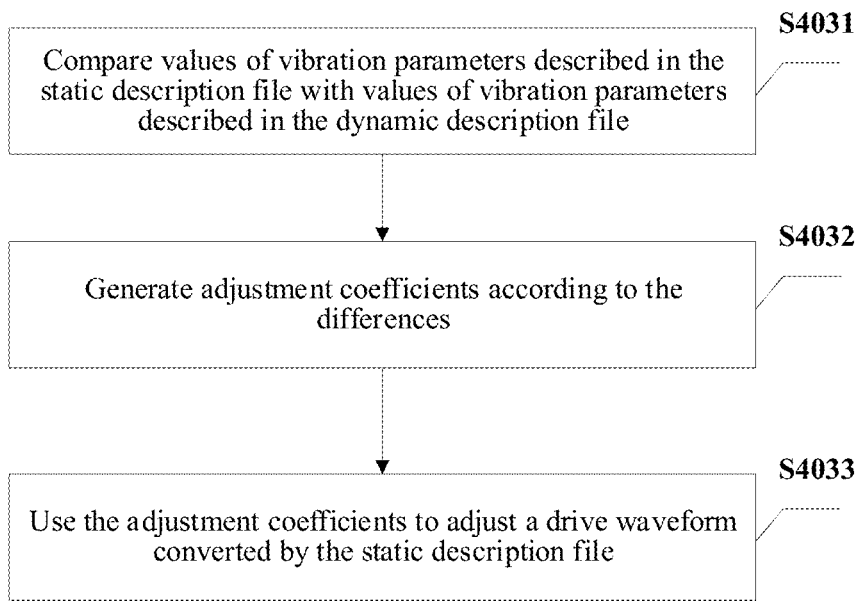
FIG. 22b is a specific flowchart of adjusting a drive waveform in a method for adjusting a drive waveform according to an embodiment of this application.

Therefore, as shown in FIG. 22b, the specific implementation steps of S403 are:

S4031: Compare values of vibration parameters described in the static description file with values of vibration parameters described in the dynamic description file.

For example, values of amplitudes described in the static description file and values of amplitudes described in the dynamic description file are sequentially compared. It may be understood that, parameters to be compared may be pre-configured, and only parameters having a great impact on the vibration sense, for example, amplitudes, are compared to reduce the calculation amount.

The specific process of obtaining the static description file is described in the following embodiment.

It may be understood that, a vibration parameter described in the static description file may be the same as or different from a vibration parameter described in the dynamic description file.

Further, types of vibration parameters described in the dynamic description file are a subset of types of vibration parameters described in the static description file. That is, since the dynamic description file is used in the case of an interruption event, with reference to the foregoing application scenario, not all parameters of a drive waveform need to be adjusted, but only parameters that are highly correlated with the vibration sense may be adjusted. Therefore, the dynamic description file may only describe the parameters that are highly correlated with the vibration sense. Therefore, types of parameters described in the dynamic description file may be less than types of parameters described in the static description file.

For example, parameters such as an amplitude, a frequency, and a vibration time are included in a static description file for controlling the linear motor to vibrate with the played music. However, when the short message application is executed, only an amplitude is included in a static description file for controlling vibration of the linear motor When the two static description files are compared, only values of the amplitudes need to be compared, to reduce the costs of comparison (including the delay felt by the user, and the like).

It may be understood that, differences refer to differences in values between parameters of the same type.

S4032: Generate adjustment coefficients according to the differences.

For example, an amplitude adjustment coefficient is generated based on a difference between a value of an amplitude described in the static description file and a value of an amplitude described in the dynamic description file.

S4033: Use the adjustment coefficients to adjust a drive waveform converted by the static description file.

For example, the amplitude adjustment coefficient is used to adjust an amplitude of the drive waveform converted by the static description file. Further, for example, if the amplitude adjustment coefficient is 0.3, the amplitude of the drive waveform is multiplied by 0.3 to obtain an adjusted amplitude.

The scenario in which information is received when the mobile phone plays the music is still taken as an example. After the information application receives the short message, the electronic device adjusts the drive waveform, for example, multiplying the amplitude of the drive waveform by an adjustment coefficient of 0.3, so that the intensity of the vibration of the drive waveform following the music is reduced, thereby reducing the interference for the user to view the short message.

It may be understood that, optionally, during the interruption event, the drive waveform is adjusted by using the dynamic description file. After the interruption event ends, the adjustment of the drive waveform according to the dynamic description file is stopped, the vibration waveform described in the static description file is converted to the drive waveform, and then the drive waveform is used to drive the linear motor.

In summary, with reference to the foregoing scenario examples, when the music is played and the information is not received, the vibration waveform described in the static description file is converted into the drive waveform, and vibration of the linear motor is controlled by using the drive waveform, so that the linear motor vibrates with the music. After the information is received, the vibration waveform described in the dynamic description file is used to adjust the drive waveform, thereby reducing the amplitude of the drive waveform. When the user views the information, the amplitude of the linear motor is reduced, thereby reducing the interference with the user.

As can be seen, in the method for adjusting a drive waveform described in this embodiment, the drive waveform is adjusted by using the dynamic description file in response to the interruption event, so that the vibration of the linear motor is adapted to the interruption event, and the vibration sense is adjusted with the change of the scenario, thereby providing the user with better vibration sense experience. In addition, the vibration function is extended.

As described above, both the static description file and the dynamic description file may be pre-configured in the storage space, available for the drive waveform processing module shown in FIG. 3a to read from the storage space and use, or may be generated by the drive waveform processing module shown in FIG. 3a.

Figure 23:
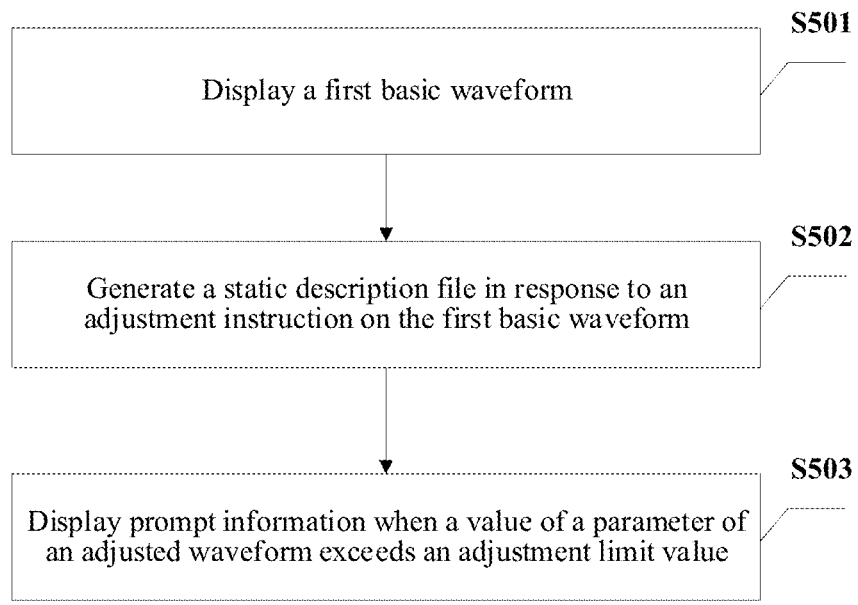
FIG. 23 is a flowchart of generating a static description file in a method for adjusting a drive waveform according to an embodiment of this application.

FIG. 23 is a flowchart of a method for generating a static description file. The method includes the following steps:

S501: Display a first basic waveform.

A first interface may be displayed, and the first interface displays the first basic waveform.

The first basic waveform is a waveform obtained according to a feature of an object to be applied to vibration, or a waveform selected from the pre-configured scene vibration sense library.

Specifically, the object to be applied to vibration may be audio. A basic waveform is generated according to a sound effect feature of the audio, for example, an envelope, a frequency, an amplitude, tone, or rhythm. It may be understood that, the object to be applied to vibration may receive externally, for example, audio files imported by the user. As shown in the interaction interface in FIG. 6a, the user may click the note icon 51 in the upper right corner of the interaction interface to import the audio file. The interaction interface displays a basic waveform generated based on the imported audio file.

Specifically, the pre-configured scene vibration sense library includes waveforms corresponding to vibration senses in a variety of scenes, such as a waveform corresponding to a vibration sense in a shooting scene in a game and a waveform corresponding to a vibration sense in an explosion scene in a game. Waveform files in the scene vibration sense library may be added, deleted, or modified.

It may be understood that, the interaction interface may be displayed. The user may select a waveform corresponding to a vibration sense in at least one scene from the scene vibration sense library based on the interaction interface. As shown in the interaction interface in FIG. 6a, the user may click the file icon 52 in the upper right corner of the interaction interface, to import a waveform in the scene vibration sense library. In response to a selection instruction triggered by a selection operation of the user, the waveform selected by the user from the scene vibration sense library is imported as the basic waveform and displayed.

S502: Generate a static description file in response to an adjustment instruction on the first basic waveform.

The adjustment instruction described in this step may indicate adjustment of a parameter of the waveform, for example, adjustment of vibration parameters such as a frequency, a start time, a duration, and an amplitude of the first basic waveform, or may indicate superimposition of waveforms, for example, superimposing first basic waveforms of different vibration events.

The plurality of waveforms to be superimposed are not limited to events. For the specific calculation manner of waveform superimposition, reference may be made to the prior art, for example, amplitude summing, and details are not described herein again. The purpose of waveform superimposition is to display and expand a variety of vibration effects through superimposition, which can support superimposition of vibration effects of a variety of scenes, thereby enriching the vibration experience of the user.

In response to the adjustment instruction, the basic waveform is adjusted, and in response to an instruction issued by the save control 55, a vibration description file is generated. Optionally, in response to the instruction issued by the save control 55, an adjusted waveform may be further displayed in the interaction interface, that is, the waveform described in the vibration description file.

S503: Display prompt information when a value of a parameter of an adjusted waveform exceeds an adjustment limit value.

The prompt information is used for indicating that the adjustment exceeds the adjustment limit value.

Optionally, the adjustment instruction is not responded to when the value of the parameter of the adjusted waveform exceeds the adjustment limit value.

Specifically, the adjustment limit value may include, but is not limited to, an amplitude limit value, a startup time limit value, and a stop time limit value.

The amplitude limit value may be determined according to a maximum displacement of the linear motor to be controlled. The startup time limit value and the stop time limit value may be determined according to an attribute of the linear motor to be controlled.

The purpose of setting the adjustment limit value is to protect a linear motor to be controlled from being damaged.

Compared with the manner in which a person skilled in the prior art handwrites code to form a vibration description file, the efficiency of obtaining a vibration description file can be improved, and the technical threshold for the user to obtain a vibration description file can be lowered. Since the basic waveform is provided first, the user can obtain the required vibration description file based on the basic waveform, thereby further improving the efficiency and lowering the technical threshold for the user to obtain the vibration description file.

The difference between the process of generating a dynamic description file and the process shown in FIG. 6b is the basic waveform, which is referred to as a second basic waveform to be distinguished from a static description file and is received from an external source. Specifically, the external source may be a source device that provides waveforms, such as an application or a device. The other steps are the same as the process shown in FIG. 6b, and details are not described herein again. The dynamic description file may be alternatively visualized and adjusted, to provide greater possibilities and flexibility for subsequent dynamic adjustment of the vibration of the linear motor.

It should be noted that, in the foregoing embodiments, the interaction interface is only an implementation, which has higher convenience and better user experience, but the adjustment manner for the basic waveform is not limited to the implementation based on the interaction interface.

Figure 24:
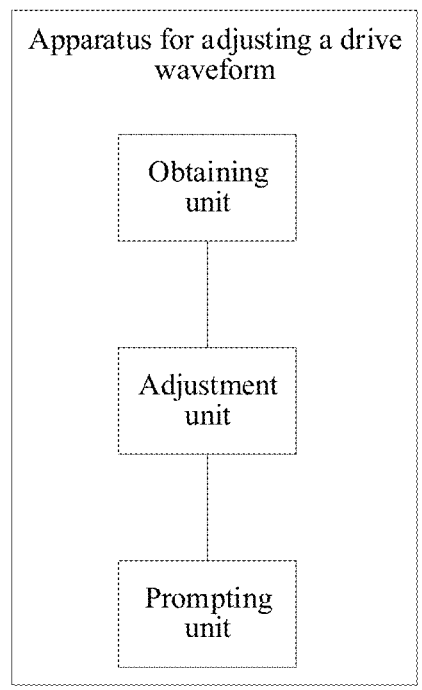
FIG. 24 is a schematic structural diagram of an apparatus for adjusting a drive waveform according to an embodiment of this application.

FIG. 24 shows an apparatus for adjusting a drive waveform disclosed in an embodiment of this application. The apparatus includes an obtaining unit and an adjustment unit. Optionally, the apparatus may further include prompting unit.

The obtaining unit is configured to obtain, in response to an interruption event, the vibration description file corresponding to the interruption event, where the vibration description file is used for describing a vibration parameter. The adjustment unit is configured to use the vibration parameter to adjust a drive waveform. The prompting unit is configured to display prompt information when a value of the parameter of the adjusted waveform exceeds an adjustment limit value. The prompt information is used for prompting that the adjustment exceeds the adjustment limit value.

Optionally, a specific implementation for the adjustment unit to use the vibration parameter to adjust a drive waveform is: comparing values of vibration parameters described in the static description file with values of vibration parameters described in the dynamic description file, where the static description file is used for controlling vibration of the linear motor when the interruption event does not occur, and the dynamic description file is a vibration description file corresponding to the interruption event; generating adjustment coefficients according to the differences; and using the adjustment coefficients to adjust a drive waveform converted by the static description file, so that the adjustment has high accuracy and is easy to operate.

Optionally, types of vibration parameters described in the dynamic description file are a subset of types of vibration parameters described in the static description file, to reduce the costs of comparison.

Optionally, the obtaining unit is further configured to: obtain a waveform according to a vibration feature of an application, or select a waveform from pre-configured scene vibration sense waveforms and display a first basic waveform; and generate the static description file in response to an adjustment instruction on the first basic waveform, which can improve efficiency and lower the technical threshold for the user to obtain the vibration description file.

Optionally, a specific implementation for the obtaining unit to obtaining the vibration description file corresponding to the interruption event is: receiving and displaying a second basic waveform from an external source; and generating a vibration description file corresponding to the interruption event in response to an adjustment instruction on the second basic waveform. The dynamic description file may be alternatively visualized and adjusted, to provide greater possibilities and flexibility for subsequent dynamic adjustment of the vibration of the linear motor.

Optionally, the adjustment instruction indicates at least one of adjustment of a parameter of the waveform or superimposition of a plurality of waveforms.

The apparatus for adjusting a drive waveform shown in FIG. 24 can not only expand the vibration function, that is, adjust the drive waveform in response to the interruption event, so that the vibration of the motor is adapted to the interruption event, but also improve the user experience.

An embodiment of this application further provides a readable storage medium, storing a computer program, where the computer program, when executed by a processor, implements the method for adjusting a vibration waveform of a linear motor according to the foregoing embodiments, to improve the vibration effect of the linear motor.

Optionally, as shown in FIG. 21, the apparatus for controlling a linear motor further includes:

an adjustment unit 805, configured to: when the control unit 804 controls the linear motor by using the drive waveform, obtain, in response to an interruption event, the vibration description file corresponding to the interruption event, where the vibration description file is used for describing a vibration parameter; and use the vibration parameter to adjust the drive waveform.

The adjustment unit may be understood as an execution unit in the waveform processing module in FIG. 3a.

Optionally, when using the vibration parameter to adjust the drive waveform, the adjustment unit 805 is configured to: compare values of vibration parameters described in the static description file with values of vibration parameters described in the dynamic description file, where the static description file is used for controlling vibration of the linear motor when the interruption event does not occur, and the dynamic description file is a vibration description file corresponding to the interruption event; generate adjustment coefficients according to the differences; and use the adjustment coefficients to adjust a drive waveform converted by the static description file.

Optionally, types of vibration parameters described in the dynamic description file are a subset of types of vibration parameters described in the static description file.

Optionally, the process of obtaining the static description file includes: obtaining a waveform according to a vibration feature of an application, or selecting a waveform from pre-configured scene vibration sense waveforms and displaying a first basic waveform; and generating the static description file in response to an adjustment instruction on the first basic waveform.

Optionally, that the adjustment unit 805 obtains the vibration description file corresponding to the interruption event includes: receiving and displaying a second basic waveform from an external source; and generating a vibration description file corresponding to the interruption event in response to an adjustment instruction on the second basic waveform.

The apparatus for controlling a linear motor according to this embodiment can control vibration of various linear motors and has high universality.

What is claimed is:

1. A method for controlling a linear motor, applicable to an electronic device, wherein the electronic device comprises a linear motor, and the method comprises:
   determining, in response to an operation instruction, a vibration description file of an operation object of the operation instruction; and
   outputting a vibration sense that meets a waveform requirement of the vibration description file, wherein the vibration sense is provided by a linear motor in a first vibration state, and the first vibration state matches an attribute of the linear motor.

2. The method for controlling a linear motor according to claim 1, wherein the outputting a vibration sense that meets a waveform requirement of the vibration description file comprises:
   outputting a vibration sense corresponding to a waveform that has a first change trend within a startup time and has a second change trend within a stop time, wherein the first change trend is that an amplitude of a steady-state waveform changes smoothly from zero to an amplitude of a linear motor stable vibration state, and the second change trend is that the amplitude of the steady-state waveform changes smoothly from the amplitude of the linear motor stable vibration state to zero.

3. The method for controlling a linear motor according to claim 1, wherein the outputting a vibration sense that meets a waveform requirement of the vibration description file, wherein the vibration sense is provided by a linear motor in a first vibration state, and the first vibration state matches an attribute of the linear motor comprises:
   outputting a vibration sense corresponding to a steady-state waveform whose frequency is a target frequency, wherein the target frequency is mapped from a frequency of a steady-state waveform of the vibration description file according to a preset first mapping rule and a frequency of the linear motor; and/or
   outputting a vibration sense corresponding to a waveform sequence, wherein a frequency of the waveform sequence is the same as a frequency of a transient waveform of the vibration description file, and a frequency of a target transient waveform is adapted to the linear motor.

4. The method for controlling a linear motor according to claim 1, wherein the process of outputting a vibration sense that meets a waveform requirement of the vibration description file further comprises:
   obtaining, in response to an interruption event, the vibration description file corresponding to the interruption event, wherein the vibration description file is used for describing a vibration parameter; and
   adjusting the vibration sense to a vibration sense corresponding to the interruption event, wherein the vibration sense corresponding to the interruption event meets the waveform requirement of the vibration description file corresponding to the interruption event.

5. The method for controlling a linear motor according to claim 1, wherein a process of generating the vibration description file of the operation object comprises:
   displaying, in response to an operation instruction on an import control in an interaction interface, a basic waveform of the operation object in the interaction interface, wherein the operation object comprises at least one of a multimedia file or a scene vibration sense waveform;
   displaying an adjusted waveform in response to an adjustment instruction on the basic waveform in the interaction interface; and
   generating the vibration description file of the operation object in response to an operation instruction on a generation control in the interaction interface.

6. The method for controlling a linear motor according to claim 5, wherein the displaying an adjusted waveform in response to an adjustment instruction on the basic waveform in the interaction interface comprises:

displaying, in response to an operation instruction on a preset adjustment point on the basic waveform displayed in the interaction interface, an adjustment point on the basic waveform; and displaying, in response to a drag instruction on the adjustment point in a first vibration parameter adjustment mode, a waveform after a first vibration parameter is adjusted, wherein the first vibration parameter comprises an amplitude and/or a frequency.

7. The method for controlling a linear motor according to claim 6, wherein the basic waveform comprises a steady-state waveform, and the first vibration parameter further comprises a time parameter; and the displaying, in response to a drag instruction on the adjustment point in a first vibration parameter adjustment mode, a waveform after a first vibration parameter is adjusted comprises:

displaying, in response to the drag instruction on the adjustment point on a time axis in a time adjustment mode, the waveform after the time parameter is adjusted.

8. The method for controlling a linear motor according to claim 5, wherein the displaying an adjusted waveform in response to an adjustment instruction on the basic waveform in the interaction interface comprises:

displaying, in response to a drag instruction on the waveform displayed in the interaction interface, the waveform after a time parameter is adjusted.

9. The method for controlling a linear motor according to claim 5, wherein the displaying an adjusted waveform in response to an adjustment instruction on the basic waveform in the interaction interface comprises:

displaying, in response to an instruction of dragging a plurality of waveforms to a state in which time ranges overlap in the interaction interface, the waveform after the plurality of waveforms are superimposed.

10. An apparatus for controlling a linear motor, applicable to an electronic device, wherein the electronic device comprises a linear motor, and the apparatus comprises:

a determining unit, configured to determine, in response to an operation instruction, a vibration description file of an operation object of the operation instruction; and an output unit, configured to output a vibration sense that meets a waveform requirement of the vibration description file, wherein the vibration sense is provided by a linear motor in a first vibration state, and the first vibration state matches an attribute of the linear motor.

11. An electronic device, comprising:
one or more processors;
a memory, storing a program; and
a linear motor;
the program, when executed by the one or more processors, causes the one or more processors to implement the method, wherein the method comprises:
determining, in response to an operation instruction, a vibration description file of an operation object of the operation instruction; and
outputting a vibration sense that meets a waveform requirement of the vibration description file, wherein the vibration sense is provided by the linear motor in a first vibration state, and the first vibration state matches an attribute of the linear motor.

12. The electronic device according to claim 11, wherein the outputting a vibration sense that meets a waveform requirement of the vibration description file comprises:
outputting a vibration sense corresponding to a waveform that has a first change trend within a startup time and has a second change trend within a stop time, wherein the first change trend is that an amplitude of a steady-state waveform changes smoothly from zero to an amplitude of a linear motor stable vibration state, and the second change trend is that the amplitude of the steady-state waveform changes smoothly from the amplitude of the linear motor stable vibration state to zero.

13. The electronic device according to claim 11, wherein the outputting a vibration sense that meets a waveform requirement of the vibration description file, wherein the vibration sense is provided by a linear motor in a first vibration state, and the first vibration state matches an attribute of the linear motor comprises:

outputting a vibration sense corresponding to a steady-state waveform whose frequency is a target frequency, wherein the target frequency is mapped from a frequency of a steady-state waveform of the vibration description file according to a preset first mapping rule and a frequency of the linear motor; and/or outputting a vibration sense corresponding to a waveform sequence, wherein a frequency of the waveform sequence is the same as a frequency of a transient waveform of the vibration description file, and a frequency of a target transient waveform is adapted to the linear motor.

14. The electronic device according to claim 11, wherein the process of outputting a vibration sense that meets a waveform requirement of the vibration description file further comprises:

obtaining, in response to an interruption event, the vibration description file corresponding to the interruption event, wherein the vibration description file is used for describing a vibration parameter; and adjusting the vibration sense to a vibration sense corresponding to the interruption event, wherein the vibration sense corresponding to the interruption event meets the waveform requirement of the vibration description file corresponding to the interruption event.

15. The electronic device according to claim 11, wherein a process of generating the vibration description file of the operation object comprises:

displaying, in response to an operation instruction on an import control in an interaction interface, a basic waveform of the operation object in the interaction interface, wherein the operation object comprises at least one of a multimedia file or a scene vibration sense waveform;

displaying an adjusted waveform in response to an adjustment instruction on the basic waveform in the interaction interface; and generating the vibration description file of the operation object in response to an operation instruction on a generation control in the interaction interface.

16. The electronic device for according to claim 15, wherein the displaying an adjusted waveform in response to an adjustment instruction on the basic waveform in the interaction interface comprises:

displaying, in response to an operation instruction on a preset adjustment point on the basic waveform displayed in the interaction interface, an adjustment point on the basic waveform; and displaying, in response to a drag instruction on the adjustment point in a first vibration parameter adjustment mode, a waveform after a first vibration parameter is adjusted, wherein the first vibration parameter comprises an amplitude and/or a frequency.

17. The electronic device according to claim 16, wherein the basic waveform comprises a steady-state waveform, and the first vibration parameter further comprises a time parameter; and the displaying, in response to a drag instruction on the adjustment point in a first vibration parameter adjustment mode, a waveform after a first vibration parameter is adjusted comprises:

displaying, in response to the drag instruction on the adjustment point on a time axis in a time adjustment mode, the waveform after the time parameter is adjusted.

18. The electronic device according to claim 15, wherein the displaying an adjusted waveform in response to an adjustment instruction on the basic waveform in the interaction interface comprises:

displaying, in response to a drag instruction on the waveform displayed in the interaction interface, the waveform after a time parameter is adjusted.

19. The electronic device according to claim 15, wherein the displaying an adjusted waveform in response to an adjustment instruction on the basic waveform in the interaction interface comprises:

displaying, in response to an instruction of dragging a plurality of waveforms to a state in which time ranges overlap in the interaction interface, the waveform after the plurality of waveforms are superimposed.

* * * * *